United States Patent
Zhang et al.

(10) Patent No.: US 11,134,029 B2
(45) Date of Patent: Sep. 28, 2021

(54) COMMUNICATION METHOD, COMMUNICATIONS DEVICE, AND STORAGE MEDIUM

(71) Applicant: Huawei Technologies Co., Ltd., Shenzhen (CN)

(72) Inventors: Xiaojun Zhang, Shenzhen (CN); Qichang Chen, Shenzhen (CN); Lehong Niu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/803,756

(22) Filed: Feb. 27, 2020

(65) Prior Publication Data

US 2020/0204499 A1    Jun. 25, 2020

Related U.S. Application Data

(63) Continuation of application No. PCT/CN2018/100493, filed on Aug. 14, 2018.

(30) Foreign Application Priority Data

Aug. 31, 2017    (CN) .......................... 201710774331.4

(51) Int. Cl.
 *H04L 12/911* (2013.01)
 *H04L 12/437* (2006.01)

(52) U.S. Cl.
 CPC .......... *H04L 47/826* (2013.01); *H04L 12/437* (2013.01)

(58) Field of Classification Search
 CPC ..... H04L 47/826; H04L 12/437; H04L 47/76; H04L 45/38; H04L 45/22; H04L 5/0094;

(Continued)

(56) References Cited

U.S. PATENT DOCUMENTS 10,230,481 B2    3/2019  Chen et al.
2016/0323164 A1  11/2016  Cao
(Continued)

FOREIGN PATENT DOCUMENTS

CN    106357421 A    1/2017
CN    106788855 A    5/2017
(Continued)

OTHER PUBLICATIONS

Braden, R. et al., "Resource Reservation Protocol (RSVP)," Version 1 Functional Specification, Network Working Group, Request for Comments: 2205, Category: Standards Track, XP015007989, Sep. 1997, 113 pages.

(Continued)

*Primary Examiner* — Thai Nguyen
(74) *Attorney, Agent, or Firm* — Slater Matsil, LLP

(57) ABSTRACT

A communication method, a communications device, and a storage medium, where, in the method, a first communications device receives, by using a link corresponding to a first FlexE group, first indication information sent by a second communications device, where for a slot in N slots of the first FlexE group, the first indication information is used to indicate that the second communications device has assigned a FlexE client to the slot, or used to indicate that the second communications device has not assigned a FlexE client to the slot, and the first communications device assigns the FlexE client to the slot in the N slots of the first FlexE group, or cancels, based on the first indication information, the FlexE client that has been assigned to the slot.

18 Claims, 20 Drawing Sheets

(58) Field of Classification Search
CPC ....... H04L 45/28; H04L 5/0053; H04L 47/70; H04J 2203/0091; H04J 2203/0085; H04J 2203/006; H04J 3/1658
See application file for complete search history.

(56) References Cited

U.S. PATENT DOCUMENTS

| | | |
|---|---|---|
| 2016/0366048 A1 | 12/2016 | Takezawa et al. |
| 2017/0171163 A1 | 6/2017 | Gareau et al. |
| 2018/0102834 A1* | 4/2018 | Ibach ................ H04B 10/0793 |
| 2018/0145928 A1 | 5/2018 | Zhong et al. |
| 2019/0372717 A1 | 12/2019 | Zhang et al. |

FOREIGN PATENT DOCUMENTS

| | | |
|---|---|---|
| CN | 106803785 A | 6/2017 |
| CN | 106850465 A | 6/2017 |
| CN | 106911426 A | 6/2017 |
| JP | 2017005536 A | 1/2017 |

OTHER PUBLICATIONS

"FlexE Implementation Agreement—Draft 1.3," Contribution No. oif2015.127.04), IA OIF-FLEXE-01.0, Working Group: PLL, Source: Editor, Optical Internetworking Forum, Study Period 2013-2016, International Telecommunication Union, XP044165967, Feb. 5, 2016, 32 pages.

Wang, Q. et al., "RSVP-TE Signaling Extensions in Support of Flexible Ethernet Networks," draft-wang-ccamp-flexe-signaling-02, Internet Engineering Task Force, Internet-Draft, Intended Status: Informational, Expires: Jan. 9, 2017, XP055424531, Jul. 8, 2016, 13 pages.

"IEEE Standard for Ethernet," IEEE Std. 802.3-2015, (Revision of IEEE Std. 802.3-2012), IEEE Computer Society, New York, NY, Sep. 3, 2015, 4,017 pages.

ITU-T G.8032/Y.1344 Amendment 1(Nov. 2016), "Series G: Transmission Systems and Media, Digital Systems and Networks, Packet over Transport aspects—Ethernet over Transport aspects, Series Y: Global Information, Infrastructure, Internet Protocol Aspects and Next-Generation Networks, Internet protocol aspects—Transport," Ethernet ring protection switching Amendment 1, Nov. 2016, 84 pages.

ITU-T G.808.2 (Nov. 2013), "Series G: Transmission Systems and Media, Digital Systems and Networks, Digital networks—General aspects," Generic protection switching—Ring protection, Nov. 2013, 26 pages.

ITU-T G.841(Oct. 1998), "Series G: Transmission Systems and Media, Digital Systems and Networks, Digital transmission systems—Digital networks—SDH network characteristics," Types and characteristics of SDH network protection architectures, Oct. 1998, 141 pages.

ITU-T G.873.2 (Aug. 2015), "Series G: Transmission Systems and Media, Digital Systems and Networks, Digital networks—Optical transport networks," ODUk shared ring protection. Aug. 2015, 108 pages.

"Flex Ethernet Implementation Agreement," IA # OIF-FLEXE-01.0, OIF Optical Internetworking Forrum, Mar. 2016, 31 pages.

Wang, Q., "Framework and Requirements for GMPLS-based Control of Flexible Ethernet Network," Internet Engineering Task Force, Internet-Draft, Intended Status: Informational, Expires: Sep. 8, 2016, Mar. 7, 2016, 14 pages.

* cited by examiner

COMMUNICATION METHOD, COMMUNICATIONS DEVICE, AND STORAGE MEDIUM

CROSS-REFERENCE TO RELATED APPLICATIONS

This application is a continuation of International Application No. PCT/CN2018/100493, filed on Aug. 14, 2018, which claims priority to Chinese Patent Application No. 201710774331.4, filed on Aug. 31, 2017. The disclosures of the aforementioned applications are hereby incorporated by reference in their entireties.

TECHNICAL FIELD

This application relates to the communications field, and in particular, to a communication method, a communications device, and a storage medium.

BACKGROUND

Related standards of the 802.3 standard Ethernet (StdE) defined by the 802.3 working group subordinate to the Institute of Electrical and Electronics Engineers (IEEE) are widely cited in the industry. The standard Ethernet is well received by manufacturers because of advantages of a simple principle, easy implementation, and a low price. However, with the development of technologies, a difference between bandwidth granularities is increasingly large, and a port of the standard Ethernet cannot meet the increasing actual application requirements. A case is very likely to occur: A bandwidth required by a mainstream application is not corresponding to any existing Ethernet standard rate. For example, if a 50 Gb/s service is carried by a 100GE port, there is a resource waste, and currently no corresponding Ethernet standard granularity can be used to carry a 200 Gb/s service.

To meet this challenge, the Optical Internetworking Forum (OIF) published the flexible Ethernet (FlexE). The FlexE is a generic technology for supporting a variety of Ethernet MAC rates. A plurality of 100GE (Physical, PHYs) ports are bonded, and each 100GE port has 20 slots in time domain at a granularity of 5G. The FlexE may support the following functions: bonding, where a plurality of Ethernet ports are bonded as one link group to support a Medium Access Control (Media Access Control, MAC) service whose rate is greater than that of a single Ethernet port, sub-rating, where a slot is assigned to a service to support a MAC service whose rate is less than a link group bandwidth or less than a bandwidth of a single Ethernet port, and channelization, where a slot is assigned to a service to support simultaneous transmission of a plurality of MAC services over a link group, for example, support simultaneous transmission of one 150G MAC service and two 25G MAC services over a 2×100GE link group.

In the FlexE, slots are divided in a time division multiplexing (TDM) manner, to implement hard isolation of transmission pipe bandwidths. One service data flow may be assigned one or more slots, to match services of different rates. One FlexE group may include one or more physical link interfaces (PHY). FIG. 1 is an example of a schematic diagram of a flexible Ethernet protocol-based communications system. As shown in FIG. 1, a FlexE group 1103 includes four PHYs. A flexible Ethernet protocol client (FlexE Client) represents a client data flow that is transmitted in a given slot (one or more slots) of a FlexE group. One FlexE group may carry a plurality of FlexE clients. One FlexE client may be corresponding to one or more user service data flows (that may also be referred to as Medium Access Control (Media Access Control, MAC) clients). A flexible Ethernet protocol layer (FlexE Shim) layer provides data adaption and conversion from the FlexE client to the MAC clients.

FIG. 2 is an example of a schematic diagram of a slot assignment status of a FlexE group across four physical link interfaces (aggregating four PHYs). As shown in FIG. 2, each PHY has 20 sub-slots. Therefore, the FlexE group has 20*4 sub-slots (sub-calendar). As shown in FIG. 2, description is provided by using an example in which the FlexE group 1103 in FIG. 1 includes four PHYs. The four PHYs are respectively a PHY A 1201, a PHY B 1202, a PHY C 1203, and a PHY D 1204. The FlexE group is corresponding to a FlexE calendar. A FlexE calendar corresponding to a single physical link included in one FlexE group may be referred to as a sub-calendar. The FlexE calendar may include one or more sub-calendars. Each sub-calendar may indicate how 20 slots on a single physical link are assigned to corresponding FlexE clients. In other words, each sub-calendar may indicate a correspondence between the slots on the single physical link and the FlexE clients. As shown in FIG. 2, each PHY may be corresponding to 20 slots, and the 20 slots are respectively represented by a slot 0 to a slot 19 in FIG. 2. FIG. 2 is a schematic diagram of 20 slots corresponding to each of the PHY A 1201, the PHY B 1202, the PHY C 1203, and the PHY D 1204.

In conclusion, a communication solution applicable to a flexible Ethernet protocol is urgently needed.

SUMMARY

Embodiments of this application provide a communication method, a communications device, and a storage medium, to implement a flexible Ethernet protocol-based communication solution.

According to a first aspect, an embodiment of this application provides a flexible Ethernet protocol FlexE network-based communication method. The method includes receiving, by a first communications device by using a link corresponding to a first FlexE group, first indication information sent by a second communications device, where for a slot in N slots of the first FlexE group, the first indication information is used to indicate that the second communications device has assigned a FlexE client to the slot, or used to indicate that the second communications device has not assigned a FlexE client to the slot, where N is a positive integer, and assigning, by the first communications device, the FlexE client to the slot in the N slots of the first FlexE group based on the first indication information, or canceling, based on the first indication information, the FlexE client that has been assigned to the slot in the N slots of the first FlexE group. In this way, a flexible Ethernet protocol-based communication solution is implemented. Further, because a communications device can recognize indication information, and update a slot assignment status of the communications device based on a slot assignment status indicated by the indication information, slot assignment flexibility is improved.

In a possible design, before the receiving, by a first communications device by using a link corresponding to a first FlexE group, first indication information sent by a second communications device, the method further includes receiving, by the first communications device by using the link corresponding to the first FlexE group, an APS protocol request sent by the second communications device, and the assigning, by the first communications device, the FlexE client to the slot in the N slots of the first FlexE group based on the first indication information, or canceling, based on the first indication information, the FlexE client that has been assigned to the slot includes if a type of the APS protocol request is a preset first type, assigning, by the first communications device, the FlexE client to the slot in the N slots of the first FlexE group based on the first indication information, or if a type of the APS protocol request is a preset second type, canceling, by the first communications device based on the first indication information, the FlexE client that has been assigned to the slot. In this way, it can be determined more flexibly whether the communications device updates the slot assignment status of the communications device based on the slot assignment status indicated by the indication information, thereby further improving flexibility.

In a possible design, after the receiving, by the first communications device by using the link corresponding to the first FlexE group, an APS protocol request sent by the second communications device, the method further includes updating, by the first communications device, the APS protocol request, and sending an updated APS protocol request by using a link corresponding to a second FlexE group. The first communications device is connected to a third communications device by using the link corresponding to the second FlexE group. The communications device updates the received APS protocol request, and optionally, may update a target address in the received APS protocol request, and then send the APS protocol request in which the target address has been changed. It can be learned that, a type of the APS protocol request updated and sent is not changed. In this way, a communications device in an entire network performs corresponding processing based on the APS protocol request. In a possible design, the first indication information and/or the APS protocol request are/is carried in a FlexE overhead frame. In this way, the solution can be further compatible with the prior art.

In a possible design, the assigning, by the first communications device, the FlexE client to the slot in the N slots of the first FlexE group based on the first indication information, or canceling, based on the first indication information, the FlexE client that has been assigned to the slot includes for the slot in the N slots of the first FlexE group, if the first indication information indicates that the second communications device has assigned the FlexE client to the slot, and the first communications device has not assigned the FlexE client to the slot, assigning, by the first communications device, the FlexE client to the slot, and/or if the first indication information indicates that the second communications device has not assigned the FlexE client to the slot, and the first communications device has assigned the FlexE client to the slot, canceling, by the first communications device, the FlexE client that has been assigned to the slot. In this way, the first communications device may be allowed to flexibly create or delete a FlexE client based on information about a neighboring node, not requiring a centralized controller.

In a possible design, for the slot in the N slots of the first FlexE group, the first indication information includes a FlexE client identifier corresponding to the slot or includes a non-assignment identifier. The FlexE client identifier corresponding to the slot is an identifier of the FlexE client assigned by the second communications device to the slot. The non-assignment identifier is used to indicate that the second communications device has not assigned the FlexE client to the slot. In this way, requirements of content indicated by the indication information can be met by using only two types of identifiers, and the solution can be simpler and is easy for execution.

In a possible design, the assigning, by the first communications device, the FlexE client to the slot in the N slots of the first FlexE group based on the first indication information includes for K slots in the N slots of the first FlexE group, where K is a positive integer not greater than N, if FlexE client identifiers that are included in the first indication information and that are corresponding to the K slots of the first FlexE group are the same, and the first communications device has not assigned the FlexE client to the K slots of the first FlexE group, assigning, by the first communications device, the FlexE client to each of the K slots of the first FlexE group, where when K is greater than 1, FlexE client identifiers assigned by the first communications device to any two of the K slots of the first FlexE group are the same. In this way, the first communications device may be allowed to assign one or more slots to the FlexE client, and each slot may have a fixed bandwidth. Optionally, a FlexE client with a larger quantity of assigned slots has a larger transmission bandwidth.

In a possible design, after the receiving, by a first communications device by using a link corresponding to a first FlexE group, first indication information sent by a second communications device, the method further includes assigning, by the first communications device, a FlexE client to a slot in N slots of the second FlexE group based on the first indication information, or canceling, based on the first indication information, a FlexE client that has been assigned to the slot in the N slots of the second FlexE group. The first communications device is connected to the third communications device by using the link corresponding to the second FlexE group. In other words, the communications device updates, based on indication information (for example, may be first received indication information) received from a link on one side, slot assignment statuses of FlexE groups in two directions of the communications device. For example, the first indication information is received prior to second indication information, a slot assignment status of the first FlexE group and a slot assignment status of the second FlexE group are updated based on the first indication information, so that a foundation is laid for enabling a standby link.

In a possible design, the assigning, by the first communications device, a FlexE client to a slot in N slots of the second FlexE group based on the first indication information includes for K slots in the N slots of the second FlexE group, where K is a positive integer not greater than N, if the FlexE client identifiers that are included in the first indication information and that are corresponding to the K slots of the first FlexE group are the same, and the first communications device has not assigned the FlexE client to the K slots of the second FlexE group, assigning, by the first communications device, the FlexE client to each of the K slots of the second FlexE group, where when K is greater than 1, FlexE client identifiers assigned by the first communications device to any two of the K slots of the second FlexE group are the same, and establishing, by the first communications device, an association relationship between the FlexE client assigned to the K slots of the first FlexE group and the FlexE client assigned to the K slots of the second FlexE group. In this way, FlexE clients that are established on two FlexE groups by the communications device can be connected, so that a foundation is laid for enabling the standby link.

In a possible design, the first FlexE group includes $M_{11}$ working slots and $M_{12}$ guard periods, where $(M_{11}+M_{12})$ is a positive integer not greater than N, and $M_{12}$ is a positive integer not less than K, the K slots in the N slots of the first FlexE group are K slots in the $M_{12}$ guard periods of the first FlexE group, the second FlexE group includes $M_{21}$ working slots and $M_{22}$ guard periods, where $(M_{21}+M_{22})$ is a positive integer not greater than N, and $M_{22}$ is a positive integer not less than K, the K slots in the N slots of the second FlexE group are K slots in the $M_{22}$ guard periods of the second FlexE group, and $M_{22}$ is not less than $M_{11}$, and $M_{12}$ is not less than $M_{21}$. In this way, when assigning the FlexE client to the slot based on the indication information, the communications device can assign the FlexE client to a guard period. Therefore, not only an original service transmitted in a working slot is not affected, but also another service can be transmitted in the guard period.

In a possible design, the K slots of the first FlexE group are in a one-to-one correspondence with the K slots of the second FlexE group, and for a slot in the K slots of the first FlexE group, a rank of the slot in the $M_{12}$ guard periods is the same as a rank, of a slot that is corresponding to the slot and that is in the K slots of the second FlexE group, in the $M_{22}$ guard periods. In this way, the communications device can determine a guard period according to the rule, so that a simple solution can be used to implement a correspondence between a slot before a slot assignment status change and a slot after the slot assignment status change.

According to a second aspect, an embodiment of this application provides a flexible Ethernet protocol FlexE network-based communication method. The method includes assigning, by a fourth communications device, a FlexE client to a slot of a fourth FlexE group, and changing a user client associated with a FlexE client carried by a third FlexE group to be associated with the FlexE client carried by the fourth FlexE group, and sending, by the fourth communications device, third indication information to a fifth communications device by using a link corresponding to the fourth FlexE group, where for a slot in N slots of the fourth FlexE group, the third indication information is used to indicate that the fourth communications device has assigned a FlexE client to the slot, or used to indicate that the fourth communications device has not assigned a FlexE client to the slot, N is a positive integer, the fourth communications device is connected to the fifth communications device by using the link corresponding to the fourth FlexE group, and the fourth communications device is connected to a sixth communications device by using a link corresponding to the third FlexE group. In this way, a flexible Ethernet protocol-based communication solution is implemented. Further, because the user client is changed to be associated with another FlexE group, a foundation is laid for enabling, when a fault occurs, a standby link to transmit a service of the user client.

In a possible design, after the assigning, by a fourth communications device, a FlexE client to a slot of a fourth FlexE group, and changing a user client associated with a FlexE client carried by a third FlexE group to be associated with the FlexE client carried by the fourth FlexE group, the method further includes changing, by the fourth communications device, the user client associated with the FlexE client carried by the fourth FlexE group to be associated with the FlexE client carried by the third FlexE group, and canceling the FlexE client that has been assigned to the slot of the fourth FlexE group. In other words, the fourth communications device establishes an association relationship between the user client and the FlexE client carried by the third FlexE group, and a previously established association relationship between the user client and the FlexE client carried by the fourth FlexE group is in an inactive state. In this way, a foundation is laid, in a fault rectification state, for restoring a service transmission path of the user client.

In a possible design, after the assigning, by a fourth communications device, a FlexE client to a slot of a fourth FlexE group, and before the sending third indication information, the method further includes sending, by the fourth communications device, a first APS protocol request to the fifth communications device by using the link corresponding to the fourth FlexE group, where if the fourth communications device assigns the FlexE client to the slot of the fourth FlexE group, and changes the user client associated with the FlexE client carried by the third FlexE group to be associated with the FlexE client carried by the fourth FlexE group, a type of the first APS protocol request is a preset first type, or if the fourth communications device cancels the FlexE client that has been assigned to the slot of the fourth FlexE group, and changes the user client associated with the FlexE client carried by the fourth FlexE group to be associated with the FlexE client carried by the third FlexE group, a type of the first APS protocol request is a preset second type. In this way, a communications device that receives indication information can more flexibly determine whether to update a slot assignment status of the communications device based on a slot assignment status indicated by the indication information, thereby further improving flexibility. In a possible design, the third indication information and/or the first APS protocol request are/is carried in a FlexE overhead frame. In this way, the solution can be further compatible with the prior art.

In a possible design, for the slot in the N slots of the fourth FlexE group, the third indication information includes a FlexE client identifier corresponding to the slot or includes a non-assignment identifier. The FlexE client identifier corresponding to the slot is an identifier of the FlexE client assigned by the fourth communications device to the slot. The non-assignment identifier is used to indicate that the fourth communications device has not assigned the FlexE client to the slot. In this way, requirements of content indicated by the indication information can be met by using only two types of identifiers, and the solution can be simpler and is easy for execution.

In a possible design, the assigning, by a fourth communications device, a FlexE client to a slot of a fourth FlexE group, and changing a user client associated with a FlexE client carried by a third FlexE group to be associated with the FlexE client carried by the fourth FlexE group includes if the user client is associated with K slots of the third FlexE group, assigning, by the fourth communications device, the FlexE client to K slots in the N slots of the fourth FlexE group, where K is a positive integer not greater than N, and when K is greater than 1, FlexE client identifiers assigned by the fourth communications device to any two of the K slots of the fourth FlexE group are the same, and changing, by the fourth communications device, the user client associated with the FlexE client carried by the third FlexE group to be associated with the FlexE client assigned to the K slots of the fourth FlexE group. In this way, a quantity of used slots may remain unchanged after the user client is changed to be associated with another FlexE client, thereby reducing an impact on the service of the user client after an association change.

In a possible design, the third FlexE group includes $M_{31}$ working slots and $M_{32}$ guard periods, where $(M_{31}+M_{32})$ is a positive integer not greater than N, and $M_{31}$ is a positive integer not less than K, the fourth FlexE group includes $M_{41}$ working slots and $M_{42}$ guard periods, where $(M_{41}+M_{42})$ is a positive integer not greater than N, $M_{42}$ is a positive integer not less than K, $M_{42}$ is not less than $M_{31}$, and $M_{32}$ is not less than $M_{41}$, and if the user client is associated with K slots of the third FlexE group, the assigning, by the fourth communications device, the FlexE client to K slots in the N slots of the fourth FlexE group includes if the user client is associated with K slots in the $SM_{31}$ working slots of the third FlexE group, assigning, by the fourth communications device, the FlexE client to K slots in the $M_{42}$ guard periods of the fourth FlexE group. In this way, when assigning the FlexE client to the slot based on the indication information, the communications device can assign the FlexE client to a guard period. Therefore, not only an original service transmitted in a working slot is not affected, but also another service can be transmitted in the guard period.

In a possible design, the K slots of the third FlexE group are in a one-to-one correspondence with the K slots of the fourth FlexE group, and for a slot in the K slots of the fourth FlexE group, a rank of the slot in the $M_{42}$ guard periods is the same as a rank, of a slot that is corresponding to the slot and that is in the K slots of the third FlexE group, in the $M_{31}$ working slots. In this way, the communications device can determine a guard period according to the rule, so that a simple solution can be used to implement a correspondence between a slot before a slot assignment status change and a slot after a slot assignment status change.

In a possible design, the assigning, by a fourth communications device, a FlexE client to a slot of a fourth FlexE group, and changing a user client associated with a FlexE client carried by a third FlexE group to be associated with the FlexE client carried by the fourth FlexE group includes when a fault occurs on the link corresponding to the third FlexE group, or the fourth communications device receives a manual switching command, where the manual switching command includes a third FlexE group number, assigning, by the fourth communications device, the FlexE client to the slot of the fourth FlexE group, and changing the user client associated with the FlexE client carried by the third FlexE group to be associated with the FlexE client carried by the fourth FlexE group, and the changing, by the fourth communications device, the user client associated with the FlexE client carried by the fourth FlexE group to be associated with the FlexE client carried by the third FlexE group, and canceling the FlexE client that has been assigned to the slot of the fourth FlexE group includes when the link corresponding to the third FlexE group is in a normal working state, or the fourth communications device receives a manual switching cancelation command, where the manual switching cancelation command includes a fourth FlexE group number, changing the user client associated with the FlexE client carried by the fourth FlexE group to be associated with the FlexE client carried by the third FlexE group, and canceling the FlexE client that has been assigned to the slot of the fourth FlexE group. In this way, a processing capability for addressing a fault situation can be improved, and flexibility of manual configuration can also be improved.

In a possible design, the assigning, by a fourth communications device, a FlexE client to a slot of a fourth FlexE group, and changing a user client associated with a FlexE client carried by a third FlexE group to be associated with the FlexE client carried by the fourth FlexE group includes assigning, by the fourth communications device, the FlexE client to the slot of the fourth FlexE group, and after receiving a second APS protocol request sent by the fifth communications device, changing, by the fourth communications device, the user client associated with the FlexE client carried by the third FlexE group to be associated with the FlexE client carried by the fourth FlexE group. Optionally, after receiving the second APS protocol request sent by the fifth communications device, the fourth communications device learns that slot assignment may have been performed on a side of the fifth communications device. In this case, a packet loss rate can be reduced by changing the user client associated with the FlexE client carried by the third FlexE group to be associated with the FlexE client carried by the fourth FlexE group.

According to a third aspect, an embodiment of this application provides a flexible Ethernet protocol FlexE network-based communication method. The method includes assigning, by a seventh communications device, a first FlexE client to a slot of a fifth FlexE group, and changing a second FlexE client that is associated with a FlexE client carried by a sixth FlexE group and that is carried by the fifth FlexE group to be associated with the first FlexE client, and sending, by the seventh communications device, fourth indication information to an eighth communications device by using a link corresponding to the fifth FlexE group, where for a slot in N slots of the fifth FlexE group, the fourth indication information is used to indicate that the seventh communications device has assigned a FlexE client to the slot, or used to indicate that the seventh communications device has not assigned a FlexE client to the slot, N is a positive integer, the seventh communications device is connected to the eighth communications device by using the link corresponding to the fifth FlexE group, and the seventh communications device is connected to a ninth communications device by using a link corresponding to the sixth FlexE group. In this way, a flexible Ethernet protocol-based communication solution is implemented. Further, because a FlexE client is changed to be associated with a FlexE client carried by another FlexE group, a foundation is laid for enabling, when a fault occurs, a standby link to transmit a service of a user client.

In a possible design, after the assigning, by a seventh communications device, a first FlexE client to a slot of a fifth FlexE group, and changing a second FlexE client that is associated with a FlexE client carried by a sixth FlexE group and that is carried by the fifth FlexE group to be associated with the first FlexE client, the method further includes changing, by the seventh communications device, the second FlexE client associated with the first FlexE client to be associated with the FlexE client carried by the sixth FlexE group, and canceling the first FlexE client that has been assigned to the slot of the fifth FlexE group. In this way, a foundation is laid, in a fault rectification state, for restoring an original service transmission path.

In a possible design, after the assigning, by a seventh communications device, a first FlexE client to a slot of a fifth FlexE group, and before the sending fourth indication information, the method further includes sending, by the seventh communications device, an APS protocol request to the eighth communications device by using the link corresponding to the fifth FlexE group, where if the seventh communications device assigns the first FlexE client to the slot of the fifth FlexE group, and changes the second FlexE client that is associated with the FlexE client carried by the sixth FlexE group and that is carried by the fifth FlexE group to be associated with the first FlexE client, a type of the APS protocol request is a preset first type, or if the seventh communications device cancels the first FlexE client that has been assigned to the slot of the fifth FlexE group, and changes the second FlexE client associated with the first FlexE client to be associated with the FlexE client carried by the sixth FlexE group, a type of the APS protocol request is a preset second type. In this way, a communications device that receives indication information can more flexibly determine whether to update a slot assignment status of the communications device based on a slot assignment status indicated by the indication information, thereby further improving flexibility. In a possible design, the fourth indication information and/or the APS protocol request are/is carried in a FlexE overhead frame. In this way, the solution can be further compatible with the prior art.

In a possible design, for the slot in the N slots of the fifth FlexE group, the fourth indication information includes a FlexE client identifier corresponding to the slot or includes a non-assignment identifier. The FlexE client identifier corresponding to the slot is an identifier of the FlexE client assigned by the seventh communications device to the slot. The non-assignment identifier is used to indicate that the seventh communications device has not assigned the FlexE client to the slot. In this way, requirements of content indicated by the indication information can be met by using only two types of identifiers, and the solution can be simpler and is easy for execution.

In a possible design, the assigning, by a seventh communications device, a first FlexE client to a slot of a fifth FlexE group, and changing a second FlexE client that is associated with a FlexE client carried by a sixth FlexE group and that is carried by the fifth FlexE group to be associated with the first FlexE client includes if the second FlexE client is assigned to K slots of the fifth FlexE group, assigning, by the seventh communications device, the first FlexE client to K slots in the N slots of the fifth FlexE group, where K is a positive integer not greater than N, and when K is greater than 1, FlexE client identifiers assigned by the seventh communications device to any two of the K slots of the fifth FlexE group are the same, and changing, by the seventh communications device, the second FlexE client that is associated with the FlexE client carried by the sixth FlexE group and that is carried by the fifth FlexE group to be associated with the first FlexE client. In this way, a quantity of used slots may remain unchanged after the user client is changed to be associated with another FlexE client, thereby reducing an impact on the service of the user client after an association change.

In a possible design, the sixth FlexE group includes $M_{61}$ working slots and $M_{62}$ guard periods, where $(M_{61}+M_{62})$ is a positive integer not greater than N, and $M_{61}$ is a positive integer not less than K, the fifth FlexE group includes $M_{51}$ working slots and $M_{52}$ guard periods, where $(M_{51}+M_{52})$ is a positive integer not greater than N, $M_{52}$ is a positive integer not less than K, $M_{52}$ is not less than $M_{61}$, and $M_{62}$ is not less than $M_{51}$, and if the second FlexE client is assigned to K slots of the fifth FlexE group, the assigning, by the seventh communications device, the first FlexE client to K slots in the N slots of the fifth FlexE group includes if the second FlexE client is assigned to K slots in the $M_{51}$ working slots of the fifth FlexE group, assigning, by the seventh communications device, the first FlexE client to K slots in the $M_{52}$ guard periods of the fifth FlexE group. In this way, when assigning the FlexE client to the slot based on the indication information, the communications device can assign the FlexE client to a guard period. Therefore, not only an original service transmitted in a working slot is not affected, but also another service can be transmitted in the guard period.

In a possible design, the K slots of the fifth FlexE group for carrying the second FlexE client are in a one-to-one correspondence with the K slots of the fifth FlexE group for carrying the first FlexE client, and for a slot in the K slots of the fifth FlexE group for carrying the first FlexE client, a rank of the slot in the $M_{52}$ guard periods is the same as a rank, of a slot that is corresponding to the slot and that is in the K slots of the fifth FlexE group for carrying the second FlexE client, in the $M_{51}$ working slots. In this way, the communications device can determine a guard period according to the rule, so that a simple solution can be used to implement a correspondence between a slot before a slot assignment status change and a slot after a slot assignment status change.

In a possible design, the assigning, by a seventh communications device, a first FlexE client to a slot of a fifth FlexE group, and changing a second FlexE client that is associated with a FlexE client carried by a sixth FlexE group and that is carried by the fifth FlexE group to be associated with the first FlexE client includes when a fault occurs on the link corresponding to the sixth FlexE group, assigning, by the seventh communications device, the first FlexE client to the slot of the fifth FlexE group, and changing the second FlexE client that is associated with the FlexE client carried by the sixth FlexE group and that is carried by the fifth FlexE group to be associated with the first FlexE client, and the changing, by the seventh communications device, the second FlexE client associated with the first FlexE client to be associated with the FlexE client carried by the sixth FlexE group, and canceling the first FlexE client that has been assigned to the slot of the fifth FlexE group includes when the link corresponding to the sixth FlexE group is in a normal working state, changing, by the seventh communications device, the second FlexE client associated with the first FlexE client to be associated with the FlexE client carried by the sixth FlexE group, and canceling the first FlexE client that has been assigned to the slot of the fifth FlexE group. In this way, a processing capability for addressing a fault situation and a fault rectification capability can be improved.

According to a fourth aspect, an embodiment of this application provides a communications device. The communications device includes a memory, a transceiver, and a processor. The memory is configured to store an instruction. The processor is configured to execute the instruction stored in the memory, and control the transceiver to receive a signal or send a signal. When the processor executes the instruction stored in the memory, the communications device is configured to perform the method according to any one of the first aspect or possible designs of the first aspect.

According to a fifth aspect, an embodiment of this application provides a communications device. The communications device includes a memory, a transceiver, and a processor. The memory is configured to store an instruction. The processor is configured to execute the instruction stored in the memory, and control the transceiver to receive a signal or send a signal. When the processor executes the instruction stored in the memory, the communications device is configured to perform the method according to any one of the second aspect or possible designs of the second aspect.

According to a sixth aspect, an embodiment of this application provides a communications device. The communications device includes a memory, a transceiver, and a processor. The memory is configured to store an instruction. The processor is configured to execute the instruction stored in the memory, and control the transceiver to receive a signal or send a signal. When the processor executes the instruction stored in the memory, the communications device is configured to perform the method according to any one of the third aspect or possible designs of the third aspect.

According to a seventh aspect, an embodiment of this application provides a communications device. The communications device is configured to implement the method according to any one of the first aspect or possible designs of the first aspect, and includes corresponding functional modules that are respectively configured to implement steps in the foregoing method.

According to an eighth aspect, an embodiment of this application provides a communications device. The communications device is configured to implement the method according to any one of the second aspect or possible designs of the second aspect, and includes corresponding functional modules that are respectively configured to implement steps in the foregoing method.

According to a ninth aspect, an embodiment of this application provides a communications device. The communications device is configured to implement the method according to any one of the third aspect or possible designs of the third aspect, and includes corresponding functional modules that are respectively configured to implement steps in the foregoing method.

According to a tenth aspect, a system is provided. The system includes the foregoing communications devices.

According to an eleventh aspect, a computer program product is provided. The computer program product includes a computer program (or may be referred to as code or an instruction). When being run, the computer program enables a computer to perform the method in any one of the first aspect to the third aspect or possible implementations of the first aspect to the third aspect.

According to a twelfth aspect, a computer-readable medium is provided. The computer-readable medium stores a computer program (or may be referred to as code or an instruction). When being run on a computer, the computer program enables the computer to perform the method in any one of the first aspect to the third aspect or possible implementations of the first aspect to the third aspect.

DETAILED DESCRIPTION OF ILLUSTRATIVE EMBODIMENTS

Figure 3:
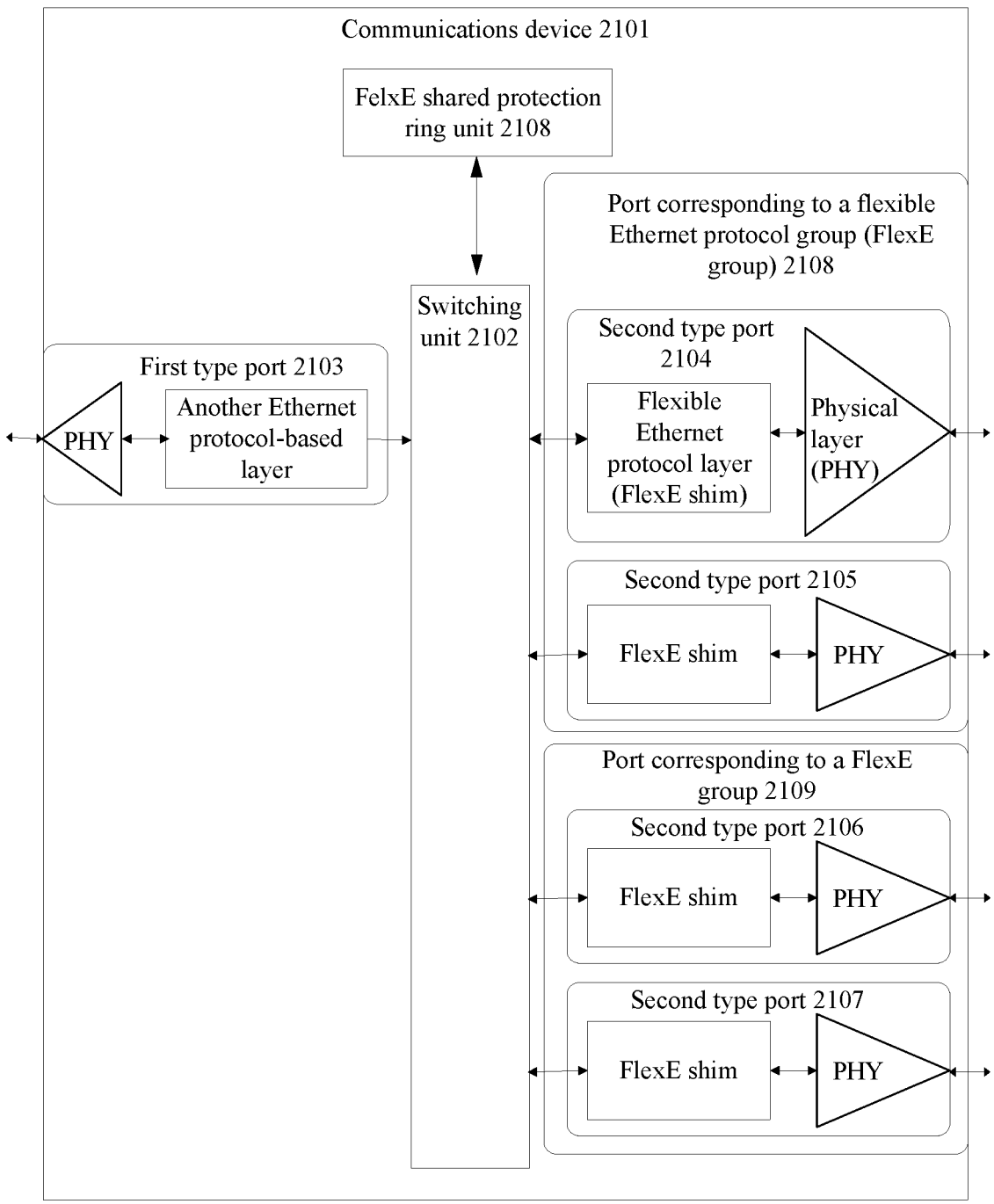
FIG. 3 is a schematic structural diagram of a communications device according to an embodiment of this application.

FIG. 3 is a schematic structural diagram of a communications device according to an embodiment of this application. As shown in FIG. 3, the communications device 2101 may include one or more ports. Any port of the communications device 2101 may support only the standard Ethernet protocol, or support only the flexible Ethernet protocol, or support both the standard Ethernet protocol and the flexible Ethernet protocol. For example, the communications device 2101 in FIG. 3 includes a first type port 2103, a second type port 2104, a second type port 2105, a second type port 2106, and a second type port 2107.

The first type port in this embodiment of this application may be a port that supports only the standard Ethernet protocol. In this case, the first type port can transmit information according to only the standard Ethernet protocol. Optionally, the first type port may alternatively be a port that supports both the standard Ethernet protocol and the flexible Ethernet protocol. In this case, the first type port is a port that is currently using the standard Ethernet protocol. The second type port in this embodiment of this application may be a port that supports only the flexible Ethernet protocol. In this case, the second type port can transmit information according to only the flexible Ethernet protocol. Optionally, the second type port may alternatively be a port that supports both the standard Ethernet protocol and the flexible Ethernet protocol. In this case, the second type port is a port that is currently using the flexible Ethernet protocol. For example, a first port may support the standard Ethernet protocol and the flexible Ethernet protocol, and if the first port transmits information according to the standard Ethernet protocol in a time period, the first port may be referred to as a first type port in the time period of transmitting the information according to the standard Ethernet protocol, or if the first port transmits information according to the flexible Ethernet protocol in a time period, the first port may be referred to as a second type port in the time period of transmitting the information according to the flexible Ethernet protocol.

As shown in FIG. 3, the communications device 2101 in this embodiment of this application further includes a switching unit 2102, and the ports of the communications device 2101 are connected by using the switching unit 2102. Optionally, a port of the communications device 2101 may also be connected to a user client by using the switching unit 2102. Optionally, the communications device 2101 may include a FlexE shared protection ring (FlexE-SPRing) unit 2108. The unit may also be referred to as a two-fiber ring network protection switching functional unit, capable of detecting a FlexE link fault or creating a FlexE client, may be responsible for sending and receiving a ring-network APS protocol request, may implement pass-through of a guard period, or the like. Optionally, the communications device 2102 may have the functions of the FlexE shared protection ring unit 2108, or the functions may be integrated into a chip of the communications device 2101. The FlexE shared protection ring unit 2108 may also include a plurality of functional units, and FIG. 3 is only an example of functional unit division.

Figure 1:
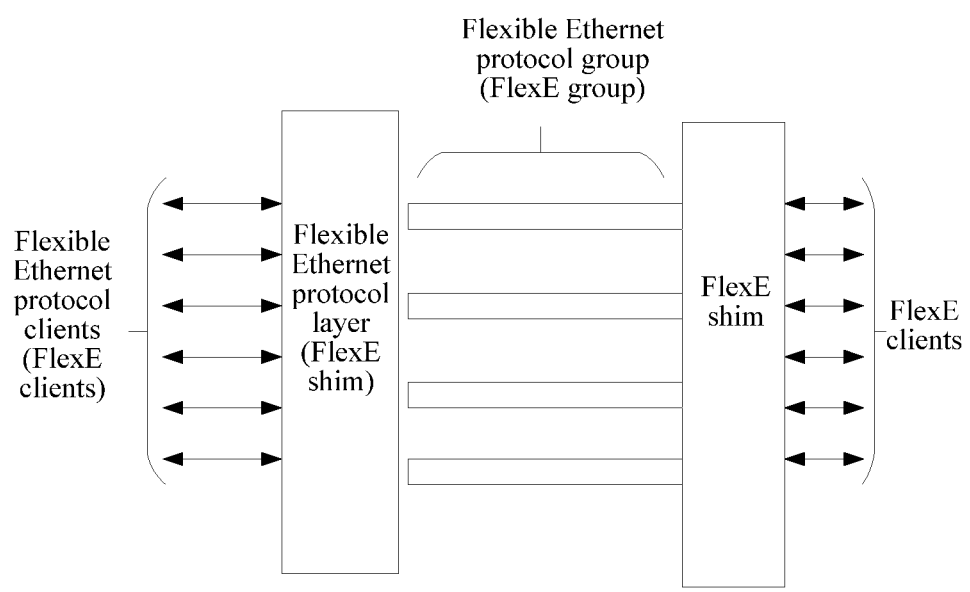
FIG. 1 is a schematic diagram of a flexible Ethernet protocol-based communications system.
Figure 2:
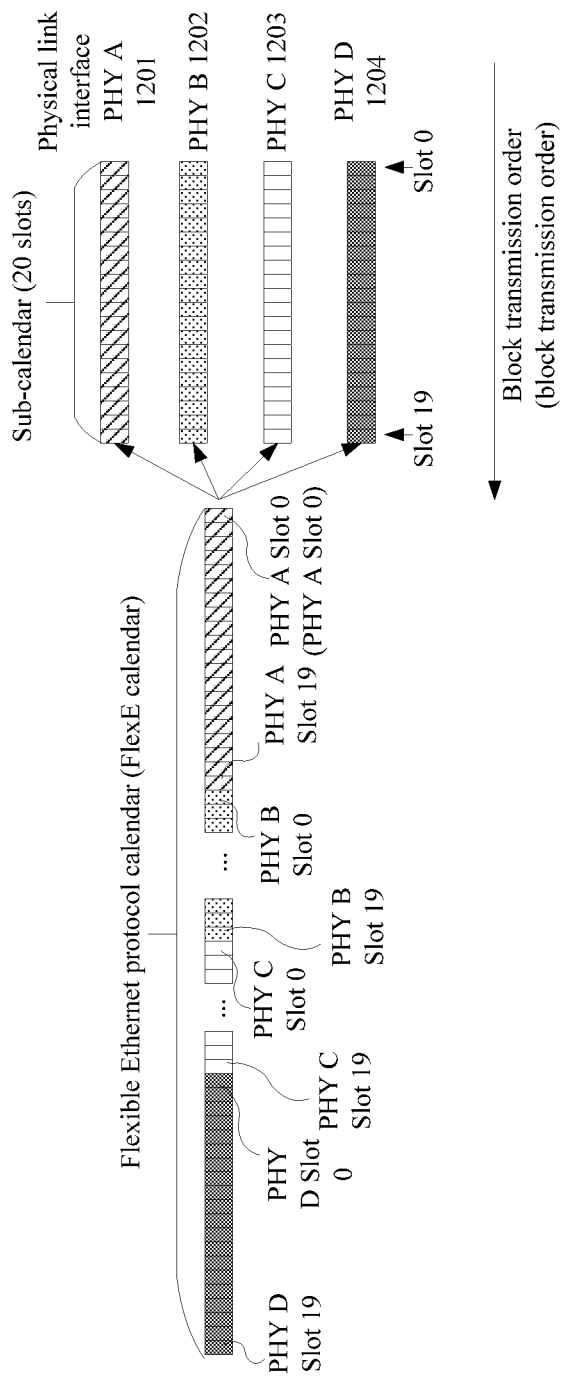
FIG. 2 is a schematic diagram of a slot assignment status of a FlexE group across four physical link interfaces (aggregating four PHYs)

In the FlexE, a plurality of PHYs may be bonded as one link group (in other words, a plurality of ports are bonded as one link group). The link group may be referred to as one FlexE group, and the ports bonded as one FlexE group may be ports that support the FlexE protocol. As shown in FIG. 3, the second type port 2104 and the second type port 2105 are bonded as one FlexE group, and the second type port 2106 and the second type port 2107 are bonded as one FlexE group. Each PHY in each FlexE group may be corresponding to 20 slots, and if one FlexE group includes two PHYs, 40 slots are available. In one FlexE group, one slot may be uniquely determined by using a PHY identifier and a slot identifier. For example, for a slot 0 of the PHY A 1201 in FIG. 2, the PHY A 1201 is a PHY identifier, and the slot 0 is a slot identifier. For another example, for a slot 0 of a PHY of the second type port 2104 in FIG. 3, the PHY of the second type port 2104 is a PHY identifier, and the slot 0 is a slot identifier.

Figure 4:
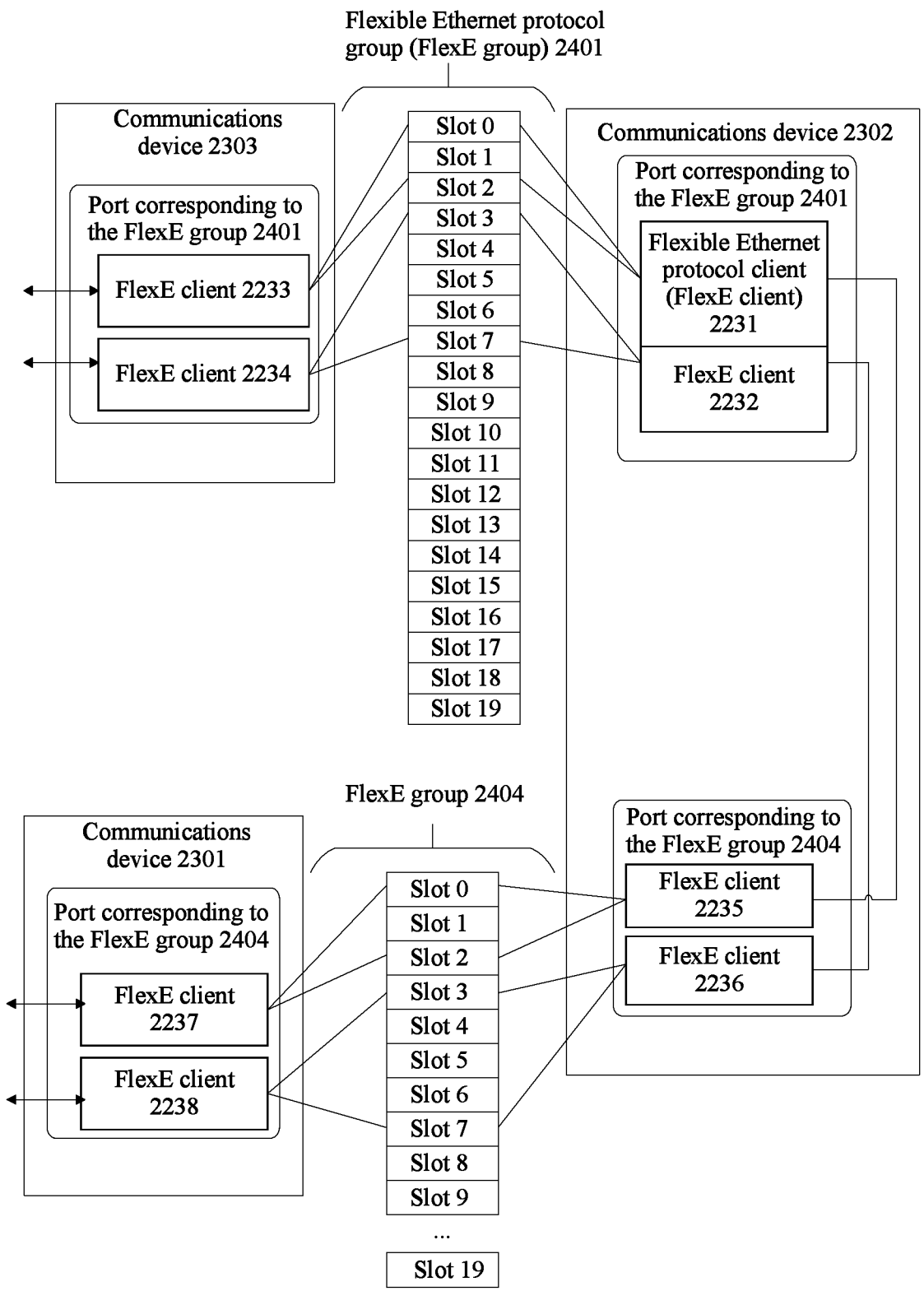
FIG. 4 is a schematic architectural diagram of a communications system according to an embodiment of this application.

FIG. 4 is an example of a schematic architectural diagram of a communications system according to an embodiment of this application. As shown in FIG. 4, a communications device 2301 and a communications device 2302 are connected by using a port, and the communications device 2302 and a communications device 2303 are connected by using a port. One or more PHYs that connect the communications device 2301 and the communications device 2302 are bonded as a FlexE group 2404, and one or more PHYs that connect the communications device 2302 and the communications device 2303 are bonded as a FlexE group 2401. FIG. 4 is described by using an example in which the FlexE group 2401 and the FlexE group 2404 each include 20 slots. In this embodiment of this application, each communications device needs to create a FlexE client (denoted by FlexE client in the figure) to occupy a slot of a FlexE group, and establishes an association relationship between the FlexE client and the slot. Then, one FlexE client and another FlexE client may be bonded, or a FlexE client and a user client (denoted by user client in the figure) may be bonded.

As shown in FIG. 4, the communications device 2301 creates a FlexE client 2237, and occupies a slot 0 (denoted by slot 0 in the figure) and a slot 2 of the FlexE group 2404 by using the created FlexE client 2237. In other words, the communications device 2301 establishes an association relationship between the FlexE client 2237 and the slot 0 and the slot 2 of the FlexE group 2404. The communications device 2302 establishes an association relationship between a FlexE client 2235 and the slot 0 and the slot 2 of the FlexE group 2404. In other words, there is an association relationship between the FlexE client 2235 and the FlexE client 2237. Optionally, an identifier of the FlexE client 2235 and an identifier of the FlexE client 2237 may be the same or different. The communications device 2302 establishes an association relationship between a FlexE client 2231 and a slot 0 and a slot 2 of the FlexE group 2401. The communications device 2302 establishes an association relationship between the FlexE client 2235 and the FlexE client 2231. The communications device 2303 establishes an association relationship between a FlexE client 2233 and the slot 0 and the slot 2 of the FlexE group 2401. In this way, FlexE clients corresponding to one link are successively "the FlexE client 2233 of the communications device 2303—the FlexE client 2231 of the communications device 2302—the FlexE client 2235 of the communications device 2302—the FlexE client 2237 of the communications device 2301". Information may be transmitted on PHYs and slots corresponding to the link.

Correspondingly, as shown in FIG. 4, the communications device 2301 creates a FlexE client 2238, and occupies a slot 3 and a slot 7 of the FlexE group 2404 by using the created FlexE client 2238. In other words, the communications device 2301 establishes an association relationship between the FlexE client 2238 and the slot 3 and the slot 7 of the FlexE group 2404. The communications device 2302 establishes an association relationship between a FlexE client 2236 and the slot 3 and the slot 7 of the FlexE group 2404. In other words, there is an association relationship between the FlexE client 2236 and the FlexE client 2238. Optionally, an identifier of the FlexE client 2236 and an identifier of the FlexE client 2238 may be the same or different. The communications device 2302 establishes an association relationship between a FlexE client 2232 and a slot 3 and a slot 7 of the FlexE group 2401. The communications device 2302 establishes an association relationship between the FlexE client 2236 and the FlexE client 2232. The communications device 2303 establishes an association relationship between a FlexE client 2234 and the slot 3 and the slot 7 of the FlexE group 2401. In this way, FlexE clients corresponding to one link are successively "the FlexE client 2234 of the communications device 2303—the FlexE client 2232 of the communications device 2302—the FlexE client 2236 of the communications device 2302—the FlexE client 2238 of the communications device 2301". Information may be transmitted on PHYs and slots corresponding to the link.

The embodiments of this application are applicable to various forms of communications systems, such as a linear networking scenario and a ring network networking scenario. The ring network networking scenario is a networking scenario in which at least three communications devices are used, and the communications devices are connected head-to-tail in sequence by using optical fibers to form a circular topology. One communications device may be a communications device in one or more ring networks. In the embodiments of this application, ports are connected by using two groups of fibers (or may be referred to as a two-fiber manner, where one group is transmit fibers, the other group is receive fibers, and either of the two groups of fibers may include one or more fibers). For example, a first port is connected to a second port, and functions of sending information to the second port by the first port and sending information to the first port by the second port may be implemented by using a pair of fibers.

Figure 5A:
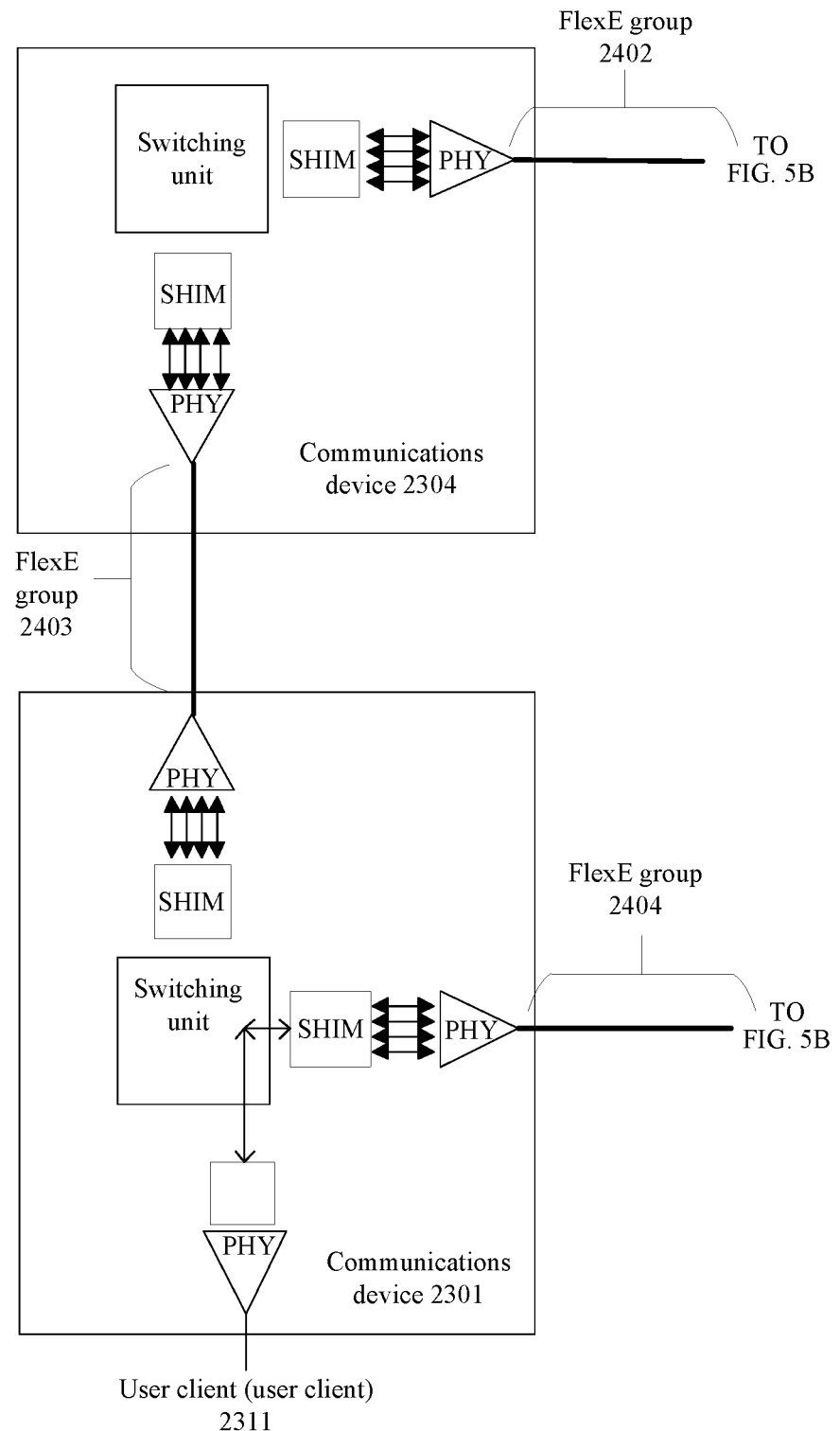
FIG. 5A and FIG. 5B are a schematic architectural diagram of a communications system according to an embodiment of this application.
Figure 5B:
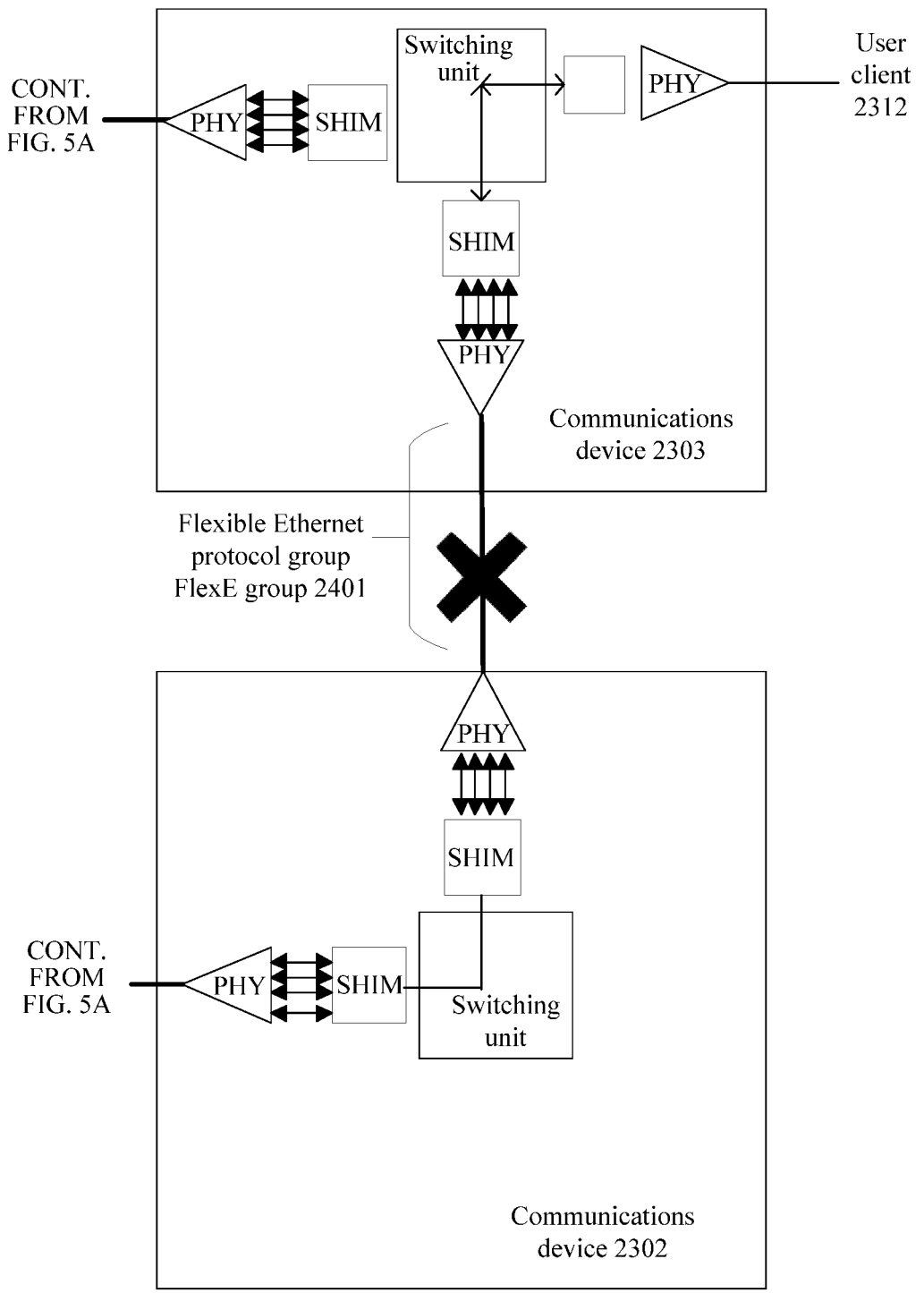

The following describes an application scenario to which the embodiments of this application may be applicable. FIG. 5A and FIG. 5B are an example of a schematic architectural diagram of a communications system according to an embodiment of this application. As shown in FIG. 5A and FIG. 5B, in this embodiment of this application, a communications device 2303 is connected to a communications device 2304, the communications device 2304 is connected to a communications device 2301, the communications device 2301 is connected to a communications device 2302, and the communications device 2302 is connected to the communications device 2303. In other words, the communications device 2301, the communications device 2302, the communications device 2303, and the communications device 2404 form a ring network. Optionally, any communications device in FIG. 5A and FIG. 5B may also be in another ring network. For example, the communications device 2303 may also be in another ring network. As shown in FIG. 5A and FIG. 5B, one or more PHYs that connect the communications device 2301 and the communications device 2302 are bonded as a FlexE group 2404, one or more PHYs that connect the communications device 2302 and the communications device 2303 are bonded as a FlexE group 2401, one or more PHYs that connect the communications device 2303 and the communications device 2304 are bonded as a FlexE group 2402, and one or more PHYs that connect the communications device 2304 and the communications device 2301 are bonded as a FlexE group 2403.

The communications device 2301 may communicate with a user client (denoted by user client in the figure) 2311. The communications device 2303 may communicate with a user client 2312. There are two links between the communications device 2303 and the communications device 2301: "the communications device 2301—the communications device 2304—the communications device 2303" and "the communications device 2301-the communications device 2302—the communications device 2303". In FIG. 5A and FIG. 5B, the link "the user client 2311—the communications device 2301—the communications device 2302—the communications device 2303—the user client 2312" is in a working state, and information transmission between the user client 2311 and the user client 2312 can be implemented by using this link. If a fault occurs on a link between the communications device 2302 and the communications device 2303, a solution provided in this embodiment of this application may be applied, to enable the link "the user client 2311—the communications device 2301—the communications device 2304—the communications device 2303—the user client 2312", to implement information transmission between the user client 2311 and the user client 2312. Therefore, both a FlexE-based communication solution and a troubleshooting solution are provided. A ring network in which network elements are connected by using a pair of fibers (implementing a transceiver function) can provide a fault self-rectification capability, also referred to as a protection switching capability. The solution in this embodiment of this application may be applied, to make a service interruption time less than 50 milliseconds.

Optionally, there may be no other communications devices on the link between the communications device 2301 and the communications device 2303. In this case, the communications device 2301 and the communications device 2303 are directly connected. Alternatively, there may be one or more other communications devices on the link between the communications device 2301 and the communications device 2303. For example, on the link "the communications device 2301—the communications device 2304—the communications device 2303" in FIG. 5A and FIG. 5B, there is one communications device 2304 between the communications device 2301 and the communications device 2303. Optionally, in FIG. 5A and FIG. 5B, for the link "the communications device 2301—the communications device 2304—the communications device 2303", there may be one or more other communications devices between the communications device 2301 and the communications device 2304, and/or there may be one or more other communications devices between the communications device 2304 and the communications device 2303. Similarly, optionally, for the link "the communications device 2301—the communications device 2302—the communications device 2303", there may be one or more other communications devices between the communications device 2301 and the communications device 2302, and/or there may be one or more other communications devices between the communications device 2302 and the communications device 2303.

Optionally, in this embodiment of this application, some information, such as a protection group number, may be configured on each communications device (for example, an association relationship between a third FlexE group number and a fourth FlexE group number may be configured on a fourth communications device). In other words, two FlexE groups that mutually provide protection may be pre-configured, and the two FlexE groups that mutually provide protection, such as the third FlexE group and the fourth FlexE group, may be referred to as a protection group. Optionally, the protection group may be specific to one protected service flow. FlexE groups of a same communications device that are corresponding to active and standby transmission paths for one service flow form one protection group. The service flow is transmitted on the active path by default, and is switched to the standby transmission path after a fault occurs. The FlexE groups of the same communications device that are corresponding to a service flow group having active and standby paths are a protection group. For another example, the information configured on each communications device is an identifier of the communications device, a ring network topology of the communications device, which may include an identifier of each communications device included in the ring network topology, and a connection status between communications devices, FlexE groups in two directions of the communications device, and an assignment status of guard periods and working slots of each FlexE group, a status of whether the communications device supports an APS protocol, setting of a wait to restore (WTR) of the communications device, a switching relationship between a user service and a working slot, and supporting startup or pause of a protection switching function. For example, if "supporting startup of a protection switching function" is configured on the communications device, the communications device allows a service flow to be switched to a standby path, or if "pausing or forbidding startup of a protection switching function" is configured on the communications device, the communications device does not allow a service flow to be switched to a standby path, that is, protection switching is inactive.

Figure 6:
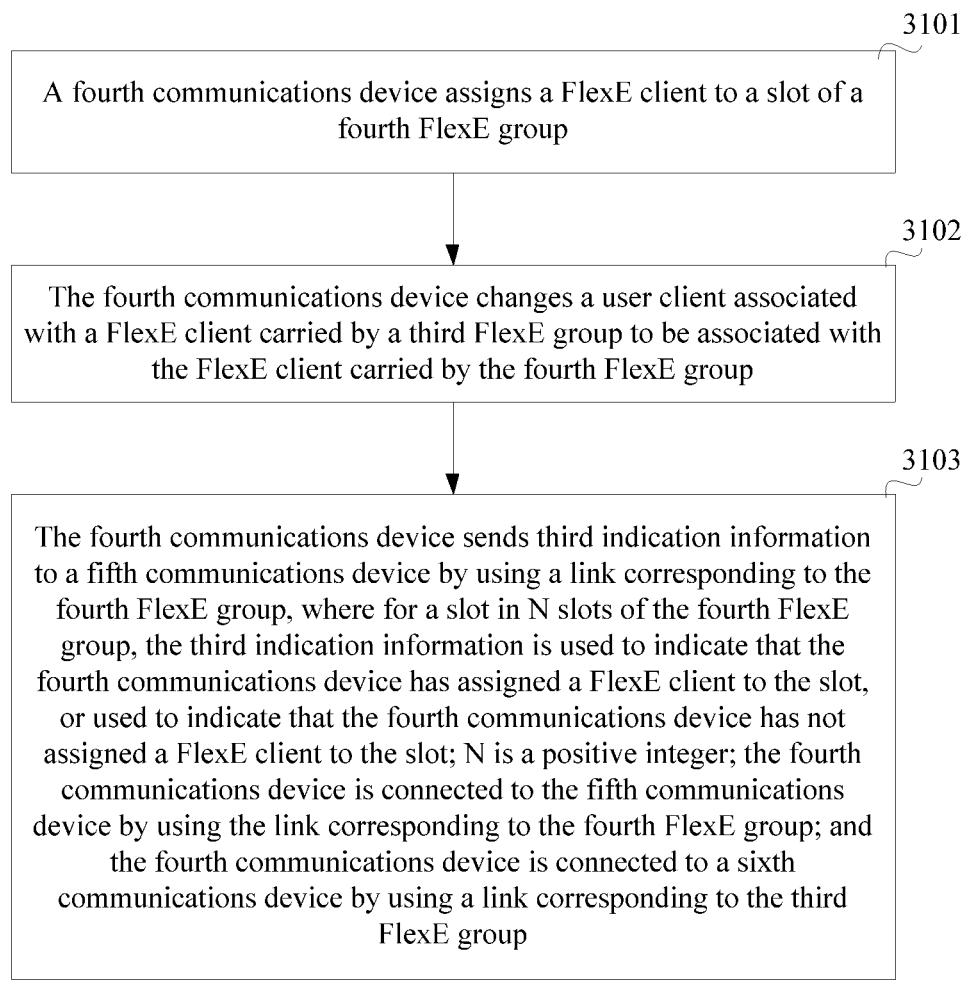
FIG. 6 is a schematic flowchart of a flexible Ethernet protocol FlexE network-based communication method according to an embodiment of this application.

Based on the foregoing content, FIG. 6 is an example of a schematic flowchart of a flexible Ethernet protocol FlexE network-based communication method according to an embodiment of this application. A fourth communications device that performs the communication method may be a communications device that is connected to a user client and that needs to change a FlexE group associated with the user client. For example, the fourth communications device may be the communications device 2303 in FIG. 5B, a sixth communications device may be the communications device 2302 in FIG. 5B, and a fifth communications device may be the communications device 2304 in FIG. 5A. A third FlexE group in the communication method may be the FlexE group 2401 in FIG. 5B, and a fourth FlexE group may be the FlexE group 2402 in FIG. 5A. As shown in FIG. 6, the method includes the following steps.

Step 3101: The fourth communications device assigns a FlexE client to a slot of the fourth FlexE group.

Step 3102: The fourth communications device changes a user client associated with a FlexE client carried by the third FlexE group to be associated with the FlexE client carried by the fourth FlexE group. In other words, the fourth communications device establishes an association relationship between the user client and the FlexE client carried by the fourth FlexE group, and a previously established association relationship between the user client and the FlexE client carried by the third FlexE group is in an inactive state. Optionally, one FlexE group may carry one or more FlexE clients. The changing the user client associated with the FlexE client carried by the third FlexE group to be associated with the FlexE client carried by the fourth FlexE group may also be described as establishing a cross relationship between the user client and the FlexE client carried by the fourth FlexE group.

Step 3103: The fourth communications device sends third indication information to the fifth communications device by using a link corresponding to the fourth FlexE group, where for a slot in N slots of the fourth FlexE group, the third indication information is used to indicate that the fourth communications device has assigned a FlexE client to the slot, or used to indicate that the fourth communications device has not assigned a FlexE client to the slot, N is a positive integer, the fourth communications device is connected to the fifth communications device by using the link corresponding to the fourth FlexE group, and the fourth communications device is connected to the sixth communications device by using a link corresponding to the third FlexE group. Optionally, assigning the FlexE client to the slot is establishing an association relationship between the FlexE client and the slot.

Step 3101, step 3102, and step 3103 may be performed in a random sequence. Optionally, in this embodiment of this application, step 3103 may be periodically performed. In other words, the fourth communications device periodically sends the third indication information to indicate a slot processing status of the fourth communications device, for example, whether a FlexE client has been assigned or has not been assigned. There may be a relatively long time interval between step 3101 and step 3102. For example, step 3103 is performed after step 3101, and then step 3102 is performed. Therefore, after step 3101 is performed, that is, after the FlexE client is assigned to the slot of the fourth FlexE group, the third indication information is sent to another communications device. Therefore, the another communications device can also perform corresponding slot configuration based on the third indication information. In other words, after the another communications device performs corresponding slot configuration, the fourth communications device performs step 3102, that is, changes the user client to be associated with the FlexE client carried by the fourth FlexE group. In this way, a packet loss rate of the user client can be reduced.

In other words, in this embodiment of this application, the user client associated with a FlexE client carried by one FlexE group may be changed to be associated with a FlexE client carried by another FlexE group. Further, because the fourth communications device sends the third indication information, a foundation may be laid for switching the user client from one link to another link, that is, a foundation is laid for switching a service of the user client from one link to another link (or may be referred to as a protection switching function).

Optionally, the fifth communications device and the sixth communications device may be a same communications device, or may be different communications devices. For example, in a ring network, the fifth communications device and the sixth communications device may be different communications devices. In the ring network, a communications device is connected to communications devices on both sides of the communications device by using links corresponding to FlexE groups. The FlexE groups on both sides of the communications device may be referred to as FlexE groups in two directions, and there is one or more FlexE groups in either direction. FlexE groups in two directions of one communications device may be referred to as an east FlexE group and a west FlexE group. For example, the third FlexE group and the fourth FlexE group of the fourth communications device are FlexE groups in two directions, the third FlexE group may be referred to as the east FlexE group, and the fourth FlexE group may be referred to as the west FlexE group. Optionally, an association relationship between the third FlexE group and the fourth FlexE group may be preset. Therefore, when the user client associated with the third FlexE group needs to be migrated, the user client may be changed to be associated with the fourth FlexE group. Correspondingly, when the user client associated with the fourth FlexE group needs to be migrated, the user client may be changed to be associated with the third FlexE group. In another optional solution, when the user client associated with the third FlexE group needs to be migrated, the fourth FlexE group may be selected from all FlexE groups in a direction different from that corresponding to the third FlexE group. In other words, the third FlexE group and the fourth FlexE group are separately in two directions of the communications device, that is, the fifth communications device and the sixth communications device are two different communications devices.

In a linear network, the fifth communications device and the sixth communications device may be a same communications device. In other words, after the user client that is originally connected to the fifth communications device by using the link corresponding to the third FlexE group is changed to be associated with the FlexE client carried by the fourth FlexE group, the user client is connected to the fifth communications device by using the link corresponding to the fourth FlexE group. In an optional implementation, an association relationship between the third FlexE group and the fourth FlexE group may be preset. In another optional implementation, when the user client associated with the third FlexE group needs to be migrated, one FlexE group may be selected as the fourth FlexE group from all FlexE groups, except the third FlexE group, corresponding to a link between the fourth communications device and the fifth communications device.

In a possible solution for implementing step 3101 and step 3102, when a fault occurs on the link corresponding to the third FlexE group, the fourth communications device assigns the FlexE client to the slot of the fourth FlexE group, and changes the user client associated with the FlexE client carried by the third FlexE group to be associated with the FlexE client carried by the fourth FlexE group. In this way, a foundation may be laid for enabling, when a fault occurs on one link, another link to transmit information corresponding to the user client. The fourth communications device may be configured with a link detection function, and may detect whether a fault occurs on a link. For example, if the fourth communications device does not receive information by using the link corresponding to the third FlexE group in preset duration, the fourth communications device determines that a fault occurs on the link corresponding to the third FlexE group.

In another possible solution for implementing step 3101, when the fourth communications device receives a manual switching command, and the manual switching command includes a third FlexE group number, the fourth communications device assigns the FlexE client to the slot of the fourth FlexE group, and changes the user client associated with the FlexE client carried by the third FlexE group to be associated with the FlexE client carried by the fourth FlexE group. In this way, a transmission link of information corresponding to the user client may be changed, and flexibility of information transmission corresponding to the user client is improved. The fourth communications device may detect whether the manual switching command is received. The manual switching command may be manually entered, or may be generated by the fourth communications device or another communications device according to a specific communications policy, or the like. The manual switching command may include the third FlexE group number. Therefore, all user clients associated with the FlexE client carried by the third FlexE group may be changed to be associated with the FlexE client associated with the fourth FlexE group. Optionally, the manual switching command may include one or more user client identifiers. Therefore, user clients that are associated with the FlexE client carried by the third FlexE group and that are identified by the one or more user client identifiers may be changed to be associated with the FlexE client associated with the fourth FlexE group.

After step 3102, in an optional implementation, the fourth communications device changes the user client associated with the FlexE client carried by the fourth FlexE group to be associated with the FlexE client carried by the third FlexE group, and cancels the FlexE client that has been assigned to the slot of the fourth FlexE group. In other words, the fourth communications device establishes an association relationship between the user client and the FlexE client carried by the third FlexE group, and a previously established association relationship between the user client and the FlexE client carried by the fourth FlexE group is in an inactive state.

In a possible implementation solution, that the fourth communications device changes the user client associated with the FlexE client carried by the fourth FlexE group to be associated with the FlexE client carried by the third FlexE group, and cancels the FlexE client that has been assigned to the slot of the fourth FlexE group includes when the link corresponding to the third FlexE group is in a normal working state, changing, by the fourth communications device, the user client associated with the FlexE client carried by the fourth FlexE group to be associated with the FlexE client carried by the third FlexE group, and canceling the FlexE client that has been assigned to the slot of the fourth FlexE group. Therefore, a foundation is laid for restoring the link corresponding to the user client when a fault is rectified. The fourth communications device may be configured with a link detection function, and may detect whether a link is in the normal working state (that is, a fault rectified state). For example, if the fourth communications device receives information by using the link corresponding to the third FlexE group in preset duration, the fourth communications device determines that the link corresponding to the third FlexE group is in the normal working state.

In another possible implementation solution, that the fourth communications device changes the user client associated with the FlexE client carried by the fourth FlexE group to be associated with the FlexE client carried by the third FlexE group, and cancels the FlexE client that has been assigned to the slot of the fourth FlexE group includes if a manual switching cancelation command includes a fourth FlexE group number, changing the user client associated with the FlexE client carried by the fourth FlexE group to be associated with the FlexE client carried by the third FlexE group, and canceling the FlexE client that has been assigned to the slot of the fourth FlexE group. In this way, a transmission link of information corresponding to the user client may be changed, and flexibility of information transmission corresponding to the user client is improved. The fourth communications device may detect whether the manual switching cancelation command is received. The manual switching cancelation command may be manually entered, or may be generated by the fourth communications device or another communications device according to a specific communications policy, or the like. The manual switching cancelation command may include the fourth FlexE group number. Therefore, all user clients that are changed to be associated with the FlexE client carried by the fourth FlexE group in step 3101 may be changed back to be associated with the FlexE client associated with the third FlexE group. Optionally, the manual switching command may include one or more user client identifiers. Therefore, user clients that are changed to be associated with the FlexE client carried by the fourth FlexE group in step 3101 and that are identified by the one or more user client identifiers may be changed back to be associated with the FlexE client associated with the third FlexE group.

After step 3101 and before step 3103, in an optional implementation solution, the fourth communications device sends a first automatic protection switching (APS) protocol request to the fifth communications device by using the link corresponding to the fourth FlexE group. If the fourth communications device assigns the FlexE client to the slot of the fourth FlexE group, and changes the user client associated with the FlexE client carried by the third FlexE group to be associated with the FlexE client carried by the fourth FlexE group, a type of the first APS protocol request is a preset first type. If the fourth communications device cancels the FlexE client that has been assigned to the slot of the fourth FlexE group, and changes the user client associated with the FlexE client carried by the fourth FlexE group to be associated with the FlexE client carried by the third FlexE group, a type of the first APS protocol request is a preset second type.

In an optional implementation, when a slot assignment status of the fourth communications device changes and another communications device needs to adjust a slot assignment status along with the fourth communications device, the fourth communications device may send the first APS protocol request, and set the type of the first APS protocol request based on a change of the slot assignment status. If the slot assignment status of the fourth communications device changes, and another communications device does not need to adjust the slot assignment status along with the fourth communications device, the fourth communications device may not send an APS protocol request, or may send a first APS protocol request of another type different from the first type and the second type. Therefore, when a communications device that receives the first APS protocol request finds that the slot assignment status of the fourth communications device changes, the communications device does not need to adjust the slot assignment status along with the fourth communications device, for example, may not perform any processing, or may report this situation. Therefore, the solution may be more compatible with the prior art.

In another optional implementation, the first APS protocol request may be sent with a preset first period, and the third indication information may be sent with a preset second period. The first period is less than the second period. The third indication information may be associated with a latest first APS protocol request prior to the third indication information. Therefore, when receiving the third indication information, another communications device determines a type of a latest received first APS protocol request, and the another communications device may perform processing based on the type of the latest received first APS protocol request and the third indication information. Therefore, when the communications device that receives the third indication information finds that the slot assignment status of the fourth communications device changes, and the type of the latest received first APS protocol request instructs the communications device to perform slot adjustment based on the third indication information (for example, the type of the first APS protocol request is the first type or the second type), the communications device performs slot adjustment. If the communications device that receives the third indication information finds that the slot assignment status of the fourth communications device changes, and the type of the latest received first APS protocol request instructs the communications device not to perform slot adjustment based on the third indication information (for example, the first APS protocol request is of another type different from the first type and the second type, or the third indication information indicates slot assignment, but the first APS protocol request is of the preset second type, or the third indication information instructs to cancel the FlexE client that has been assigned to the slot, but the first APS protocol request is of the preset first type), the communications device does not perform slot adjustment based on the third indication information, or may not perform any processing. Further, optionally, the communications device may report this situation. Therefore, the solution may be more compatible with the prior art.

Optionally, the type of the first APS protocol request is the preset first type. In this case, another communications device that receives the third indication information also needs to perform a slot assignment operation. The first type may be a preset code shape. The type of the first APS protocol request is the preset second type. In this case, another communications device that receives the third indication information also needs to perform an operation of canceling the FlexE client that has been assigned to the slot. The second type may also be a preset code shape.

Optionally, the preset first type and the preset second type may be code shapes of different forms. For example, when the first APS protocol request of the first type is received, only a slot assignment operation is performed. Even if there is a case of canceling the FlexE client that has been assigned to the slot, an operation of canceling the FlexE client that has been assigned to the slot is not performed. Therefore, a more accurate command can be sent. Optionally, the preset first type and the preset second type may alternatively be code shapes of a same form. Therefore, when another communications device receives the first APS protocol request of the first type or the second type, the another communications device may perform an operation based on the third indication information. If the third indication information indicates both a slot assignment operation and an operation of canceling the FlexE client that has been assigned to the slot (for example, the third indication information indicates that a FlexE client has been assigned to a slot 0 and a slot 2 of the fourth FlexE group, and a FlexE client that has been assigned to a slot 3 and a slot 7 of the fourth FlexE group is canceled), the another communications device may perform both the slot assignment operation and the operation of canceling the FlexE client that has been assigned to the slot.

In a possible implementation solution, that the fourth communications device assigns a FlexE client to a slot of the fourth FlexE group, and changes a user client associated with a FlexE client carried by the third FlexE group to be associated with the FlexE client carried by the fourth FlexE group includes assigning, by the fourth communications device, the FlexE client to the slot of the fourth FlexE group, and after receiving a second APS protocol request sent by the fifth communications device, changing, by the fourth communications device, the user client associated with the FlexE client carried by the third FlexE group to be associated with the FlexE client carried by the fourth FlexE group. Optionally, after receiving the second APS protocol request sent by the fifth communications device, the fourth communications device learns that slot assignment may have been performed on a side of the fifth communications device. In this case, a packet loss rate can be reduced by changing the user client associated with the FlexE client carried by the third FlexE group to be associated with the FlexE client carried by the fourth FlexE group.

In the flexible Ethernet protocol, a fixed frame format may be constructed based on transmission of a physical port, and slot division based on time division multiplexing (TDM) is performed. FlexE slots may be divided at a granularity of 66B, and one slot granularity correspondingly carries one 64B/66B code block. For a 100GE PHY port, a data code block flow may include 64B/66B code blocks with a period of 20. The 100GE PHY port is corresponding to 20 slots, and a bandwidth of each slot is 5G, and is referred to as one slot. The 64B/66B in this embodiment of this application may be understood as a bit block of 64 bits and a code block of 66 bits obtained by encoding the bit block of 64 bits.

On the flexible Ethernet, a time division multiplexing frame structure may be constructed based on the 64B/66B code block. A FlexE overhead (overhead frame, OH) code block is periodically inserted into data on each PHY of the FlexE to implement alignment. For example, one 66B overhead code block FlexE OH may be inserted every 1023×20 66B payload data code blocks. For example, eight rows of (each row includes one OH code block and 1023×20 data) 66B code blocks form one protocol frame of the flexible Ethernet protocol. 32 protocol frames of the flexible Ethernet protocol may form one multiframe of the flexible Ethernet protocol.

In a possible implementation solution, in a first OH code block of the protocol frame of the flexible Ethernet protocol, a 0×4B field in bits 0 to 7 and a 0×5 field in bits 32 to 35 together form a frame header indication mark field of a FlexE frame overhead code block. Two management channels are defined in the FlexE OH. The management channels may be used to run two Ethernet protocol-based operation, administration and maintenance (OAM) communications links on which encoding is performed based on a 64B/66B code block sequence and that are at rates of 1.2 Mb/s and 1.8 Mb/s. Further, in this embodiment of this application, 64B/66B encoding may be used for a 100GE physical layer scenario.

According to the FlexE Implementation Agreement 1.0, on each PHY of one FlexE group, a 64B/66B code block of one FlexE overhead frame is sent to a remote-end PHY at an interval of 13.1 μs, and eight successively sent 64B/66B code blocks of the FlexE overhead frame form one FlexE overhead frame. In the FlexE, some fields in the overhead frame are defined to carry a FlexE calendar, and the calendar is synchronized to a PHY on a remote-end communications device by using the FlexE overhead frame, to ensure that the communications devices at both ends use the same FlexE calendar to receive and send a data flow corresponding to a FlexE client.

To be further compatible with the prior art, optionally, the third indication information and/or the first APS protocol request are/is carried in a FlexE overhead frame. Optionally, the second APS protocol request may also be carried in the FlexE overhead frame. Each port using the FlexE may periodically send a FlexE overhead frame. In an optional implementation, the first APS protocol request may be sent with a preset first period, and the third indication information may be sent with a preset second period. The first period is less than the second period. The third indication information and the first APS protocol request are carried in a FlexE overhead frame. Therefore, the FlexE overhead frame that includes the third indication information also includes the first APS protocol request. Therefore, a communications device that receives the FlexE overhead frame may determine, based on the first APS protocol request and the third indication information included in the same FlexE overhead frame, whether to perform slot assignment (for example, when the first APS protocol request is of the preset first type, and the third indication information indicates slot assignment), or to cancel the FlexE client that has been assigned to the slot (for example, when the first APS protocol request is of the preset second type, and the third indication information instructs to cancel the FlexE client that has been assigned to the slot), or not to perform any processing (for example, the first APS protocol request is of another type different from the first type and the second type, or the third indication information indicates slot assignment, but the first APS protocol request is of the preset second type, or the third indication information instructs to cancel the FlexE client that has been assigned to the slot, but the first APS protocol request is of the preset first type).

Optionally, because the fourth communications device is a communications device that detects a fault or initiates protection switching, the fourth communications device terminates the received APS protocol. To be specific, the fourth communications device recognizes the received second APS protocol request, and then does not perform processing such as update and then transmission, thereby preventing the APS protocol request from being excessively transmitted in a network.

The third indication information may be specifically presented in various manners. For example, in an optional implementation, for the slot in the N slots of the fourth FlexE group, the third indication information includes a FlexE client identifier corresponding to the slot or includes a non-assignment identifier. The FlexE client identifier corresponding to the slot is an identifier of the FlexE client assigned by the fourth communications device to the slot. The non-assignment identifier is used to indicate that the fourth communications device has not assigned the FlexE client to the slot. The non-assignment identifier may be a preset character string, for example, may be "0×00".

Table 1 is an example of a FlexE overhead frame. As shown in Table 1, for a first OH code block, bits 0 to 7 may carry 0×4B, a bit 8 may carry a FlexE calendar (Calendar, C), and may represent a FlexE calendar that is in use, where a calendar A or a calendar B is available, a bit 9 may carry an overhead frame multiframe identifier (Overhead Multiframe, OMF), and optionally, in one multiframe, OMF fields of first 16 overhead frames may be 0, and OMF fields of second 16 overhead frames may be 1, a bit 10 may carry a remote physical port fault (Remote PHY Fault, RPF), a bit 11 may carry a reserved field (Reserved, Res), that is, an unused field, bits 12-31 may carry a FlexE group number, bits 32-35 may carry 0×5, and bits 36-63 may carry 0×000_0000.

For a second OH code block, a bit 0 may carry C, bits 1 to 8 may carry a FlexE mapping table (FlexE Map), bits 9 to 16 may carry a FlexE number, and bits 17 to 63 may be reserved bits (Reserved).

For a third OH code block, a bit 0 may carry C, bits 1 to 16 may carry a client of a calendar A (Client calendar A), bits 17 to 32 may carry a client of a calendar B (Client calendar B), a bit 33 may carry CR, a bit 34 may carry CA, bits 35 to 47 may be Reserved, and bits 48 to 63 may carry CRC-16.

TABLE 1

| FlexE overhead frame | | | | | | | | | |
|---|---|---|---|---|---|---|---|---|---|
| First OH code block | Bits 0 to 7 | Bit 8 | Bit 9 | Bit 10 | Bit 11 | Bits 12 to 31 | Bits 32 to 35 | Bits 36 to 63 | |
| 1 | 0 0×4B | C | OMF | RPF | Res | FlexE Group Number | 0×5 | 0×000_0000 | |
| Second OH code block | Bit 0 | Bits 1 to 8 | Bits 9 to 16 | | | Bits 17 to 63 | | | |
| 0 | 1 | C | FlexE Map | FlexE Number | | | Reserved | | |
| Third OH code block | Bit 0 | Bits 1 to 16 | | | | Bits 17 to 32 | Bit 33 | Bit 34 | Bits 35 to 47 | Bits 48 to 63 |
| 0 | 1 | C | Client Calendar A | | | Client Calendar B | CR | CA | Reserved | CRC-16 |

Table 2 is an example of the client calendar A in the third OH code block in Table 1. As shown in Table 2, a corresponding slot assignment status may be carried in bits 1 to 16 in the third OH code block. For example, if a FlexE client is assigned to a slot 0, the calendar A in the bits 1 to 16 in the third OH code block corresponding to the slot 0 may be filled with an identifier of the FlexE client assigned to the slot 0. For another example, if a FlexE client is not assigned to a slot 1, the calendar A in the bits 1 to 16 in the third OH code block corresponding to the slot 1 may be filled with a non-assignment identifier, for example, "0×00" in the foregoing example.

TABLE 2

Client calendar A in a third OH code block in Table 1
Client carried calendar A slot 0 (a client
carried by a slot 0 in the calendar A)

Client carried calendar A slot 1
. . .
Client carried calendar A slot 15
Client carried calendar A slot 16
. . .
Client carried calendar A slot 19
Reserved
. . .
Reserved In an optional implementation, indication information (for example, the indication information may be the third indication information, or may be indication information such as first indication information and second indication information in the following content) may be carried in the bits 1 to 16 in the third OH code block, an APS protocol request (for example, the APS protocol request may be the first APS protocol request, or an APS protocol request such as a second APS protocol request in the following content, or may be an updated APS protocol request in the following content, such as an updated fifth APS protocol request) is carried in 2 bytes of the reserved bits of the bits 17 to 63 of the second OH code block and/or 13 bits of the reserved bits 35 to 47 of the third OH code block, or the APS protocol request may be carried by using another available region, where a size of the region is not limited to 2 bytes and/or 4 bytes, or the first APS protocol request may be carried in the bits 12 to 31 of the first OH code block.

Optionally, that the fourth communications device assigns a FlexE client to a slot of the fourth FlexE group, and changes a user client associated with a FlexE client carried by the third FlexE group to be associated with the FlexE client carried by the fourth FlexE group includes if the user client is associated with K slots of the third FlexE group, assigning, by the fourth communications device, the FlexE client to K slots in the N slots of the fourth FlexE group, where K is a positive integer not greater than N, and when K is greater than 1, FlexE client identifiers assigned by the fourth communications device to any two of the K slots of the fourth FlexE group are the same, and changing, by the fourth communications device, the user client associated with the FlexE client carried by the third FlexE group to be associated with the FlexE client assigned to the K slots of the fourth FlexE group. In other words, when the user client associated with one FlexE group is changed to be associated with another FlexE group, a quantity of slots associated with the user client may be the same. In this way, a service transmission status of the user client whose association is changed basically remains unchanged. Further, optionally, when K is greater than 1, FlexE client identifiers assigned by the fourth communications device to any two of the K slots of the fourth FlexE group are the same. Further, optionally, an identifier of the FlexE client that is carried by the third FlexE group and that is associated with the user client is different from an identifier of the FlexE client that is carried by the fourth FlexE group and that is associated with the user client. Further, optionally, the identifier of the FlexE client that is carried by the fourth FlexE group and that is associated with the user client may be unique in an entire network. The entire network may be a ring network or a linear network in which the FlexE client is located.

Optionally, an identifier may be assigned to a newly-established FlexE client according to some preset rules, for example, may be generated based on the identifier of the FlexE client that is carried by the third FlexE group and that is associated with the user client before the association change. Therefore, corresponding communications devices at both ends of the third FlexE group can assign a same FlexE client identifier to a new FlexE client.

In an optional implementation, slots of one FlexE group may be divided into working slots and guard periods. The working slots are used to transmit a service that is in a normal working state, and the guard periods may be used for standby. There are many division manners. For example, 20 slots corresponding to one PHY of one FlexE group may be divided into some working slots and some guard periods, or for one FlexE group, slots corresponding to several PHYs may be classified as working slots, and slots corresponding to other PHYs may be classified as guard periods. When one FlexE group includes a plurality of PHYs, there is a rank on each PHY. This rank may be preset, for example, may be determined based on an identifier number, a location, or other information about a port. 20 slots corresponding to each PHY may have one rank in time order. Therefore, in other words, there is a rank for each working slot in a working slot set corresponding to one FlexE group, there is a rank for each guard period in a guard period set corresponding to one FlexE group, and a rank of a slot may be determined together by a rank of a PHY corresponding to the slot and a sequence of the slot. For example, if a PHY A ranks prior to a PHY B, and a time of a slot 0 is greater than that of a slot 2, a slot 0 of the PHY A ranks prior to a slot 2 of the PHY A, and the slot 2 of the PHY A ranks prior to a slot 0 of the PHY B.

Optionally, two FlexE groups may be preset to provide protection mutually. For example, the third FlexE group and the fourth FlexE group may be preset to provide protection mutually. Therefore, when a fault occurs on the link corresponding to the third FlexE group, information corresponding to a working slot of the third FlexE group may be transmitted in a guard period of the fourth FlexE group. Correspondingly, when a fault occurs on the link corresponding to the fourth FlexE group, information corresponding to a working slot of the fourth FlexE group may be transmitted in a guard period of the third FlexE group. Therefore, a quantity of guard periods of the third FlexE group needs to be not less than a quantity of working slots of the fourth FlexE group, and a quantity of guard periods of the fourth FlexE group needs to be not less than a quantity of working slots of the third FlexE group.

In an optional implementation, the third FlexE group includes $M_{31}$ working slots and $M_{32}$ guard periods, where $(M_{31}+M_{32})$ is a positive integer not greater than N, and $M_{31}$ is a positive integer not less than K. The fourth FlexE group includes $M_{41}$ working slots and $M_{42}$ guard periods, where ($M_{41}+M_{42}$) is a positive integer not greater than N, $M_{42}$ is a positive integer not less than K, $M_{42}$ is not less than $M_{31}$, and $M_{32}$ is not less than $M_{41}$.

Optionally, if the user client is associated with K slots of the third FlexE group, the assigning, by the fourth communications device, the FlexE client to K slots in the N slots of the fourth FlexE group includes if the user client is associated with K slots in the $M_{31}$ working slots of the third FlexE group, assigning, by the fourth communications device, the FlexE client to K slots in the $M_{42}$ guard periods of the fourth FlexE group. In this embodiment of this application, the guard periods are usually not used, and are used only as standby slots for processing. For example, the guard periods may be used when a fault occurs or FlexE group association of the user client needs to be changed. Therefore, an original service transmitted in the working slots of the fourth FlexE group may not be affected, and further, a service of the user client whose association is changed from the third FlexE group to the fourth FlexE group may be transmitted in the guard periods.

Further, optionally, the K slots of the third FlexE group are in a one-to-one correspondence with the K slots of the fourth FlexE group. For a slot in the K slots of the fourth FlexE group, a rank of the slot in the $M_{42}$ guard periods is the same as a rank, of a slot that is corresponding to the slot and that is in the K slots of the third FlexE group, in the $M_{31}$ working slots. For example, if the K slots of the third FlexE group that are associated with the user client rank the first and the third in a working slot set of the third FlexE group, the K slots of the fourth FlexE group with which the user client is changed to be associated rank the first and the third in a guard period set of the fourth FlexE group. Therefore, the communications device can determine a guard period according to the rule, so that a simple solution can be used to implement a correspondence between a slot before an association change and a slot after the association change.

Figure 7:
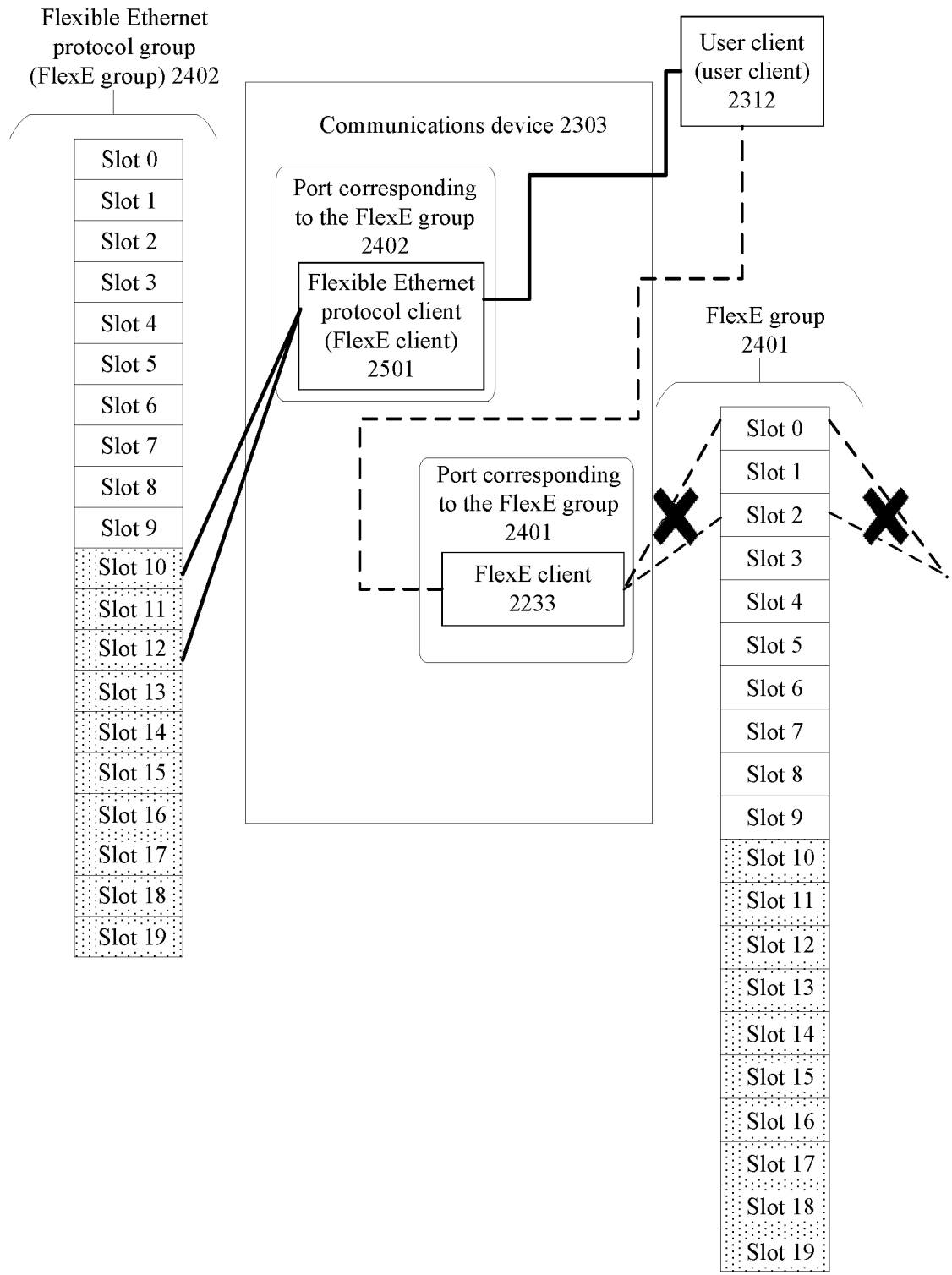
FIG. 7 is a schematic structural diagram of a fourth communications device according to an embodiment of this application.

FIG. 7 is an example of a schematic structural diagram of a fourth communications device according to an embodiment of this application. As shown in FIG. 7, description is provided by using an example in which the fourth communications device is the communications device 2303 in FIG. 5B, a corresponding fifth communications device may be the communications device 2304 in FIG. 5A, and a sixth communications device may be the communications device 2302 in FIG. 5B. A fourth FlexE group is the FlexE group 2402 in FIG. 5A, and a third FlexE group is the FlexE group 2401 in FIG. 5B. A user client is the user client 2312 in FIG. 5B.

As shown in FIG. 7, the user client 2312 is connected to the communications device 2302 by using a link corresponding to the FlexE group 2401, and the user client is associated with a FlexE client 2233 carried by the FlexE group 2401, and the FlexE client 2233 carried by the FlexE group 2401 occupies a slot 0 and a slot 2 of the FlexE group 2401. In the example, each FlexE group includes 20 slots, where a slot 0 to a slot 9 are classified as working slots, and a slot 10 to slot 19 are classified as guard periods. Optionally, slot division manners of different FlexE groups may be different. For example, for one FlexE group, a slot 4 to a slot 12 may be classified as working slots, and the other slots may be classified as guard periods, for another FlexE group, a slot 0 to a slot 9 may be classified as working slots, and a slot 10 to a slot 19 may be classified as guard periods.

The user client 2312 transmits information by using the slot 0 and the slot 2 assigned to the FlexE client 2233 carried by the FlexE group 2401, and the communications device 2303 detects that a fault occurs on the link corresponding to the FlexE group 2401 between the communications device 2303 and the communications device 2302. For example, it may be determined, when information sent by the communications device 2302 is not received by using the link corresponding to the FlexE group 2401 in preset duration, that a fault occurs on the link corresponding to the FlexE group 2401 between the communications device 2303 and the communications device 2302 (that is, information cannot be transmitted in the slot 0 and the slot 2 occupied by the FlexE client 2233). Optionally, the communications device may have a link detection function, for example, may perform fault detection by using an OAM unit. In this embodiment of this application, optionally, the communications device may detect an alarm status (including a loss of signal (LOS), a local fault (LF), a high bit error rate (High BER) (where the high bit error rate indicates that most of transmitted bits are error bits), loss locking, and the like) of a FlexE group layer and/or a PHY port.

As shown in FIG. 7, the communications device 2303 assigns a FlexE client to a slot of the FlexE group 2402. Optionally, a quantity of assigned slots is the same as a quantity of slots corresponding to the user client 2312 in the FlexE group 2401. As shown in FIG. 7, a FlexE client 2501 is assigned to a slot 10 and a slot 12. The slot 10 of the FlexE group 2402 is corresponding to the slot 0 of the FlexE group 2401. The slot 0 of the FlexE group 2401 ranks the first in all working slots of the FlexE group 2401, and the slot 10 of the FlexE group 2402 also ranks the first in all guard periods of the FlexE group 2402. The slot 12 of the FlexE group 2402 is corresponding to the slot 2 of the FlexE group 2401. The slot 2 of the FlexE group 2401 ranks the third in all the working slots of the FlexE group 2401, and the slot 12 of the FlexE group 2402 also ranks the third in all the guard periods of the FlexE group 2402. Optionally, an identifier of the assigned FlexE client 2501 may be unique in an entire network.

After the communications device 2303 assigns the FlexE client 2501 to the slot 10 and the slot 12 of the FlexE group 2402, a type of a sent first APS protocol is a preset first type, and in sent third indication information, the slot 10 is corresponding to the identifier of the FlexE client 2501, and the slot 12 is corresponding to the identifier of the FlexE client 2501. Specifically, a pair of relationships between the slot 10 and the identifier of the FlexE client 2501 and between the slot 12 and the identifier of the FlexE client 2501 may be established. The corresponding slot 10 and slot 12 are found from a FlexE overhead frame of the FlexE group 2402, and "0x00" (0x00 may be defined as a "non-assignment identifier") corresponding to the slot 10 and the slot 12 is updated to the identifier of the FlexE client 2501.

Optionally, an association relationship between the user client 2312 and the FlexE client 2501 may be established after a second APS protocol sent by the communications device 2304 is received. In other words, an association relationship between the user client 2312 and the FlexE client 2233 is canceled. Therefore, information about the user client 2312 is transmitted in the slot 10 and the slot 12 on a link corresponding to the FlexE group 2402. Optionally, because the communications device 2303 is a node that detects a fault or initiates protection switching (receives a manual switching command), the communications device 2303 terminates the received second APS protocol, that is, no longer updates and sends the second APS protocol.

Further, optionally, if the communications device 2303 detects that the fault on the link corresponding to the FlexE group 2401 is rectified, the user client 2312 may be changed to be associated with the FlexE client 2233 carried by the FlexE group 2401, or in other words, the association relationship between the user client 2312 and the FlexE client 2501 carried by the FlexE group 2402 may be canceled, and the FlexE client 2501 that has been assigned to the slot 10 and the slot 12 of the FlexE group 2402 may be canceled. Therefore, after the fault on the link corresponding to the FlexE group 2401 is rectified, a service of the user client 2312 may still be transmitted by using the original link. Optionally, a wait to restore may be pre-configured on the communications device. A timer is started if no fault occurs in the wait to restore after the fault disappears or it is detected that the fault disappears. If a time of the timer is greater than the wait to restore, and no more faults occur on the link corresponding to the FlexE group 2401 during startup of the timer, i the communications device 2303 detects that the fault on the link corresponding to the FlexE group 2401 is rectified. Therefore, a quantity of times of misjudging fault rectification may be reduced, so that a quantity of misoperations for the user client is reduced.

After the communications device 2303 cancels the FlexE client 2501 that has been assigned to the slot 010 and the slot 12 of the FlexE group 2402, the corresponding slot 010 and slot 12 may be found from the FlexE overhead frame of the FlexE group 2402, and the identifier of the FlexE client 2501 corresponding to the slot 010 and the slot 12 is updated to "0×00" (0×00 may be defined as a "non-assignment identifier").

Figure 8:
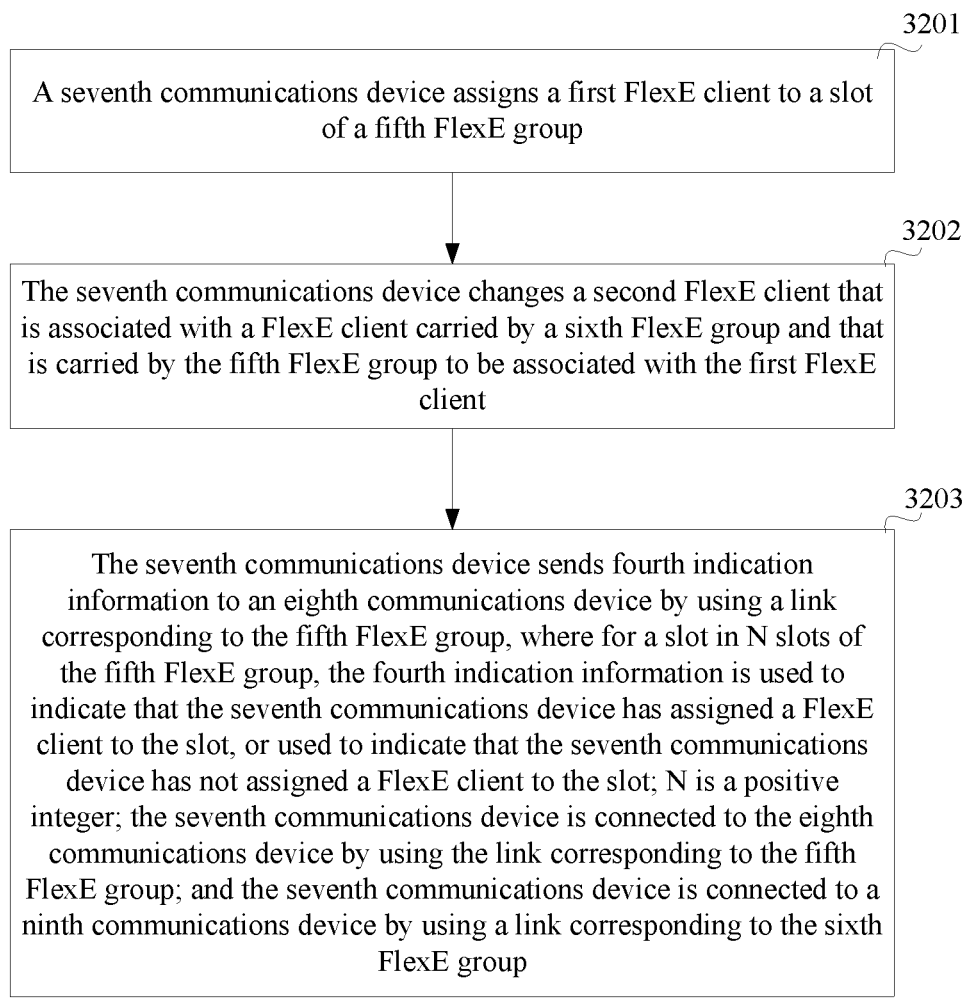
FIG. 8 is a schematic flowchart of another flexible Ethernet protocol FlexE network-based communication method according to an embodiment of this application.

Based on the foregoing content and the same concept, FIG. 8 is an example of a schematic flowchart of a flexible Ethernet protocol FlexE network-based communication method according to an embodiment of this application. A seventh communications device that performs the communication method may be a communications device that is located between two communications devices associated with a user client and that detects that a link corresponding to a FlexE group at one end is faulty, or the seventh communications device that performs the communication method may be a communications device that is located between two communications devices associated with the user client and that receives a manual switching command. The manual switching command requires changing information that originally needs to be transmitted by using a link corresponding to a sixth FlexE group to be transmitted by using a link corresponding to a fifth FlexE group. In this case, the manual switching command may include a sixth FlexE group number. For example, the seventh communications device may be the communications device 2302 in FIG. 5B, a ninth communications device may be the communications device 2303 in FIG. 5B, and an eighth communications device may be the communications device 2301 in FIG. 5A. The sixth FlexE group in the communication method may be the FlexE group 2401 in FIG. 5B, and the fifth FlexE group may be the FlexE group 2404 in FIG. 5A. As shown in FIG. 8, the method includes the following steps.

Step 3201: The seventh communications device assigns a first FlexE client to a slot of the fifth FlexE group.

Step 3202: The seventh communications device changes a second FlexE client that is associated with a FlexE client carried by the sixth FlexE group and that is carried by the fifth FlexE group to be associated with the first FlexE client. In other words, an association relationship between the first FlexE client and the second FlexE client is established, and a previously established association relationship between the second FlexE client and the FlexE client carried by the sixth FlexE group is in an inactive state. Optionally, one FlexE group may carry one or more FlexE clients. For example, the second FlexE client may be any FlexE client that is associated with the FlexE client carried by the sixth FlexE group and that is carried by the fifth FlexE group.

Step 3203: The seventh communications device sends fourth indication information to the eighth communications device by using a link corresponding to the fifth FlexE group, where for a slot in N slots of the fifth FlexE group, the fourth indication information is used to indicate that the seventh communications device has assigned a FlexE client to the slot, or used to indicate that the seventh communications device has not assigned a FlexE client to the slot, N is a positive integer, the seventh communications device is connected to the eighth communications device by using the link corresponding to the fifth FlexE group, and the seventh communications device is connected to the ninth communications device by using a link corresponding to the sixth FlexE group.

Step 3201, step 3202, and step 3203 may be performed in a random sequence. Optionally, in this embodiment of this application, step 3203 may be periodically performed. In other words, the seventh communications device periodically sends the fourth indication information to indicate a slot processing status of the seventh communications device, for example, whether a FlexE client has been assigned or has not been assigned. There may be a relatively long time interval between step 3201 and step 3202. For example, step 3203 is performed after step 3201, and then step 3202 is performed. Therefore, after step 3201 is performed, that is, after the FlexE client is assigned to the slot of the fifth FlexE group, the fourth indication information is sent to another communications device. Therefore, the another communications device can also perform corresponding slot configuration based on the fourth indication information. In other words, after the another communications device performs corresponding slot configuration, the seventh communications device performs step 3202. In this way, a packet loss rate of a user client can be reduced.

In other words, in this embodiment of this application, information that is received by using the link corresponding to the fifth FlexE group may be sent by using the link corresponding to the fifth FlexE group, to implement information loopback on the seventh communications device. Further, because the seventh communications device sends the fourth indication information, a foundation may be laid for switching from one link to another link.

In step 3201 and step 3202, in an optional implementation, that the seventh communications device assigns a first FlexE client to a slot of the fifth FlexE group, and changes a second FlexE client that is associated with a FlexE client carried by the sixth FlexE group and that is carried by the fifth FlexE group to be associated with the first FlexE client includes when a fault occurs on the link corresponding to the sixth FlexE group, assigning, by the seventh communications device, the first FlexE client to the slot of the fifth FlexE group, and changing the second FlexE client that is associated with the FlexE client carried by the sixth FlexE group and that is carried by the fifth FlexE group to be associated with the first FlexE client. Optionally, for related content that the seventh communications device detects that a fault occurs on the link, refer to the foregoing content that the fourth communications device detects that a fault occurs on the link, details are not described herein again. Optionally, an association relationship between the sixth FlexE group and the fifth FlexE group may be preset on the seventh communications device. The sixth FlexE group and the fifth FlexE group may be referred to as protection groups of each other. When a fault occurs on the link corresponding to the sixth FlexE group, information that originally needs to be transmitted by using the link corresponding to the sixth FlexE group is transmitted by using the link corresponding to the fifth FlexE group. Correspondingly, when a fault occurs on the link corresponding to the fifth FlexE group, information that originally needs to be transmitted by using the link corresponding to the fifth FlexE group is transmitted by using the link corresponding to the sixth FlexE group.

After step 3202, in an optional implementation, the seventh communications device changes the second FlexE client associated with the first FlexE client to be associated with the FlexE client carried by the sixth FlexE group, and cancels the first FlexE client that has been assigned to the slot of the fifth FlexE group. Therefore, a foundation is laid for restoring an original service link when a fault is rectified.

Optionally, that the seventh communications device changes the second FlexE client associated with the first FlexE client to be associated with the FlexE client carried by the sixth FlexE group, and cancels the first FlexE client that has been assigned to the slot of the fifth FlexE group includes when the link corresponding to the sixth FlexE group is in a normal working state, changing, by the seventh communications device, the second FlexE client associated with the first FlexE client to be associated with the FlexE client carried by the sixth FlexE group, and canceling the first FlexE client that has been assigned to the slot of the fifth FlexE group.

In an optional implementation, after step 3201 and before step 3203, the method further includes sending, by the seventh communications device, a third APS protocol request to the eighth communications device by using the link corresponding to the fifth FlexE group, where if the seventh communications device assigns the first FlexE client to the slot of the fifth FlexE group, and changes the second FlexE client that is associated with the FlexE client carried by the sixth FlexE group and that is carried by the fifth FlexE group to be associated with the first FlexE client, a type of the third APS protocol request is a preset first type, or if the seventh communications device cancels the first FlexE client that has been assigned to the slot of the fifth FlexE group, and changes the second FlexE client associated with the first FlexE client to be associated with the FlexE client carried by a sixth FlexE group, a type of the third APS protocol request is a preset second type. For the preset first type and the preset second type, refer to the foregoing content, details are not described herein again.

Optionally, the third APS protocol request sent by the seventh communications device and the first APS protocol request and the second APS protocol request in the foregoing content are all APS protocol-based information, and may be collectively referred to as an APS protocol request. The first, second, and third are only used for differentiation, and are not intended for limitation. A manner in which the seventh communications device sets the type of the third APS protocol request is similar to the foregoing manner in which the fourth communications device sets the type of the first APS protocol request, and details are not described herein again.

Optionally, the seventh communications device may receive a fourth APS protocol request sent from the eighth communications device. Optionally, because the seventh communications device is a communications device that detects a fault or initiates protection switching, the seventh communications device terminates the received APS protocol. To be specific, the seventh communications device recognizes the received fourth APS protocol request, and then does not perform processing such as update and then transmission, thereby preventing the APS protocol request from being excessively transmitted in the network.

The fourth indication information and/or the third APS protocol request are/is carried in a FlexE overhead frame. The fourth APS protocol request may also be carried in the FlexE overhead frame. For a manner of sending the third APS protocol request, refer to the foregoing manner of sending the first APS protocol request. For a manner of sending the fourth indication information, refer to the foregoing manner of sending the third indication information.

Optionally, for the slot in the N slots of the fifth FlexE group, the fourth indication information includes a FlexE client identifier corresponding to the slot or includes a non-assignment identifier. The FlexE client identifier corresponding to the slot is an identifier of the FlexE client assigned by the seventh communications device to the slot. The non-assignment identifier is used to indicate that the seventh communications device has not assigned the FlexE client to the slot. For the non-assignment identifier and the FlexE client identifier, refer to the foregoing content. In other words, when the second FlexE client associated with a FlexE client carried by one FlexE group is changed to be associated with a FlexE client carried by another FlexE group, a quantity of slots assigned to the FlexE client associated with the second FlexE client may be the same. In this way, a service transmission status of the user client whose association is changed basically remains unchanged. Optionally, if the second FlexE client is assigned to K slots of the fifth FlexE group, the seventh communications device assigns the first FlexE client to K slots in the N slots of the fifth FlexE group, where K is a positive integer not greater than N, and when K is greater than 1, FlexE client identifiers assigned by the seventh communications device to any two of the K slots of the fifth FlexE group are the same, and the seventh communications device changes the second FlexE client that is associated with the FlexE client carried by the sixth FlexE group and that is carried by the fifth FlexE group to be associated with the first FlexE client.

Optionally, an identifier may be assigned to a newly-established FlexE client according to some preset rules, for example, may be generated based on an identifier of the FlexE client that is carried by the sixth FlexE group and that is associated with the user client before the association change. Therefore, corresponding communications devices at both ends of the sixth FlexE group can assign a same FlexE client identifier to a new FlexE client. For example, if the ninth communications device is the fourth communications device, the foregoing assigned identifier of the FlexE client that is carried by the fourth FlexE group and that is associated with the user client is the same as the identifier of the newly established first FlexE client. Optionally, the identifier of the first FlexE client may be unique in an entire network. The entire network may be a ring network or a linear network in which the FlexE client is located.

In an optional implementation, slots of one FlexE group may be divided into working slots and guard periods. The working slots are used to transmit a service that is in a normal working state, and the guard periods may be used for standby. For a specific slot division manner, refer to the foregoing content. The sixth FlexE group includes $M_{61}$ working slots and $M_{62}$ guard periods, where $(M_{61}+M_{62})$ is a positive integer not greater than N, and $M_{61}$ is a positive integer not less than K, and the fifth FlexE group includes $M_{51}$ working slots and $M_{52}$ guard periods, where $(M_{51}+M_{52})$ is a positive integer not greater than N, $M_{52}$ is a positive integer not less than K, $M_{52}$ is not less than $M_{61}$, and $M_{62}$ is not less than $M_{51}$.

Optionally, the fifth FlexE group and the sixth FlexE group are preset to provide protection mutually. Therefore, when a fault occurs on the link corresponding to the fifth FlexE group, information that originally needs to be transmitted in a working slot of the fifth FlexE group may be transmitted in a guard period of the sixth FlexE group. Correspondingly, when a fault occurs on the link corresponding to the sixth FlexE group, information that originally needs to be transmitted in a working slot of the sixth FlexE group may be transmitted in a guard period of the fifth FlexE group. In this way, a quantity of guard periods of the fifth FlexE group needs to be not less than a quantity of working slots of the sixth FlexE group, and a quantity of guard periods of the sixth FlexE group needs to be not less than a quantity of working slots of the fifth FlexE group.

Optionally, if the second FlexE client is assigned to K slots of the fifth FlexE group, that the seventh communications device assigns the first FlexE client to K slots in the N slots of the fifth FlexE group includes if the second FlexE client is assigned to K slots in the $M_{51}$ working slots of the fifth FlexE group, assigning, by the seventh communications device, the first FlexE client to K slots in the $M_{52}$ guard periods of the fifth FlexE group.

Optionally, the K slots of the fifth FlexE group for carrying the second FlexE client are in a one-to-one correspondence with the K slots of the fifth FlexE group for carrying the first FlexE client, and for a slot in the K slots of the fifth FlexE group for carrying the first FlexE client, a rank of the slot in the $M_{52}$ guard periods is the same as a rank, of a slot that is corresponding to the slot and that is in the K slots of the fifth FlexE group for carrying the second FlexE client, in the $M_{51}$ working slots. In this embodiment of this application, the guard periods are usually not used, and are used only as standby slots for processing. For example, the guard periods may be used when a fault occurs or association of the FlexE client needs to be changed. Therefore, an original service transmitted in the working slots of the fifth FlexE group may not be affected, and further, a service whose association is changed from the sixth FlexE group to the fifth FlexE group may be transmitted in the guard periods.

Figure 9:
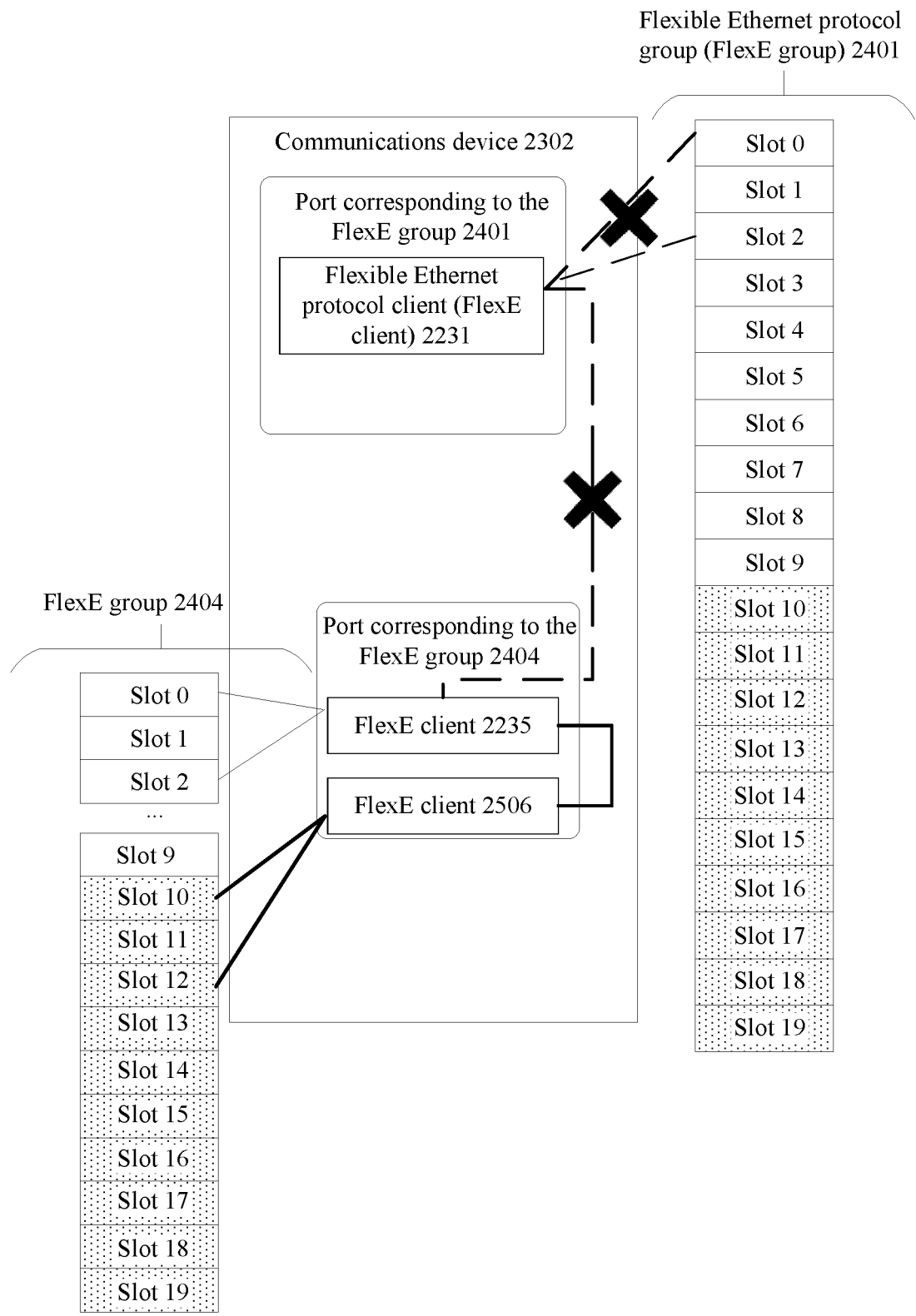
FIG. 9 is a schematic structural diagram of a seventh communications device according to an embodiment of this application.

FIG. 9 is an example of a schematic structural diagram of a seventh communications device according to an embodiment of this application. As shown in FIG. 9, description is provided by using an example in which the seventh communications device is the communications device 2302 in FIG. 5B, a corresponding eighth communications device may be the communications device 2301 in FIG. 5A, and a ninth communications device may be the communications device 2303 in FIG. 5B. A fifth FlexE group is the FlexE group 2404 in FIG. 5A, and a sixth FlexE group is the FlexE group 2401 in FIG. 5B.

As shown in FIG. 9, the communications device 2302 is connected to the communications device 2303 by using the FlexE group 2401, and the communications device 2302 is connected to the communications device 2301 by using the FlexE group 2404. The FlexE group 2401 and the FlexE group 2404 are associated by using a carried FlexE client. A second FlexE client is a FlexE client 2235 in FIG. 9. The FlexE client 2235 is associated with a FlexE client 2231. Information may be input by using a slot 0 and a slot 2 corresponding to the FlexE client 2235 carried by the FlexE group 2404, and output by using a slot 0 and a slot 2 corresponding to the FlexE client 2231 carried by the FlexE group 2401. Alternatively, information may be input by using the slot 0 and the slot 2 corresponding to the FlexE client 2231 carried by the FlexE group 2401, and output by using the slot 0 and the slot 2 corresponding to the FlexE client 2235 carried by the FlexE group 2404. In the example, each FlexE group includes 20 slots, where a slot 0 to a slot 9 are classified as working slots, and a slot 10 to slot 19 are classified as guard periods. Optionally, slot division manners of different FlexE groups may be different. For example, for one FlexE group, a slot 4 to a slot 12 may be classified as working slots, and the other slots may be classified as guard periods, for another FlexE group, a slot 0 to a slot 9 may be classified as working slots, and a slot 10 to a slot 19 may be classified as guard periods.

If the communications device 2302 detects that a fault occurs on a link corresponding to the FlexE group 2401 between the communications device 2302 and the communications device 2303, reference may be made to the foregoing content for a determining manner. As shown in FIG. 9, the communications device 2302 assigns a FlexE client to a slot of the FlexE group 2404. Optionally, a quantity of assigned slots is the same as a quantity of slots, corresponding to the FlexE client 2235, in the FlexE group 2401. As shown in FIG. 9, the FlexE client 2506 is assigned to the slot 10 and the slot 12. The FlexE client 2506 is the first FlexE client.

The slot 10 of the FlexE group 2404 is corresponding to the slot 0 of the FlexE group 2404. The slot 0 of the FlexE group 2404 ranks the first in all working slots of the FlexE group 2404, and the slot 10 of the FlexE group 2404 also ranks the first in all guard periods of the FlexE group 2404. The slot 12 of the FlexE group 2404 is corresponding to the slot 2 of the FlexE group 2404. The slot 2 of the FlexE group 2404 ranks the third in all the working slots of the FlexE group 2404, and the slot 12 of the FlexE group 2404 also ranks the third in all the guard periods of the FlexE group 2404. Optionally, an identifier of the assigned FlexE client 2506 may be unique in an entire network. Optionally, the identifier of the FlexE client 2506 is the same as the identifier of the FlexE client 2501 that is corresponding to the FlexE group 2402 and that is assigned by the communications device 2303 in FIG. 7. For example, both the communications device 2303 and the communications device 2302 generate a FlexE client identifier based on the link corresponding to the FlexE group 2401. Optionally, because the communications device 2302 is connected to the communications device 2303 by using the link corresponding to the FlexE group 2401, an identifier of the FlexE client 2233 that is carried by the FlexE group 2401 of the communications device 2303 in FIG. 7 and that occupies the slot 0 and the slot 2 of the FlexE group 2401 may be the same as an identifier of the FlexE client 2231 that is carried by the FlexE group 2401 of the communications device 2302 in FIG. 9 and that occupies the slot 0 and the slot 2 of the FlexE group 2401.

After the communications device 2302 assigns the FlexE client 2506 to the slot 10 and the slot 12 of the FlexE group 2404, a type of a sent third APS protocol is a preset first type, and in sent fourth indication information, the slot 10 is corresponding to the identifier of the FlexE client 2506, and the slot 12 is corresponding to the identifier of the FlexE client 2506. Specifically, a pair of relationships between the slot 10 and the identifier of the FlexE client 2506 and between the slot 12 and the identifier of the FlexE client 2506 may be established. The corresponding slot 10 and slot 12 are found from a FlexE overhead frame of the FlexE group 2404, and "0×00" (0×00 may be defined as a "non-assignment identifier") corresponding to the slot 10 and the slot 12 is updated to the identifier of the FlexE client 2506.

Further, an association relationship between the FlexE client 2506 and the FlexE client 2235 is established. Optionally, the association relationship between the FlexE client 2506 and the FlexE client 2235 may be established after a fourth APS protocol request sent by the communications device 2301 is received. In other words, an association relationship between the FlexE client 2235 and the FlexE client 2231 is canceled. Therefore, the information that originally needs to be transmitted in the slots corresponding to the FlexE client 2231 is transmitted by using the FlexE client 2506. Optionally, because the communications device 2302 is a node that detects a fault or initiates protection switching (receives a manual switching command), the communications device 2302 terminates the received fourth APS protocol, that is, no longer updates and sends the fourth APS protocol request.

Further, optionally, if the communications device 2302 detects that the fault on the link corresponding to the FlexE group 2401 is rectified, the association relationship between the FlexE client 2235 and the FlexE client 2231 may be established, that is, the association relationship between the FlexE client 2506 and the FlexE client 2235 is canceled, and the FlexE client 2506 assigned to the slot 10 and the slot 12 of the FlexE group 2404 is canceled. Therefore, the original link may be restored after the fault on the link corresponding to the FlexE group 2401 is rectified. Optionally, a wait to restore may be pre-configured on the communications device. A timer is started if no fault occurs in the wait to restore after the fault disappears or it is detected that the fault disappears. If a time of the timer is greater than the wait to restore, and no more faults occur on the link corresponding to the FlexE group 2401 during startup of the timer, i the communications device 2303 detects that the fault on the link corresponding to the FlexE group 2401 is rectified. Therefore, a quantity of times of misjudging fault rectification may be reduced, so that a quantity of misoperations for the user client is reduced.

After the communications device 2302 cancels the FlexE client 2506 that has been assigned to the slot 10 and the slot 12 of the FlexE group 2404, the corresponding slot 010 and slot 12 may be found from the FlexE overhead frame of the FlexE group 2404, and the identifier of the FlexE client 2506 corresponding to the slot 10 and the slot 12 is updated to "0x00" (0x00 may be defined as a "non-assignment identifier").

In this embodiment of this application, in duration of the fault and in the wait to restore after the fault disappears, the sent APS protocol request and FlexE calendar information may be used to maintain a protection switching function. For example, in duration of the fault and in the wait to restore after the fault disappears, a protection switching function is started in a manner such as a manner of assigning the FlexE client to the slot, and the started protection switching function is maintained (that is, after a service of the user client is migrated from an active link to a standby link). "APS information of do not revert (Do No Revert)" may be carried in the periodically sent FlexE overhead frame. For example, a specified code shape is used to represent the "APS information of do not revert (Do No Revert)". Optionally, FlexE calendar information after the protection switching may be continued to be sent in Calendar information (in other words, after the FlexE client is assigned to the slot, indication information may be periodically sent subsequently. The periodically sent indication information indicates information that the FlexE client has been assigned to the slot).

Figure 10:
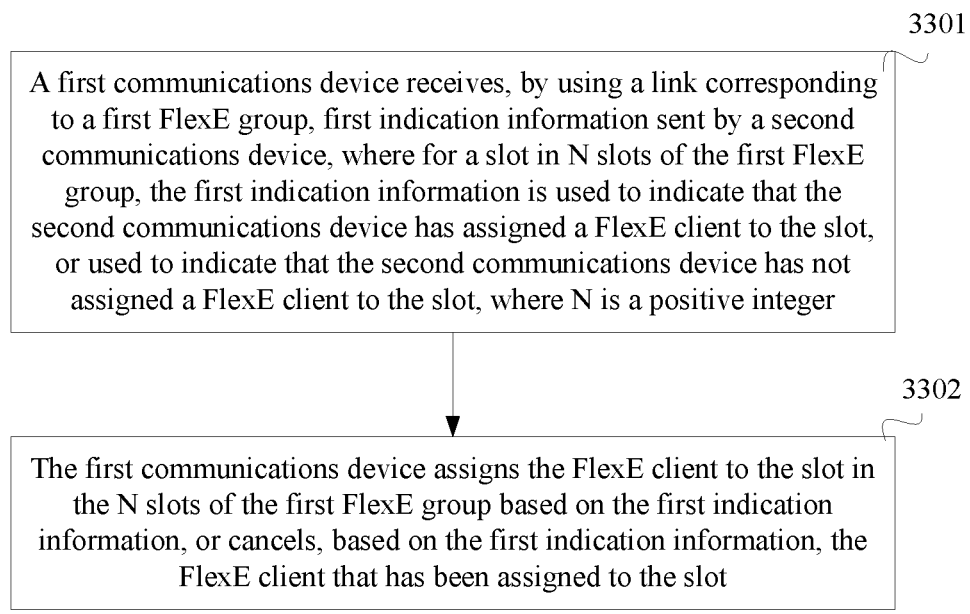
FIG. 10 is a schematic flowchart of another flexible Ethernet protocol FlexE network-based communication method according to an embodiment of this application.

Based on the foregoing content and the same concept, FIG. 10 is an example of a schematic flowchart of another flexible Ethernet protocol FlexE network-based communication method according to an embodiment of this application. A first communications device that performs the communication method may be a communications device that detects that no fault occurs on a link corresponding to a FlexE group at one end, or the first communications device that performs the communication method may be a communications device that does not receive a manual switching command. For example, the first communications device may be the communications device 2304 in FIG. 5A. In this case, a second communications device may be the communications device 2303 in FIG. 5B, and a third communications device may be the communications device 2301 in FIG. 5A. In the communication method, a first FlexE group may be the FlexE group 2402 in FIG. 5A, and a second FlexE group may be the FlexE group 2403 in FIG. 5A.

For another example, the first communications device may be the communications device 2304 in FIG. 5A. In this case, the second communications device may be the communications device 2301 in FIG. 5A, and the third communications device may be the communications device 2303 in FIG. 5B. In the communication method, the first FlexE group may be the FlexE group 2403 in FIG. 5A, and the second FlexE group may be the FlexE group 2402 in FIG. 5A.

For another example, the first communications device may be the communications device 2301 in FIG. 5A. In this case, the second communications device may be the communications device 2304 in FIG. 5A, and the third communications device may be the communications device 2302 in FIG. 5B. In the communication method, the first FlexE group may be the FlexE group 2403 in FIG. 5A, and the second FlexE group may be the FlexE group 2404 in FIG. 5A.

For another example, the first communications device may be the communications device 2301 in FIG. 5A. In this case, the second communications device may be the communications device 2302 in FIG. 5B, and the third communications device may be the communications device 2304 in FIG. 5A. In the communication method, the first FlexE group may be the FlexE group 2404 in FIG. 5A, and the second FlexE group may be the FlexE group 2403 in FIG. 5A.

As shown in FIG. 10, the method includes the following steps.

Step 3301: The first communications device receives, by using a link corresponding to the first FlexE group, first indication information sent by the second communications device, where for a slot in N slots of the first FlexE group, the first indication information is used to indicate that the second communications device has assigned a FlexE client to the slot, or used to indicate that the second communications device has not assigned a FlexE client to the slot, where N is a positive integer.

Step 3302: The first communications device assigns the FlexE client to the slot in the N slots of the first FlexE group based on the first indication information, or cancels, based on the first indication information, the FlexE client that has been assigned to the slot.

In this embodiment of this application, the communications device may recognize indication information, and update a slot assignment status of the communications device based on a slot assignment status indicated by the indication information, thereby improving slot assignment flexibility, and laying a foundation for enabling a standby link when a fault occurs.

In step 3302, optionally, that the first communications device assigns the FlexE client to the slot in the N slots of the first FlexE group based on the first indication information includes for the slot in the N slots of the first FlexE group, if the first indication information indicates that the second communications device has assigned the FlexE client to the slot, and the first communications device has not assigned the FlexE client to the slot, assigning, by the first communications device, the FlexE client to the slot. Optionally, that the first communications device cancels, based on the first indication information, the FlexE client that has been assigned to the slot includes if the first indication information indicates that the second communications device has not assigned the FlexE client to the slot, and the first communications device has assigned the FlexE client to the slot, canceling, by the first communications device, the FlexE client that has been assigned to the slot.

Based on the foregoing content, the second communications device and the third communications device may be different communications devices connected on both sides of the first communications device, and the first FlexE group and the second FlexE group may be referred to as FlexE groups in two directions. In this embodiment of this application, a communications device may receive one piece of indication information from one direction, for example, the first indication information, or may receive two pieces of indication information, for example, the first indication information and second indication information, from links in two directions respectively.

In an optional implementation, optionally, after the first communications device receives, by using the link corresponding to the first FlexE group, the first indication information sent by the second communications device, the method further includes assigning, by the first communications device, a FlexE client to a slot in N slots of the second FlexE group based on the first indication information, or canceling, based on the first indication information, a FlexE client that has been assigned to the slot in the N slots of the second FlexE group. The first communications device is connected to the third communications device by using a link corresponding to the second FlexE group. Optionally, an association relationship between the first FlexE group and the second FlexE group may be preset on the first communications device. Optionally, the first FlexE group and the second FlexE group may be set to protection groups of each other. For related content of the protection groups, refer to the foregoing content. In other words, the communications device updates, based on indication information (for example, may be first received indication information) received from a link on one side, slot assignment statuses of FlexE groups in two directions of the communications device. For example, the first indication information is received prior to second indication information, and a slot assignment status of the first FlexE group and a slot assignment status of the second FlexE group are updated based on the first indication information.

In an optional implementation of updating the slot assignment status of the second FlexE group based on the first indication information, for the slot in the N slots of the first FlexE group, if the first indication information indicates that the second communications device has assigned the FlexE client to the slot, the first communications device assigns a FlexE client to an idle slot (a slot to which no FlexE client is assigned) of the second FlexE group. In this case, there is a correspondence between the slot and the idle slot that is of the second FlexE group and to which the FlexE client is assigned, and the correspondence may be stored in the communications device. Optionally, if the first indication information indicates that the second communications device has not assigned the FlexE client to the slot, and the first communications device has assigned a FlexE client to a slot that is corresponding to the slot and that is of the second FlexE group, the first communications device cancels the FlexE client that has been assigned to the slot that is corresponding to the slot and that is of the second FlexE group.

In another optional implementation of updating the slot assignment status of the second FlexE group based on the first indication information, for the slot in the N slots of the first FlexE group, if the first indication information indicates that the second communications device has assigned the FlexE client to the slot, and the first communications device has not assigned a FlexE client to a slot that is identified by an identifier of the slot and that is of the second FlexE group, the first communications device assigns the FlexE client to the slot that is identified by the identifier of the slot and that is of the second FlexE group. Optionally, if the first indication information indicates that the second communications device has not assigned the FlexE client to the slot, and the first communications device has assigned a FlexE client to the slot that is identified by the identifier of the slot and that is of the second FlexE group, the first communications device cancels the FlexE client that has been assigned to the slot that is identified by the identifier of the slot and that is of the second FlexE group.

In another optional implementation, the first communications device may update, based on indication information received from the links in two directions, slot assignment statuses of the FlexE groups in the two directions respectively. For example, optionally, the first communications device receives, by using the link corresponding to the second FlexE group, the second indication information sent by the third communications device, and the first communications device assigns a FlexE client to a slot in N slots of the second FlexE group based on the second indication information, or cancels, based on the second indication information, a FlexE client that has been assigned to a slot in N slots of the second FlexE group. The first communications device is connected to a third communications device by using the link corresponding to the second FlexE group. For the slot in the N slots of the second FlexE group, the second indication information is used to indicate that the third communications device has assigned a FlexE client to the slot, or used to indicate that the third communications device has not assigned a FlexE client to the slot, where N is a positive integer.

In an optional implementation of updating the slot assignment status of the second FlexE group based on the second indication information, for the slot in the N slots of the second FlexE group, if the second indication information indicates that the third communications device has assigned the FlexE client to the slot, and the first communications device has not assigned the FlexE client to the slot, the first communications device assigns the FlexE client to the slot. Optionally, that the first communications device cancels, based on the second indication information, a FlexE client that has been assigned to the slot includes if the second indication information indicates that the third communications device has not assigned the FlexE client to the slot, and the first communications device has assigned the FlexE client to the slot, canceling, by the first communications device, the FlexE client that has been assigned to the slot.

In this embodiment of this application, optionally, before receiving the indication information, the first communications device further receives an APS protocol request.

Optionally, before the first communications device receives, by using the link corresponding to the first FlexE group, the first indication information sent by the second communications device, the method further includes receiving, by the first communications device by using the link corresponding to the first FlexE group, a fifth APS protocol request sent by the second communications device. Optionally, before receiving the second indication information, the first communications device also receives a sixth APS protocol request by using the link corresponding to the second FlexE group.

In an optional implementation of assigning the FlexE client to the slot, that the first communications device assigns the FlexE client to the slot in the N slots of the first FlexE group based on the first indication information, or cancels, based on the first indication information, the FlexE client that has been assigned to the slot includes if a type of the fifth APS protocol request is a preset first type, assigning, by the first communications device, the FlexE client to the slot in the N slots of the first FlexE group based on the first indication information. Optionally, if the type of the fifth APS protocol request is the preset first type, and for the slot in the N slots of the first FlexE group, the first indication information is used to indicate that the second communications device has assigned the FlexE client to the slot, the first communications device assigns the FlexE client to the slot in the N slots of the first FlexE group based on the first indication information.

Therefore, if the type of the fifth APS protocol request received by the first communications device is not the preset first type, but for the slot in the N slots of the first FlexE group, the first indication information is used to indicate that the second communications device has assigned the FlexE client to the slot, the first communications device may not perform any processing, or may report the situation, so that working personnel perform processing. It can be learned that whether to update the slot assignment status of the first communications device may be chosen more flexibly based on the indication information.

Further, optionally, if the first communications device has assigned the FlexE client to the slot of the first FlexE group based on the first indication information, and the first communications device has assigned the FlexE client to the slot of the second FlexE group based on the first indication information or the second indication information, an association relationship between the FlexE client assigned to the slot of the first FlexE group and the FlexE client assigned to the slot of the second FlexE group is established, or in other words, the FlexE client assigned to the slot of the first FlexE group and the FlexE client assigned to the slot of the second FlexE group are connected. An identifier of the FlexE client assigned to the slot of the first FlexE group and an identifier of the FlexE client assigned to the slot of the second FlexE group may be the same or different.

In another aspect, optionally, if the first communications device cancels, based on the first indication information, the FlexE client that has been assigned to the slot of the first FlexE group, and the first communications device cancels, based on the first indication information or the second indication information, the FlexE client that has been assigned to the slot of the second FlexE group, the association relationship between the FlexE client that has been assigned to the slot of the first FlexE group and the FlexE client that has been assigned to the slot of the second FlexE group is canceled.

In another optional implementation of canceling the FlexE client that has been assigned to the slot, if a type of the fifth APS protocol request is a preset second type, the first communications device cancels, based on the first indication information, the FlexE client that has been assigned to the slot. Optionally, if the type of the fifth APS protocol request is the preset second type, and for the slot in the N slots of the first FlexE group, the first indication information is used to indicate that the second communications device has not assigned the FlexE client to the slot, the first communications device cancels, based on the first indication information, the FlexE client that has been assigned to the slot.

Therefore, if the type of the fifth APS protocol request received by the first communications device is not the preset second type, but for the slot in the N slots of the first FlexE group, the first indication information is used to indicate that the second communications device has not assigned the FlexE client to the slot, the first communications device may not perform any processing, or may report the situation, so that working personnel perform processing. It can be learned that whether to update the slot assignment status of the first communications device may be chosen more flexibly based on the indication information.

Further, optionally, one or more APS protocol requests (for example, the fifth APS protocol request and the sixth APS protocol request) may be received, and one or more pieces of indication information (for example, the first indication information and the second indication information) may be received. When a plurality of APS protocols (for example, the fifth APS protocol request and the sixth APS protocol request) are received with a preset first period, and a plurality of pieces of indication information (for example, the first indication information and the second indication information) are received with a preset second period, and when indication information is received, optionally, an APS protocol that is nearest to a current time may be found, and then whether to update the slot assignment status of the communications device is determined based on the type of the found APS protocol and the indication information.

For example, a plurality of fifth APS protocol requests are received with the preset first period, and a plurality of pieces of first indication information are received with the preset second period, and when one piece of first indication information is received, one fifth APS protocol request that is received in a time nearest to a reception time of the first indication information is found from all received APS protocol requests, and a slot assignment status is processed or not processed based on the type of the found fifth APS protocol request and the first indication information. For another example, a plurality of sixth APS protocol requests are received with the preset first period, and a plurality of pieces of second indication information are received with the preset second period, and when one piece of second indication information is received, one sixth APS protocol request that is received in a time nearest to a reception time of the second indication information is found from all received APS protocol requests, and a slot assignment status is processed or not processed based on the type of the found APS protocol request and the second indication information.

In an optional implementation, the second period is greater than the first period. Optionally, any one or more of the first indication information, the second indication information, the fifth APS protocol request, and the sixth APS protocol request is/are carried in a FlexE overhead frame.

Optionally, the APS protocol request and the indication information may be carried in one FlexE overhead frame. For example, the fifth APS protocol request and the first indication information may be carried in one FlexE overhead frame, and the sixth APS protocol request and the second indication information may be carried in another FlexE overhead frame. For a specific carrying manner, refer to the foregoing content.

Optionally, because the first communications device is a node that detects no fault, or a node that does not receive a manual switching command, the first communications device may update and then send the received APS protocol request (for example, the fifth APS protocol request and the sixth APS protocol request). Optionally, after the first communications device receives, by using the link corresponding to the first FlexE group, the fifth APS protocol request sent by the second communications device, the method further includes updating, by the first communications device, the fifth APS protocol request, and sending an updated fifth APS protocol request by using the link corresponding to the second FlexE group. The first communications device is connected to the third communications device by using the link corresponding to the second FlexE group. Optionally, that the first communications device updates the fifth APS protocol request may be updating a target address in the fifth APS protocol request. Based on the foregoing content, the first communications device may store a network topology, for example, may include information such as an identifier of a previous-hop communications device of the first communications device and an identifier of a next-hop communications device of the first communications device. Therefore, an APS protocol request initiated by a communications device that detects a fault or receives a manual protection command may be transmitted in an entire network, so that a communications device in the entire network can enable or disable the standby link.

In an optional implementation, for the slot in the N slots of the first FlexE group, the first indication information includes a FlexE client identifier corresponding to the slot or includes a non-assignment identifier. The FlexE client identifier corresponding to the slot is an identifier of the FlexE client assigned by the second communications device to the slot. The non-assignment identifier is used to indicate that the second communications device has not assigned the FlexE client to the slot.

Optionally, that the first communications device assigns the FlexE client to the slot in the N slots of the first FlexE group based on the first indication information includes for K slots in the N slots of the first FlexE group, where K is a positive integer not greater than N, if FlexE client identifiers that are included in the first indication information and that are corresponding to the K slots of the first FlexE group are the same, and the first communications device has not assigned the FlexE client to the K slots of the first FlexE group, assigning, by the first communications device, the FlexE client to each of the K slots of the first FlexE group, where when K is greater than 1, FlexE client identifiers assigned by the first communications device to any two of the K slots of the first FlexE group are the same. In other words, when K is greater than 2, if the second communications device has assigned a same FlexE client to the K slots of the first FlexE group, the first communications device also needs to assign a same FlexE client to the K slots of the first FlexE group. Optionally, an identifier of the FlexE client assigned by the second communications device to the K slots of the first FlexE group and an identifier of the FlexE client assigned by the first communications device to the K slots of the first FlexE group may be the same or different.

In an optional implementation, for example, the first communications device receives a piece of first indication information, where the first indication information indicates that the second communications device has assigned a FlexE client A to a slot 0 of the first FlexE group. Optionally, the first communications device may also assign a FlexE client B to the slot 0 of the first FlexE group, and may establish an association relationship between the FlexE client A and the FlexE client B. Further, the first communications device receives a second piece of first indication information, where the first indication information indicates that the second communications device has assigned the FlexE client A to a slot 2 of the first FlexE group. Optionally, the first communications device may also assign the FlexE client B to the slot 2 of the first FlexE group. Because the FlexE client B has been established previously, it is acceptable that the slot corresponding to the FlexE client B is added to the slot 2. Optionally, an identifier of the FlexE client A and an identifier of the FlexE client B may be the same or different. When the identifier of the FlexE client A is different from the identifier of the FlexE client B, an association relationship between the identifier of the FlexE client A and the identifier of the FlexE client B may be stored in the communications device.

Optionally, the assigning, by the first communications device, a FlexE client to a slot in N slots of the second FlexE group based on the first indication information includes for K slots in the N slots of the second FlexE group, where K is a positive integer not greater than N, if the FlexE client identifiers that are included in the first indication information and that are corresponding to the K slots of the first FlexE group are the same, and the first communications device has not assigned the FlexE client to the K slots of the second FlexE group, assigning, by the first communications device, the FlexE client to each of the K slots of the second FlexE group, where when K is greater than 1, FlexE client identifiers assigned by the first communications device to any two of the K slots of the second FlexE group are the same, and establishing, by the first communications device, an association relationship between the FlexE client assigned to the K slots of the first FlexE group and the FlexE client assigned to the K slots of the second FlexE group.

Correspondingly, in an optional implementation, optionally, the assigning, by the first communications device, a FlexE client to a slot in N slots of the second FlexE group based on the first indication information includes for K slots in the N slots of the first FlexE group, where K is a positive integer not greater than N, if the FlexE client identifiers that are included in the first indication information and that are corresponding to the K slots of the first FlexE group are the same, and the first communications device has not assigned a FlexE client to slots of the second FlexE group that are identified by identifiers of the K slots, assigning, by the first communications device, the FlexE client to each of the slots of the second FlexE group that are identified by the identifiers of the K slots, where when K is greater than 1, FlexE client identifiers assigned by the first communications device to any two of the slots of the second FlexE group that are identified by the identifiers of the K slots are the same. In other words, when K is greater than 2, if the second communications device has assigned a same FlexE client to the K slots of the first FlexE group, the first communications device also needs to assign a same FlexE client to the K slots of the second FlexE group. Optionally, an identifier of the FlexE client assigned by the second communications device to the K slots of the first FlexE group and an identifier of the FlexE client assigned by the first communications device to the K slots of the first FlexE group may be the same or different. Optionally, an identifier of the FlexE client assigned by the first communications device to the K slots of the first FlexE group and an identifier of the FlexE client assigned by the first communications device to slots of the second FlexE group that are identified by the identifiers of the K slots may be the same or different.

In another optional implementation, optionally, the assigning, by the first communications device, a FlexE client to a slot in N slots of the second FlexE group based on the first indication information includes for K slots in the N slots of the first FlexE group, where K is a positive integer not greater than N, if the FlexE client identifiers that are included in the first indication information and that are corresponding to the K slots of the first FlexE group are the same, and the type of the fifth APS protocol is the preset first type, assigning, by the first communications device, a FlexE client to each of the K slots (may be idle slots, or may be slots of the second FlexE group that are identified by the identifiers of the K slots) of the second FlexE group, where when K is greater than 1, FlexE client identifiers assigned by the first communications device to any two of the slots of the second FlexE group that are identified by the identifiers of the K slots (may be idle slots, or may be slots of the second FlexE group that are identified by the identifiers of the K slots) are the same.

Correspondingly, in another optional implementation, optionally, for a manner in which the first communications device assigns the FlexE client to the slot in the N slots of the second FlexE group based on the second indication information, refer to the foregoing manner of assigning, by the first communications device, the FlexE client to the slot in the N slots of the first FlexE group based on the first indication information, details are not described herein again.

In an optional implementation, slots of one FlexE group may be divided into working slots and guard periods. The working slots are used to transmit a service that is in a normal working state, and the guard periods may be used for standby. For a division manner, refer to the foregoing content. Optionally, the first FlexE group includes $M_{11}$ working slots and $M_{12}$ guard periods, where $(M_{11}+M_{12})$ is a positive integer not greater than N, and $M_{12}$ is a positive integer not less than K, the K slots in the N slots of the first FlexE group are K slots in the $M_{12}$ guard periods of the first FlexE group, the second FlexE group includes $M_{21}$ working slots and $M_{22}$ guard periods, where $(M_{21}+M_{22})$ is a positive integer not greater than N, and $M_{22}$ is a positive integer not less than K, the K slots in the N slots of the second FlexE group are K slots in the $M_{22}$ guard periods of the second FlexE group, and $M_{22}$ is not less than $M_{11}$, and $M_{12}$ is not less than $M_{21}$. In this way, when assigning the FlexE client to the slot based on the indication information, the communications device can assign the FlexE client to a guard period. Therefore, not only an original service transmitted in a working slot is not affected, but also another service can be transmitted in the guard period.

Optionally, the K slots of the first FlexE group are in a one-to-one correspondence with the K slots of the second FlexE group, and for a slot in the K slots of the first FlexE group, a rank of the slot in the $M_{12}$ guard periods is the same as a rank, of a slot that is corresponding to the slot and that is in the K slots of the second FlexE group, in the $M_{22}$ guard periods. In this way, the communications device can determine a guard period according to the rule, so that a simple solution can be used to implement a correspondence between a slot before a slot assignment status change and a slot after a slot assignment status change.

Further, optionally, after updating the slot assignment status, the first communications device also sends indication information, for example, sends fifth indication information by using the link corresponding to the first FlexE group. For the slot in N slots of the first FlexE group, the first indication information is used to indicate that the first communications device has assigned the FlexE client to the slot, or used to indicate that the first communications device has not assigned the FlexE client to the slot. Optionally, the first communications device sends sixth indication information by using the link corresponding to the second FlexE group. For a slot in the N slots of the second FlexE group, the sixth indication information is used to indicate that the first communications device has assigned the FlexE client to the slot, or used to indicate that the first communications device has not assigned the FlexE client to the slot.

Figure 11:
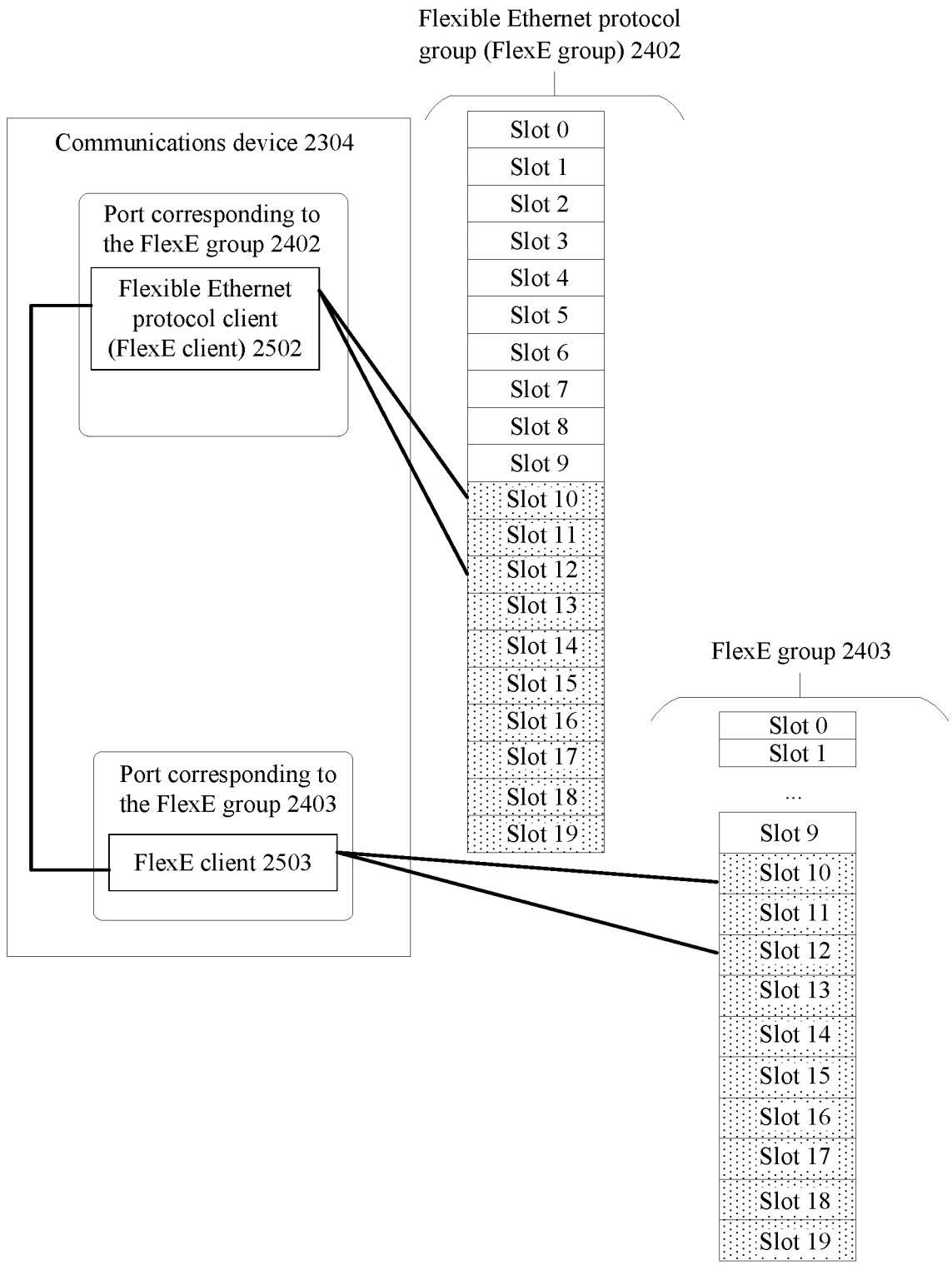
FIG. 11 is a schematic structural diagram of a first communications device according to an embodiment of this application.

FIG. 11 is an example of a schematic structural diagram of a first communications device according to an embodiment of this application. As shown in FIG. 11, description is provided by using an example in which a first communications device is the communications device 2304 in FIG. 5A, a corresponding second communications device may be the communications device 2303 in FIG. 5B, and a third communications device may be the communications device 2301 in FIG. 5A. A first FlexE group is the FlexE group 2402 in FIG. 5A, and a second FlexE group is the FlexE group 2403 in FIG. 5A.

As shown in FIG. 11, the communications device 2304 receives an APS protocol request that is of a first type, and receives first indication information. The first indication information indicates that a FlexE client has been assigned to a slot 10 and a slot 12 of the FlexE group 2402. The communications device 2304 assigns a FlexE client 2502 to the slot 10 and the slot 12 of the FlexE group 2402, and assigns a FlexE client 2503 to a slot 10 and a slot 12 of the FlexE group 2403. Optionally, the FlexE client that is assigned to the slot 10 and the slot 12 of the FlexE group 2402 and that is indicated by the first indication information may be the same as the FlexE client 2502 and the FlexE client 2503, or two of the three may be the same or different. A correspondence between the three may be established when two of the three are the same or different. The communications device 2304 may receive second indication information by using a link corresponding to the second FlexE group, and may neglect the second indication information when determining that the second indication information indicates that a FlexE client has been assigned to the slot 10 and the slot 12 of the FlexE group 2403. Alternatively, this may be described as updating a slot assignment status of the communications device 2304 based on the second indication information. This is not described in this example. For a specific example and possible situations, refer to the foregoing content.

As shown in FIG. 11, the slot 10 of the FlexE group 2402 is corresponding to the slot 10 of the FlexE group 2403. The slot 10 of the FlexE group 2403 ranks the first in all guard periods of the FlexE group 2403, and the slot 10 of the FlexE group 2402 also ranks the first in all guard periods of the FlexE group 2402. The slot 12 of the FlexE group 2402 is corresponding to the slot 12 of the FlexE group 2403. The slot 12 of the FlexE group 2403 ranks the third in all the guard periods of the FlexE group 2403, and the slot 12 of the FlexE group 2402 also ranks the third in all the guard periods of the FlexE group 2402.

The communications device updates the received APS protocol request, and optionally, may update a target address in the received APS protocol request, and then send the APS protocol request in which the target address has been updated. It can be learned that, a type of the APS protocol request updated and sent is not changed. In this way, a communications device in an entire network performs corresponding processing based on the APS protocol request. Optionally, if the APS protocol request is received by using a link corresponding to the first FlexE group, an updated APS protocol request is sent by using the link corresponding to the second FlexE group, or if the APS protocol request is received by using the link corresponding to the second FlexE group, an updated APS protocol request is sent by using the link corresponding to the first FlexE group.

After assigning the FlexE client 2502 to the slot 10 and the slot 12 of the FlexE group 2402, the communications device 2304 sends fifth indication information, and in the sent fifth indication information, the slot 10 is corresponding to an identifier of the FlexE client 2502, and the slot 12 is corresponding to the identifier of the FlexE client 2502. Specifically, a pair of relationships between the slot 10 and the identifier of the FlexE client 2502 and between the slot 12 and the identifier of the FlexE client 2502 may be established. The corresponding slot 10 and slot 12 are found from a FlexE overhead frame of the FlexE group 2402, and "0x00" (0x00 may be defined as a "non-assignment identifier") corresponding to the slot 10 and the slot 12 is updated to the identifier of the FlexE client 2502.

After assigning the FlexE client 2503 to the slot 10 and the slot 12 of the FlexE group 2403, the communications device 2304 sends sixth indication information, and in the sent sixth indication information, the slot 10 is corresponding to an identifier of the FlexE client 2503, and the slot 12 is corresponding to the identifier of the FlexE client 2503. Specifically, a pair of relationships between the slot 10 and the identifier of the FlexE client 2503 and between the slot 12 and the identifier of the FlexE client 2503 may be established. The corresponding slot 10 and slot 12 are found from a FlexE overhead frame of the FlexE group 2403, and "0x00" (0x00 may be defined as a "non-assignment identifier") corresponding to the slot 10 and the slot 12 is updated to the identifier of the FlexE client 2503.

The communications device establishes the association relationship between the FlexE client 2402 and the FlexE client 2502, and the establishing may also be referred to as establishing a pass-through relationship between the FlexE client 2402 and the FlexE client 2502.

Then, optionally, after the APS protocol that is of a preset second type and that is sent by the communications device 2303 is received, and the first indication information is received, where the first indication information indicates that a FlexE client has not been assigned to the slot 10 and the slot 12 of the FlexE group 2402, the FlexE client 2502 assigned to the slot 10 and the slot 12 of the FlexE group 2402 is canceled, and the FlexE client 2503 assigned to the slot 10 and the slot 12 of the FlexE group 2403 is canceled. Specifically, the corresponding slot 10 and slot 12 may be found from a FlexE overhead frame of the FlexE group 2402, and the identifier of the FlexE client 2502 corresponding to the slot 10 and the slot 12 is updated to "0x00" (0x00 may be defined as a "non-assignment identifier"), and the corresponding slot 10 and slot 12 may be found from the FlexE overhead frame of the FlexE group 2403, and the identifier of the FlexE client 2503 corresponding to the slot 10 and the slot 12 is updated to "0x00" (0x00 may be defined as a "non-assignment identifier").

Figure 12:
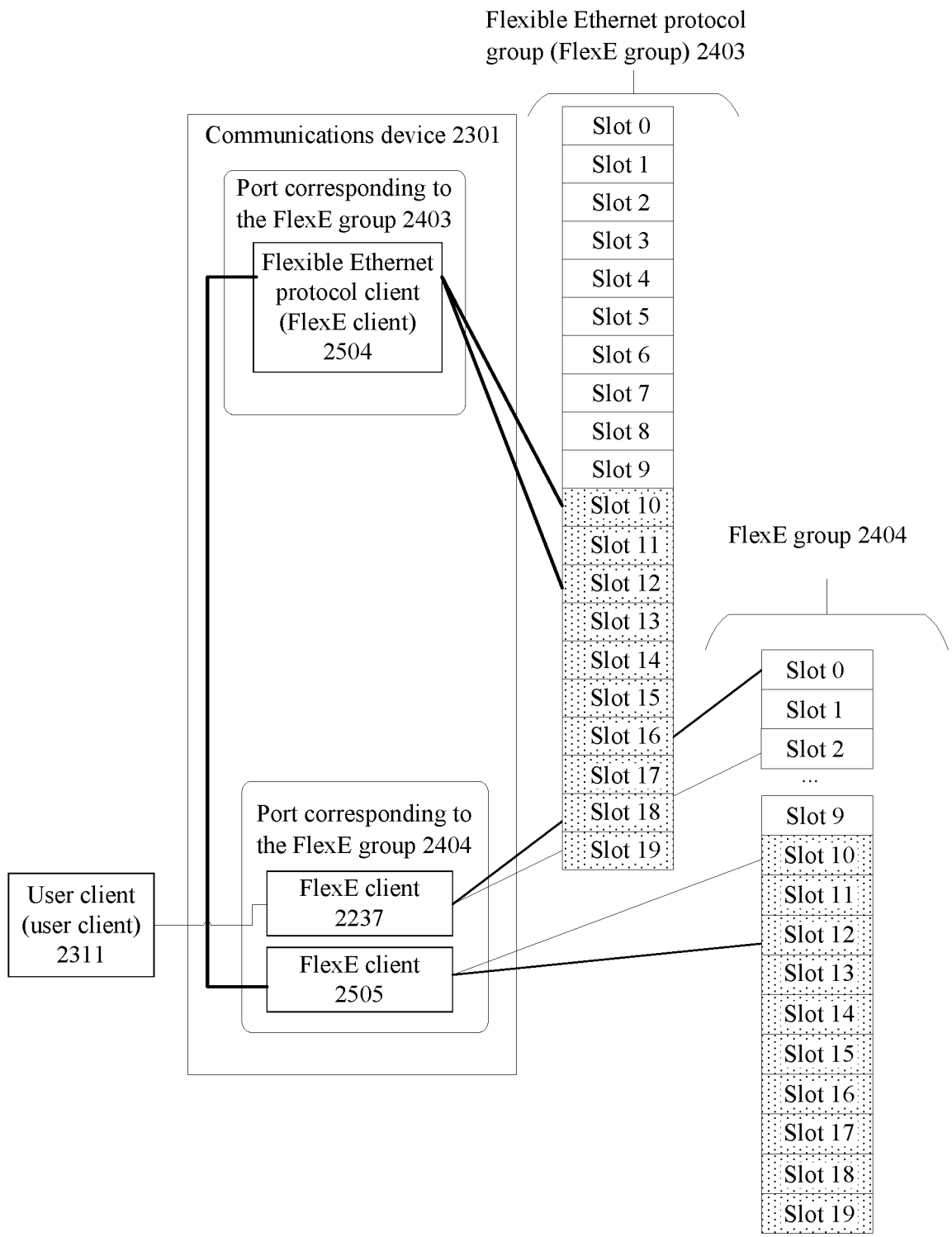
FIG. 12 is a schematic structural diagram of another first communications device according to an embodiment of this application.

FIG. 12 is an example of a schematic structural diagram of another first communications device according to an embodiment of this application. As shown in FIG. 11, description is provided by using an example in which a first communications device is the communications device 2301 in FIG. 5A, a corresponding second communications device may be the communications device 2302 in FIG. 5B, and a third communications device may be the communications device 2304 in FIG. 5A. A first FlexE group is the FlexE group 2404 in FIG. 5A, and a second FlexE group is the FlexE group 2403 in FIG. 5A. This example is similar to that shown in FIG. 11, and a difference lies in that the communications device 2301 establishes a FlexE client 2504 for the slot 10 and the slot 12 of the FlexE group 2403, and establishes a FlexE client 2505 for the slot 10 and the slot 12 of the FlexE group 2404. Further, the communications device 2301 establishes an association relationship between the FlexE client 2504 and the FlexE client 2505, or in other words, the FlexE client 2504 and the FlexE client 2505 are connected. Other content is not described herein again. For details, refer to related content in FIG. 11.

Figure 13A:
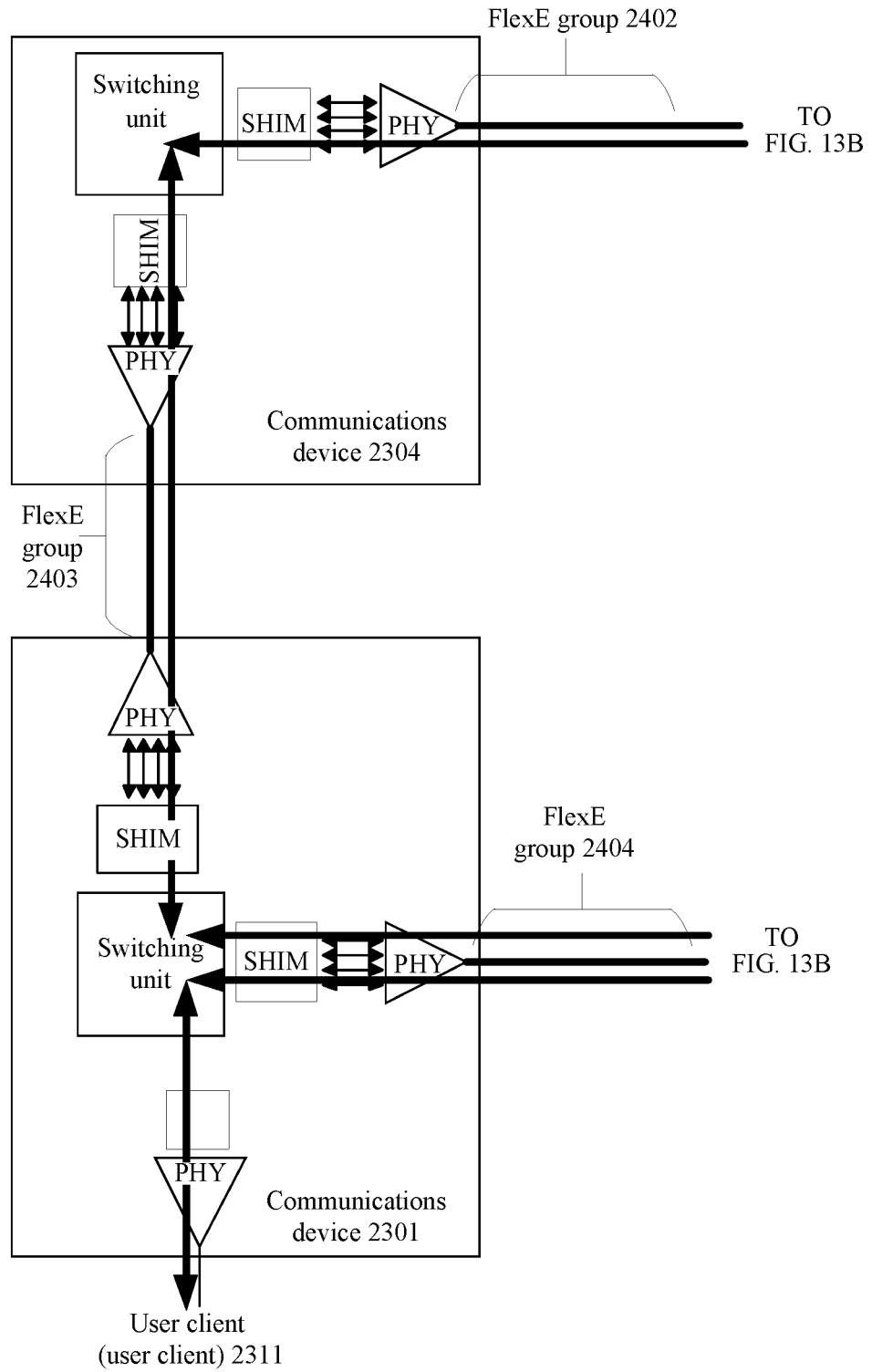
FIG. 13A and FIG. 13B are a schematic diagram of another type of link in FIG. 5A and FIG. 5B according to an embodiment of this application.
Figure 13B:
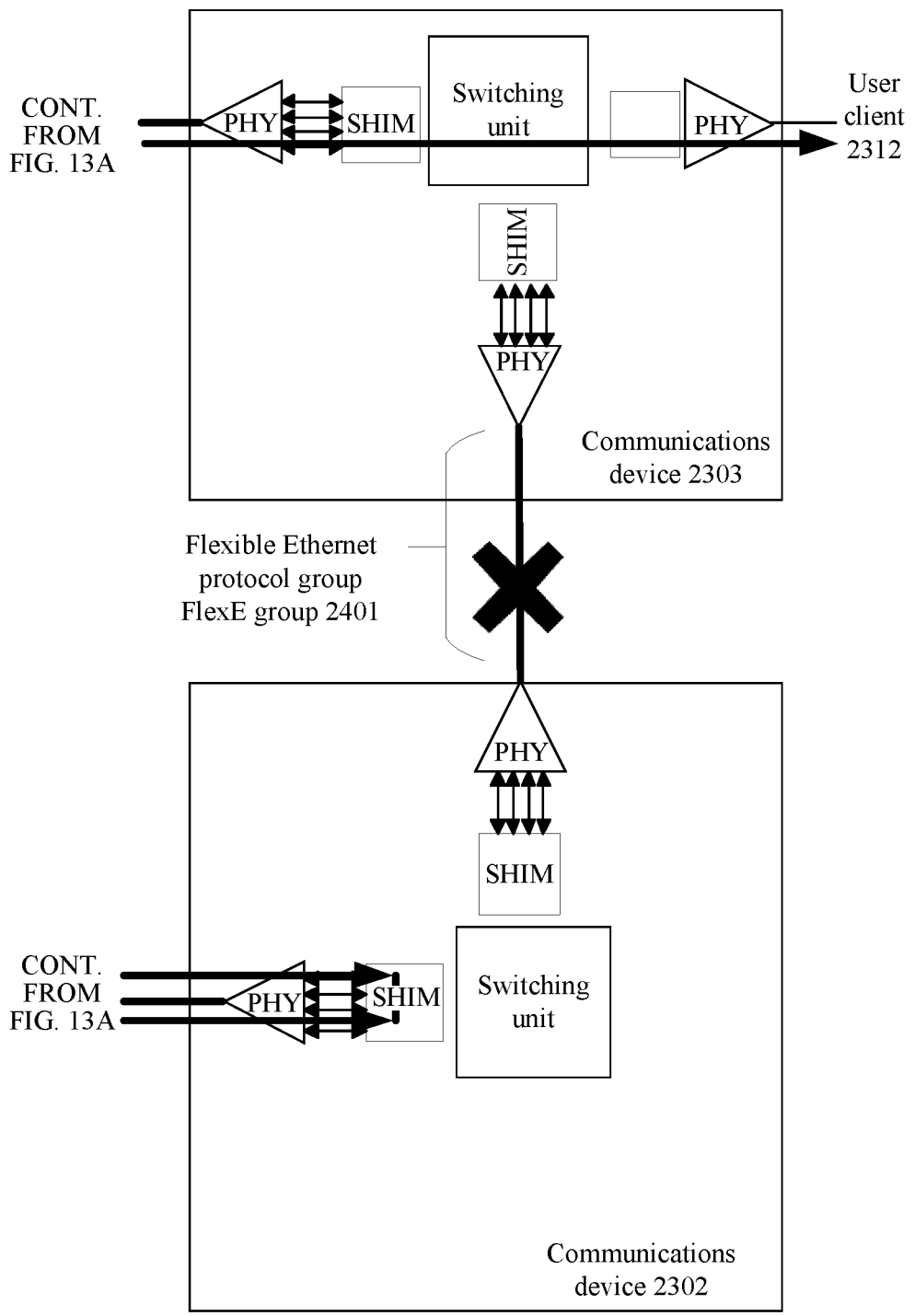

FIG. 13A and FIG. 13B are an example of a schematic diagram of another type of link in FIG. 5A and FIG. 5B according to an embodiment of this application. It can be learned based on the schematic diagrams in FIG. 7 and FIG. 9 that, in FIG. 5A and FIG. 5B, slots corresponding to the link between the user client 2311 and the user client 2312 are successively "the user client 2311—the slot 0 and the slot 2 of the FlexE group 2404 corresponding to the communications device 2301—the slot 0 and the slot 2 of the FlexE group 2404 corresponding to the communications device 2302—the slot 0 and the slot 2 of the FlexE group 2401 corresponding to the communications device 2302—the slot 0 and the slot 2 of the FlexE group 2401 corresponding to the communications device 2303—the user device 2312" (this link is referred to as an active link between the user client 2311 and the user client 2312).

As shown in FIG. 13A and FIG. 13B, after a fault occurs on the link corresponding to the FlexE group 2401 between the communications device 2303 and the communications device 2302, with reference to the examples in FIG. 7, FIG. 9, FIG. 11, and FIG. 12, slots on the link between the user client 2311 and the user client 2312 are successively "the user client 2311—the slot 0 and the slot 2 of the FlexE group 2404 corresponding to the communications device 2301— the slot 0 and the slot 2 of the FlexE group 2404 corresponding to the communications device 2302—the slot 10 and the slot 12 of the FlexE group 2404 corresponding to the communications device 2302 (the slot 10 and the slot 12 of the FlexE group 2404 are guard periods of the FlexE group 2404)—the slot 10 and the slot 12 of the FlexE group 2401 corresponding to the communications device 2301—the slot 10 and the slot 12 of the FlexE group 2403 corresponding to the communications device 2301—the slot 10 and the slot 12 of the FlexE group 2403 corresponding to the communications device 2304—the slot 10 and the slot 12 of the FlexE group 2402 corresponding to the communications device 2304—the slot 10 and the slot 12 of the FlexE group 2402 corresponding to the communications device 2303— the user device 2312" (this link is referred to as a standby link between the user client 2311 and the user client 2312). Therefore, it can be learned that, if the solution provided in this embodiment of this application is used, when a fault occurs on a link corresponding to a FlexE group, a standby link may be enabled, that is, a protection switching function is performed, and a service of the user client is switched from the active link to the standby link, to ensure that the service of user client is transmitted continuously. Optionally, in duration of the fault and in a wait to restore after the fault disappears (for example, if the wait to restore is five seconds, a wait to restore after the fault disappears is five seconds after the fault disappears), a protection switching function startup state may be maintained, that is, a state in which a user service is transmitted by using the standby link may be maintained. After the fault disappears, and after the wait to restore after the fault disappears (for example, if the wait to restore is five seconds, the wait to restore after the fault disappears is five seconds after the fault disappears), the user service may be switched from the standby link back to the active link.

In the solution provided in this embodiment of this application, the fourth communications device and the first communications device may be a same communications device. In this case, the communications device may be in two networks, and plays a role of the fourth communications device in one network, and plays a role of the first communications device in the other network. The communications device includes one or more FlexE groups. The communications device may execute, for one or more FlexE groups, the solution executed by the fourth communications device, or may execute, for one or more other FlexE groups of the communications device, the solution executed by the first communications device.

Figure 14:
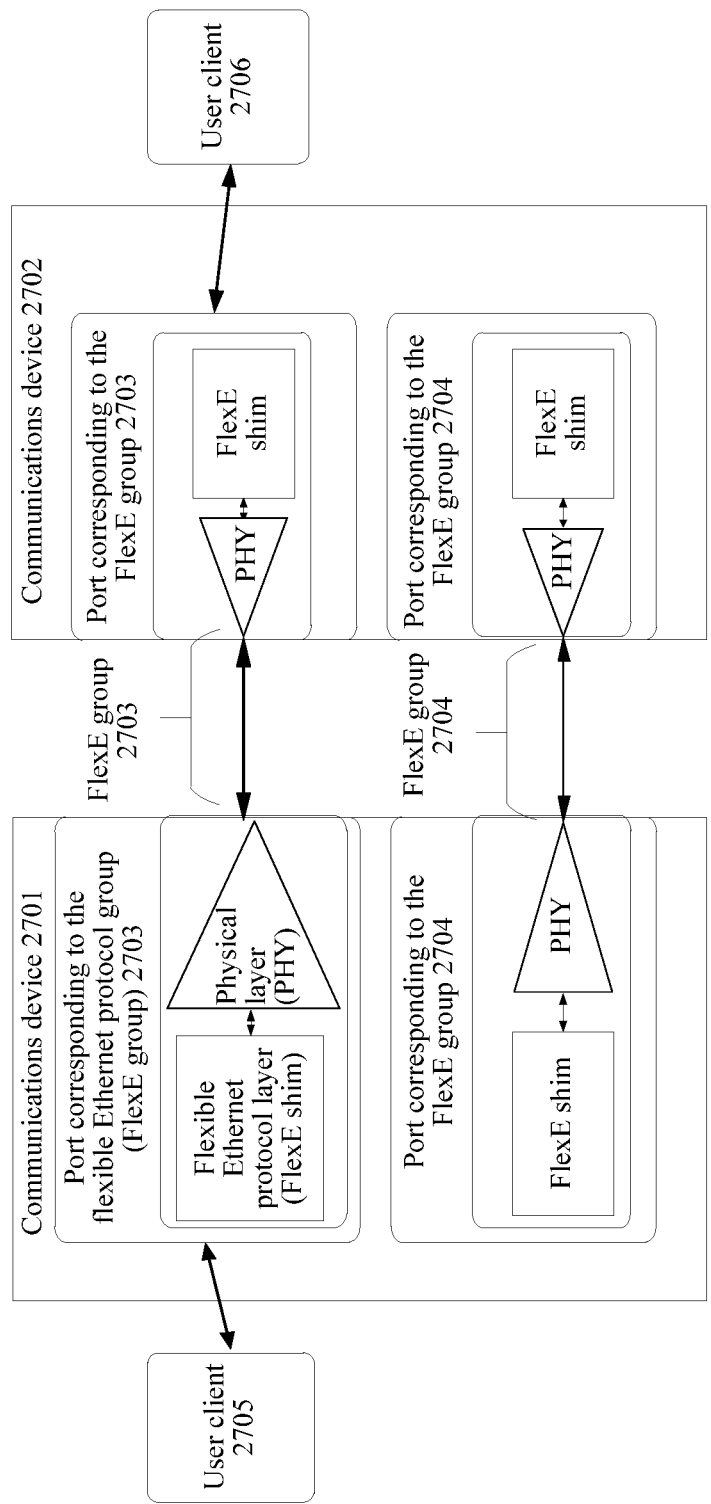
FIG. 14 is a schematic architectural diagram of a linear networking system according to an embodiment of this application.

The solution provided in this embodiment of this application is applied to the ring networks in FIG. 5A, FIG. 5B, FIG. 13A, and FIG. 13B, and may also be applied to various scenarios, such as a linear networking scenario. FIG. 14 is an example of a schematic architectural diagram of a linear networking system according to an embodiment of this application. As shown in FIG. 14, a communications device 2701 includes one or more ports. The one or more ports to which the flexible Ethernet protocol is applied and that are on the communications device 2701 form one FlexE group, and the communications device 2701 is corresponding to one or more FlexE groups, such as a FlexE group 2703 and a FlexE group 2704. A communications device 2702 includes one or more ports. One or more ports to which the flexible Ethernet protocol is applied and that are on the communications device 2702 form one FlexE group, and the communications device 2702 is corresponding to one or more FlexE groups, such as a FlexE group 2703 and a FlexE group 2704. There is a link corresponding to the FlexE group 2703 and a link corresponding to the FlexE group 2704 between the communications device 2701 and the communications device 2702. As shown in FIG. 14, a link between a user client 2705 and a user client 2706 is "the user client 2705—a port corresponding to the FlexE group 2703 of the communications device 2701—a port corresponding to the FlexE group 2703 of the communications device 2702—the user client 2706". For example, information sent by the user client 2705 is transmitted to the communications device 2702 by using the link corresponding to the FlexE group 2703, and the communications device 2702 transmits the information received by the FlexE group 2703 to the user client 2706.

Figure 15:
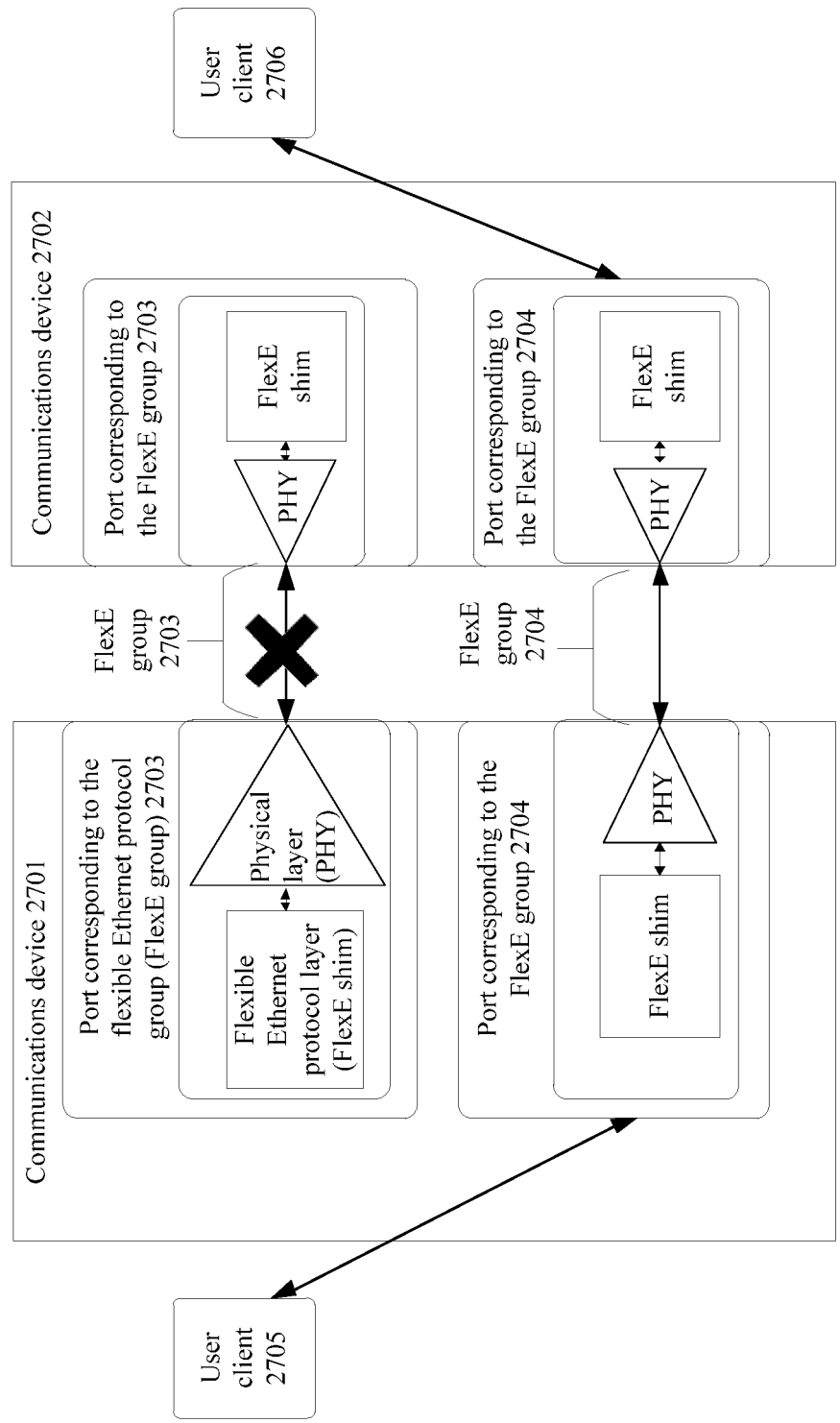
FIG. 15 is a schematic diagram of another linear networking link in FIG. 14 according to an embodiment of this application.

FIG. 15 is an example of a schematic diagram of another linear networking link in FIG. 14 according to an embodiment of this application. As shown in FIG. 15, if a fault occurs on a link corresponding to a FlexE group 2703, a communications device 2701 and a communications device 2702 may execute the action executed by the fourth communications device. In this case, the communications device 2701 is the fourth device, the FlexE group 2703 is the third FlexE group, and the FlexE group 2704 is the fourth FlexE group. From a perspective of the communications device 2702, the communications device 2702 is the fourth device, the FlexE group 2703 is the third FlexE group, and the FlexE group 2704 is the fourth FlexE group. The communications device 2701 changes the user client 2705 to be associated with a FlexE client carried by the FlexE group 2704, and the communications device 2702 changes the user client 2706 to be associated with the FlexE client carried by the FlexE group 2704.

The communications device 2701 may send an APS protocol that is of a preset first type and third indication information. The third indication information sent by the communications device 2701 indicates that the communications device 2701 has assigned a FlexE client to a slot of the FlexE group 2704. The communications device 2702 may send an APS protocol that is of a preset first type and third indication information. The third indication information sent by the communications device 2702 indicates that the communications device 2702 has assigned a FlexE client to a slot of the FlexE group 2704.

Optionally, there may be one or more communications devices between the communications device 2701 and the communications device 2702. Optionally, a device between the communications device 2701 and the communications device 2702 may execute the action executed by the first communications device, and details are not described herein again.

In the solution provided in this embodiment of this application, a communications device to which FlexE is applied may be used to construct a two-fiber shared protection ring, and networking scenarios of the FlexE communications device are extended. The foregoing communications devices may also be referred to as switching devices. Further, the solution provided in this embodiment of this application is applied to construct a two-fiber shared protection ring, communications devices on a circular topology may be allowed to share a protection switching capability of a ring network, and a linear protection switching device or a dedicated redundancy reliability device does not need to be deployed for each communications device, so that a fast fault self-rectification capability is provided for the ring network on the premise of maximizing utilization of device resources. Further, in this embodiment of this application, a FlexE group overhead frame agreed according to the FlexE Implementation Agreement 1.0 is used to carry slot update information (the foregoing indication information, such as the first indication information and the second indication information) of a FlexE group, and a communications device is allowed to communicate with an existing communications device to which FlexE is applied, to construct a non-ring network topology environment, so that compatibility is relatively good.

Figure 16:
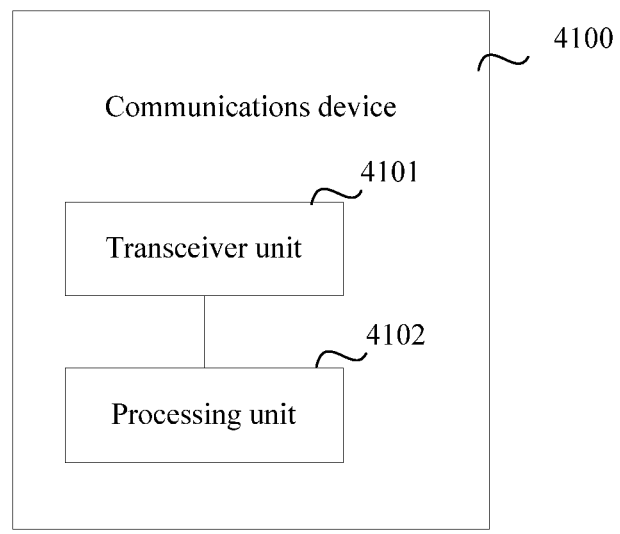
FIG. 16 is a schematic diagram of a communications device according to an embodiment of this application.

Based on the foregoing embodiments and the same concept, FIG. 16 is a schematic diagram of a communications device according to an embodiment of this application. As shown in FIG. 16, the communications device 4100 may be a network device, or a chip or a circuit, such as a chip or a circuit that can be disposed on a network device. The communications device can implement the steps performed by the fourth communications device in the method corresponding to any one or more shown in FIG. 6. The communications device 4100 may be the fourth communications device, or may be another communications device that is capable of executing the solution executed by the fourth communications device. The communications device 4100 may alternatively be the communications device 2101 in FIG. 3. The communications device 4100 includes a processing unit 4102 and a transceiver unit 4101. The communications device 4100 may further has a capability of executing the solution shown in FIG. 8 and/or FIG. 10.

The processing unit 4102 is configured to assign a FlexE client to a slot of a fourth FlexE group, and change a user client associated with a FlexE client carried by a third FlexE group to be associated with the FlexE client carried by the fourth FlexE group. The transceiver unit 4101 is configured to send third indication information to a fifth communications device by using a link corresponding to the fourth FlexE group, where for a slot in N slots of the fourth FlexE group, the third indication information is used to indicate that the communications device 4100 has assigned a FlexE client to the slot, or used to indicate that the communications device 4100 has not assigned a FlexE client to the slot, N is a positive integer, the communications device 4100 is connected to the fifth communications device by using the link corresponding to the fourth FlexE group, and the communications device 4100 is connected to a sixth communications device by using a link corresponding to the third FlexE group.

In a possible design, the processing unit 4102 is further configured to change the user client associated with the FlexE client carried by the fourth FlexE group to be associated with the FlexE client carried by the third FlexE group, and cancel the FlexE client that has been assigned to the slot of the fourth FlexE group.

In a possible design, the transceiver unit 4101 is further configured to send a first APS protocol request to the fifth communications device by using the link corresponding to the fourth FlexE group, where if the communications device 4100 assigns the FlexE client to the slot of the fourth FlexE group, and changes the user client associated with the FlexE client carried by the third FlexE group to be associated with the FlexE client carried by the fourth FlexE group, a type of the first APS protocol request is a preset first type, or if the communications device 4100 cancels the FlexE client that has been assigned to the slot of the fourth FlexE group, and changes the user client associated with the FlexE client carried by the fourth FlexE group to be associated with the FlexE client carried by the third FlexE group, a type of the first APS protocol request is a preset second type.

For related content of the third indication information and the first APS protocol request, refer to the foregoing embodiments, details are not described herein again.

In a possible design, for the slot in the N slots of the fourth FlexE group, the third indication information includes a FlexE client identifier corresponding to the slot or includes a non-assignment identifier. The FlexE client identifier corresponding to the slot is an identifier of the FlexE client assigned by the communications device 4100 to the slot. The non-assignment identifier is used to indicate that the communications device 4100 has not assigned the FlexE client to the slot. For related content, refer to the foregoing embodiments, details are not described herein again.

The processing unit 4102 is configured to if the user client is associated with K slots of the third FlexE group, assign the FlexE client to K slots in the N slots of the fourth FlexE group, where K is a positive integer not greater than N, and when K is greater than 1, FlexE client identifiers assigned by the communications device 4100 to any two of the K slots of the fourth FlexE group are the same, and change the user client associated with the FlexE client carried by the third FlexE group to be associated with the FlexE client assigned to the K slots of the fourth FlexE group.

For related content of guard periods and working slots of the third FlexE group and the fourth FlexE group, refer to the foregoing content. In a possible design, the processing unit 4102 is configured to if the user client is associated with K slots in $M_{31}$ working slots of the third FlexE group, assign the FlexE client to K slots in $M_{42}$ guard periods of the fourth FlexE group. For related content, refer to the foregoing embodiments, details are not described herein again.

In a possible design, the processing unit 4102 is configured to when a fault occurs on the link corresponding to the third FlexE group, or a manual switching command is received by using the transceiver unit 4101, where the manual switching command includes a third FlexE group number, assign the FlexE client to the slot of the fourth FlexE group, and change the user client associated with the FlexE client carried by the third FlexE group to be associated with the FlexE client carried by the fourth FlexE group, or when the link corresponding to the third FlexE group is in a normal working state, or a manual switching cancelation command is received by using the transceiver unit 4101, where the manual switching cancelation command includes a fourth FlexE group number, change the user client associated with the FlexE client carried by the fourth FlexE group to be associated with the FlexE client carried by the third FlexE group, and cancel the FlexE client that has been assigned to the slot of the fourth FlexE group.

In a possible design, the processing unit 4102 is configured to assign the FlexE client to the slot of the fourth FlexE group, and after a second APS protocol request sent by the fifth communications device is received, change the user client associated with the FlexE client carried by the third FlexE group to be associated with the FlexE client carried by the fourth FlexE group.

Figure 17:
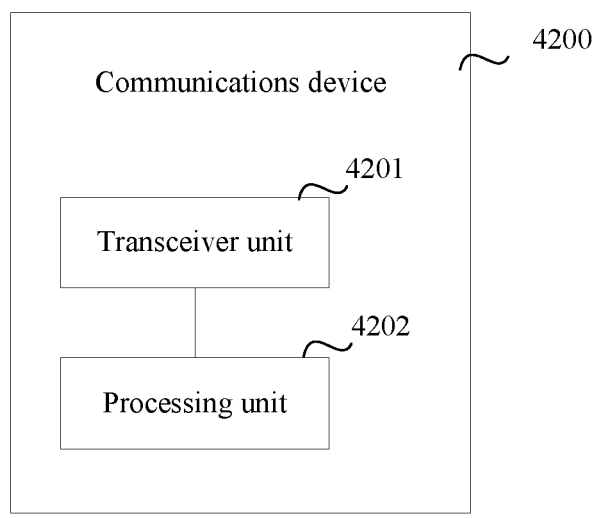
FIG. 17 is a schematic diagram of a communications device according to an embodiment of this application.

Based on the foregoing embodiments and the same concept, FIG. 17 is a schematic diagram of a communications device according to an embodiment of this application. As shown in FIG. 17, the communications device 4200 may be a network device, or a chip or a circuit, such as a chip or a circuit that can be disposed on a network device. The communications device can implement the steps performed by the seventh communications device in the method corresponding to any one or more shown in FIG. 8. The communications device 4200 may be the seventh communications device, or may be another communications device that is capable of executing the solution executed by the seventh communications device. The communications device 4200 may alternatively be the communications device 2101 in FIG. 3. The communications device 4200 includes a processing unit 4202 and a transceiver unit 4201. The communications device 4200 may further has a capability of executing the solution shown in FIG. 6 and/or FIG. 10.

The processing unit 4202 is configured to assign a first FlexE client to a slot of a fifth FlexE group, and change a second FlexE client that is associated with a FlexE client carried by a sixth FlexE group and that is carried by the fifth FlexE group to be associated with the first FlexE client. The transceiver unit 4201 is configured to send fourth indication information to an eighth communications device by using a link corresponding to the fifth FlexE group, where for a slot in N slots of the fifth FlexE group, the fourth indication information is used to indicate that the communications device 4200 has assigned a FlexE client to the slot, or used to indicate that the communications device 4200 has not assigned a FlexE client to the slot, N is a positive integer, the communications device 4200 is connected to the eighth communications device by using the link corresponding to the fifth FlexE group, and the communications device 4200 is connected to a ninth communications device by using a link corresponding to the sixth FlexE group.

In a possible design, the processing unit 4202 is further configured to change the second FlexE client associated with the first FlexE client to be associated with the FlexE client carried by the sixth FlexE group, and cancel the first FlexE client that has been assigned to the slot of the fifth FlexE group.

In a possible design, the transceiver unit 4201 is further configured to send an APS protocol request to the eighth communications device by using the link corresponding to the fifth FlexE group, where if the communications device 4200 assigns the first FlexE client to the slot of the fifth FlexE group, and changes the second FlexE client that is associated with the FlexE client carried by the sixth FlexE group and that is carried by the fifth FlexE group to be associated with the first FlexE client, a type of the APS protocol request is a preset first type, or if the communications device 4200 cancels the first FlexE client that has been assigned to the slot of the fifth FlexE group, and changes the second FlexE client associated with the first FlexE client to be associated with the FlexE client carried by the sixth FlexE group, a type of the APS protocol request is a preset second type.

The fourth indication information and the APS protocol request are carried in a FlexE overhead frame. For related content, refer to the foregoing embodiments, details are not described herein again.

In a possible design, for the slot in the N slots of the fifth FlexE group, the fourth indication information includes a FlexE client identifier corresponding to the slot or includes a non-assignment identifier. The FlexE client identifier corresponding to the slot is an identifier of the FlexE client assigned by the communications device 4200 to the slot. The non-assignment identifier is used to indicate that the communications device 4200 has not assigned the FlexE client to the slot. The processing unit 4202 is configured to if the second FlexE client is assigned to K slots of the fifth FlexE group, assign the first FlexE client to K slots in the N slots of the fifth FlexE group, where K is a positive integer not greater than N, and when K is greater than 1, FlexE client identifiers assigned to any two of the K slots of the fifth FlexE group are the same, and change the second FlexE client that is associated with the FlexE client carried by the sixth FlexE group and that is carried by the fifth FlexE group to be associated with the first FlexE client.

For related content of guard periods and working slots of the sixth FlexE group and the fifth FlexE group, refer to the foregoing content. In a possible design, the processing unit 4202 is configured to if the second FlexE client is assigned to K slots in $M_{51}$ working slots of the fifth FlexE group, assign the first FlexE client to K slots in $M_{52}$ guard periods of the fifth FlexE group.

In a possible design, the processing unit 4202 is configured to when a fault occurs on the link corresponding to the sixth FlexE group, assign the first FlexE client to the slot of the fifth FlexE group, and change the second FlexE client that is associated with the FlexE client carried by the sixth FlexE group and that is carried by the fifth FlexE group to be associated with the first FlexE client, or when the link corresponding to the sixth FlexE group is in a normal working state, change the second FlexE client associated with the first FlexE client to be associated with the FlexE client carried by the sixth FlexE group, and cancel the first FlexE client that has been assigned to the slot of the fifth FlexE group.

Figure 18:
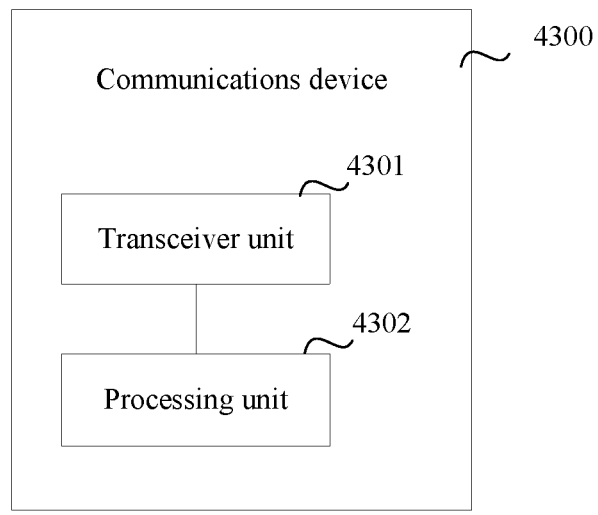
FIG. 18 is a schematic diagram of a communications device according to an embodiment of this application.

Based on the foregoing embodiments and the same concept, FIG. 18 is a schematic diagram of a communications device according to an embodiment of this application. As shown in FIG. 18, the communications device 4300 may be a network device, or a chip or a circuit, such as a chip or a circuit that can be disposed on a network device. The communications device can implement the steps performed by the first communications device in the method corresponding to any one or more shown in FIG. 10. The communications device 4300 may be the first communications device, or may be another communications device that is capable of executing the solution executed by the first communications device. The communications device 4300 may alternatively be the communications device 2101 in FIG. 3. The communications device 4300 includes a processing unit 4302 and a transceiver unit 4301. The communications device 4300 may further has a capability of executing the solution shown in FIG. 6 and/or FIG. 8.

The transceiver unit 4301 is configured to receive, by using a link corresponding to a first FlexE group, first indication information sent by a second communications device, where for a slot in N slots of the first FlexE group, the first indication information is used to indicate that the second communications device has assigned a FlexE client to the slot, or used to indicate that the second communications device has not assigned a FlexE client to the slot, where N is a positive integer. The processing unit 4302 is configured to assign the FlexE client to the slot in the N slots of the first FlexE group based on the first indication information, or cancel, based on the first indication information, the FlexE client that has been assigned to the slot in the N slots of the first FlexE group.

In a possible design, the transceiver unit 4301 is further configured to receive, by using the link corresponding to the first FlexE group, an APS protocol request sent by the second communications device, and the processing unit 4302 is configured to if a type of the APS protocol request is a preset first type, assign the FlexE client to the slot in the N slots of the first FlexE group based on the first indication information, or if a type of the APS protocol request is a preset second type, cancel, based on the first indication information, the FlexE client that has been assigned to the slot.

In a possible design, the processing unit 4302 is further configured to update the APS protocol request, and the transceiver unit 4301 is further configured to send an updated APS protocol request by using a link corresponding to a second FlexE group. The communications device 4300 is connected to a third communications device by using the link corresponding to a second FlexE group.

The first indication information and the APS protocol request are carried in a FlexE overhead frame. For related content, refer to the foregoing embodiments, details are not described herein again.

In a possible design, the processing unit 4302 is configured to for the slot in the N slots of the first FlexE group, if the first indication information indicates that the second communications device has assigned the FlexE client to the slot, and the communications device 4300 has not assigned the FlexE client to the slot, assign the FlexE client to the slot, and/or if the first indication information indicates that the second communications device has not assigned the FlexE client to the slot, and the communications device 4300 has assigned the FlexE client to the slot, cancel the FlexE client that has been assigned to the slot.

In a possible design, for the slot in the N slots of the first FlexE group, the first indication information includes a FlexE client identifier corresponding to the slot or includes a non-assignment identifier. The FlexE client identifier corresponding to the slot is an identifier of the FlexE client assigned by the second communications device to the slot. The non-assignment identifier is used to indicate that the second communications device has not assigned the FlexE client to the slot. The processing unit 4302 is configured to for K slots in the N slots of the first FlexE group, where K is a positive integer not greater than N, if FlexE client identifiers that are included in the first indication information and that are corresponding to the K slots of the first FlexE group are the same, and the communications device 4300 has not assigned the FlexE client to the K slots of the first FlexE group, assign the FlexE client to each of the K slots of the first FlexE group, where when K is greater than 1, FlexE client identifiers assigned to any two of the K slots of the first FlexE group are the same.

In a possible design, the processing unit 4302 is further configured to assign a FlexE client to a slot in N slots of the second FlexE group based on the first indication information, or cancel, based on the first indication information, a FlexE client that has been assigned to the slot in the N slots of the second FlexE group. The communications device 4300 is connected to the third communications device by using the link corresponding to the second FlexE group.

In a possible design, the processing unit 4302 is configured to for K slots in the N slots of the second FlexE group, where K is a positive integer not greater than N, if the FlexE client identifiers that are included in the first indication information and that are corresponding to the K slots of the first FlexE group are the same, and the communications device 4300 has not assigned the FlexE client to the K slots of the second FlexE group, assign the FlexE client to each of the K slots of the second FlexE group, where when K is greater than 1, FlexE client identifiers assigned to any two of the K slots of the second FlexE group are the same, and establish an association relationship between the FlexE client assigned to the K slots of the first FlexE group and the FlexE client assigned to the K slots of the second FlexE group. For related content of guard periods and working slots of the first FlexE group and the second FlexE group, refer to the foregoing embodiments, details are not described herein again.

Optionally, the communications devices shown in any ones of FIG. 16, FIG. 17, and FIG. 18 may be a same communications device. In this case, the communications device has a capability of executing various solutions. For example, if FIG. 16 and FIG. 18 show a same communications device, the communications device not only can execute the solution executed by the communications device shown in FIG. 16, but also can execute the solution executed by the communications device shown in FIG. 18.

It should be noted that the unit division in the embodiments of this application is an example, and is merely logical function division. There may be another division manner in actual implementation. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

Figure 19:
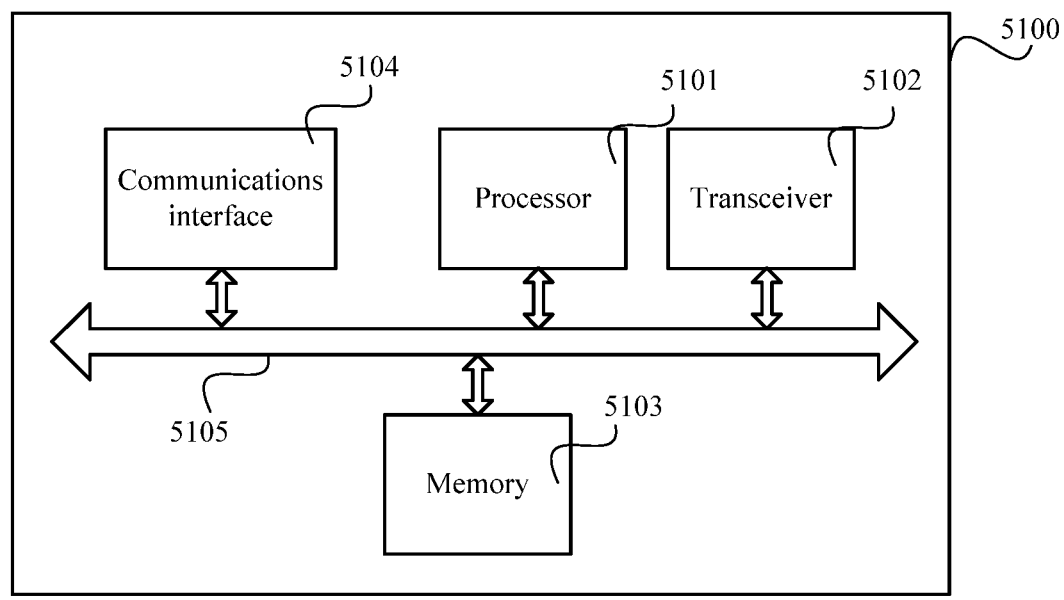
FIG. 19 is a schematic diagram of another communications device according to an embodiment of this application.

Based on the foregoing methods and the same concept, FIG. 19 is a schematic diagram of a communications device according to an embodiment of this application. As shown in FIG. 19, the communications device may be a network device, or a chip or a circuit, such as a chip or a circuit that can be disposed on a network device. The communications device 5100 may include a processor 5101 and a memory 5103. The memory 5103 is configured to store an instruction, and the processor 5101 is configured to execute the instruction stored in the memory 5103, so that the communications device implements the method according to any one or more shown in FIG. 6, FIG. 8, and FIG. 10.

Further, the communications device 5100 may further include a transceiver 5102. Still further, the communications device 5100 may further include a bus 5105 and a communications interface 5104.

The bus 5105 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 18, but this does not mean that there is only one bus or only one type of bus.

The memory 5103 may be a volatile memory, such as a random-access memory (RAM). The memory may also be a non-volatile memory, such as a flash memory, a hard disk (hard disk drive, HDD), or a solid-state drive (SSD). The memory 5103 may be further a combination of memories of the foregoing types.

The communications interface 5104 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface. The communications interface 5104 may be the foregoing ports, for example, the first type port and the second type port, or for another example, a first port 4102, a second port 4103, a third port 4104, a fourth port 4105, a fifth port 4106, a sixth port 4107, and a seventh port 4108 in FIG. 17.

The processor 5101 may be a central processing unit (CPU), a network processor (NP), or a combination of a CPU and an NP. The processor 5101 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Optionally, the memory 5103 may be further configured to store a program instruction. The processor 5101 calls the program instruction stored in the memory 5103, can control the transceiver 5102 to receive a signal and send a signal, and can execute one or more steps or optional implementations in the embodiments shown in the foregoing solutions, so that the communications device 5100 implements functions of the communications devices in the foregoing methods.

Optionally, when the communications device 5100 is configured to execute the solution shown in FIG. 6, the communications device 5100 may be the fourth communications device, or a communications device that executes the related solution of the communications device 2303 in FIG. 7, or a communications device that executes the related solution of the communications device 4100 in FIG. 16. In this case, the transceiver 5102 may be the transceiver unit 4101 in FIG. 16, and the processor 5101 may be the processing unit 4102 in FIG. 16. In other words, the processor 5101 may execute the solution executed by the processing unit 4102, and the transceiver 5102 may execute the solution executed by the transceiver unit 4101. To avoid repetition, details are not described herein again.

Optionally, when the communications device 5100 is configured to execute the solution shown in FIG. 8, the communications device 5100 may be the seventh communications device, or a communications device that executes the related solution of the communications device 2302 in FIG. 9, or a communications device that executes the related solution of the communications device 4200 in FIG. 17. In this case, the transceiver 5102 may be the transceiver unit 4201 in FIG. 17, and the processor 5101 may be the processing unit 4202 in FIG. 17. In other words, the processor 5101 may execute the solution executed by the foregoing processing unit 4202, and the transceiver 5102 may execute the solution executed by the foregoing transceiver unit 4201. To avoid repetition, details are not described herein again.

Optionally, when the communications device 5100 is configured to execute the solution shown in FIG. 10, the communications device 5100 may be the first communications device, or a communications device that executes the related solution of the communications device 2304 in FIG. 11, or a communications device that executes the related solution of the communications device 2301 in FIG. 12, or a communications device that executes the related solution of the communications device 4300 in FIG. 18. In this case, the transceiver 5102 may be the transceiver unit 4301 in FIG. 18, and the processor 5101 may be the processing unit 4302 in FIG. 18. In other words, the processor 5101 may execute the solution executed by the processing unit 4302, and the transceiver 5102 may execute the solution executed by the transceiver unit 4301. To avoid repetition, details are not described herein again.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random-access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor. To avoid repetition, details are not described herein again.

Figure 20:
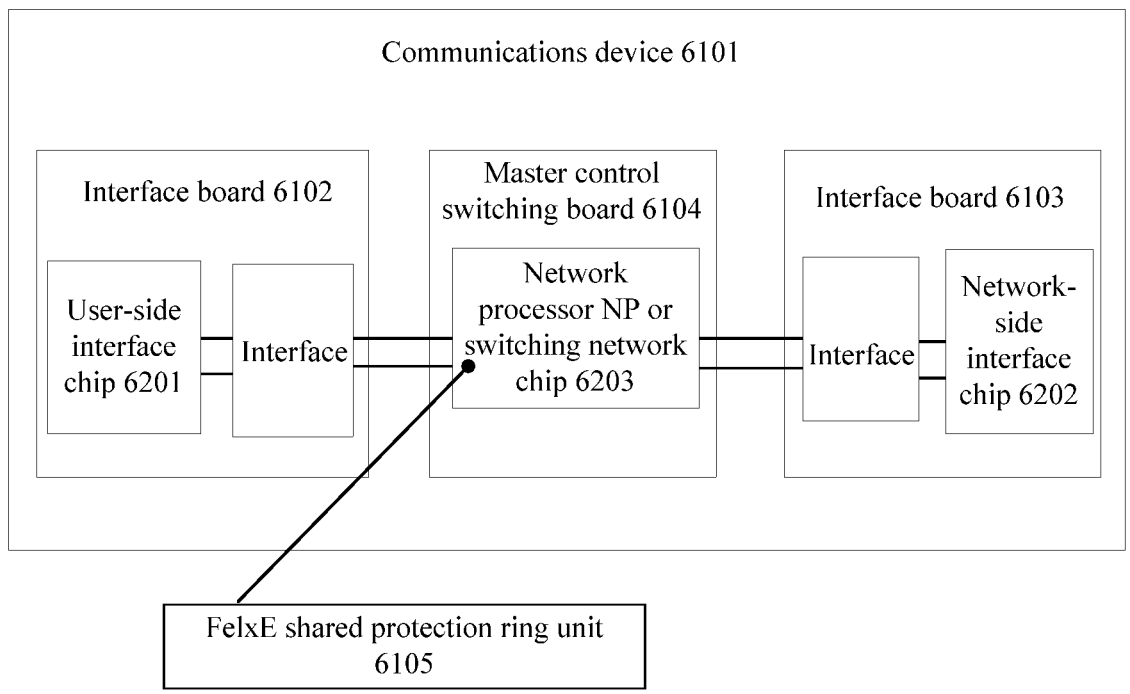
FIG. 20 is a schematic diagram of another communications device according to an embodiment of this application.

Based on the foregoing embodiments and the same concept, FIG. 20 is a schematic diagram of a communications device according to an embodiment of this application. As shown in FIG. 20, the communications device 6101 may be the communications device in the foregoing content, for example, may be the communications device 4100 in FIG. 16, or the communications device 4200 in FIG. 17, or the communications device 4300 in FIG. 18, or the communications device in FIG. 5A to FIG. 15, for example, the communications device 2301 or the communications device 2302, or the communications device 2101 in FIG. 3.

The communications device 6101 may be referred to as a packet carrying device. During specific implementation, the communications device 6101 in this embodiment of this application may be implemented on a network device that supports 1.5 layer switching, and a product form of the communications device (or referred to as a network device) is an Internet Protocol Radio Access Network (IPRAN) or packet transport network (PTN) box or modular configuration switch device that includes a port supporting the flexible Ethernet protocol. In this embodiment of this application, in a solution of an implemented product, a FlexE shared protection ring unit 6105 may be added to the communications device. The FlexE shared protection ring unit 6105 may be configured to execute related content executed by the processor 5101 and the transceiver 5102 in FIG. 19, or may be configured to execute related content executed by the transceiver unit 4101 and the processing unit 4102 in FIG. 16, or may be configured to execute related content executed by the transceiver unit 4201 and the processing unit 4202 in FIG. 17, or may be configured to execute related content executed by the transceiver unit 4301 and the processing unit 4302 in FIG. 18.

As shown in FIG. 20, the communications device 6101 may include a master control switching board 6104, an interface board 6102, and an interface board 6103. The master control switching board 6104 may be the switching unit in the foregoing content, for example, the switching unit 2102 in FIG. 3. The switching unit or the master control switching board is not shown in other figures, but ports are connected by using the master control switching board or the switching unit. The master control switching board 6104 includes a network processor (Network Processor, NP) or a switching network chip 6203, and the network processor (Network Processor, NP) or the switching network chip 6203 may be a part of the processor 5301 in FIG. 19.

As shown in FIG. 20, the interface board 6102 may be a user-side interface board, and may include a user-side interface chip 6201. The user-side interface chip 6201 may be the foregoing first type port, for example, may be the first port 2103 in FIG. 3. The user-side interface chip 6201 is connected to the master control switching board 6104 through an interface.

As shown in FIG. 20, the interface board 6103 may be a network-side interface board, and may include a network-side interface chip 6202. The network-side interface chip 6202 may be the foregoing second type port, for example, may be the second type port 2104 in FIG. 3. The network-side interface chip 6202 is connected to the master control switching board 6104 through an interface.

It should be further understood that the first, second, third, fourth, and various numeral numbers in this specification are used for differentiation for easy of description, and are not used to limit a range of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, in combination with illustrative logical blocks (illustrative logical block) described in the embodiments disclosed in this specification and steps (step) may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a Solid State Disk (SSD)), or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A flexible Ethernet protocol (FlexE) network-based communication method, comprising:
   receiving, by a first communications device, using a link corresponding to a first FlexE group, first indication information sent by a second communications device, wherein the first indication information indicates at least one of that the second communications device has assigned a FlexE client to a slot in N slots of the first FlexE group, or that the second communications device has not assigned a FlexE client to the slot, wherein N is a positive integer; and
   performing, according to the first indication information, and further according to at least one of a type of an automatic protection switching (APS) protocol request or the presence, in the first indication information, of at least one of a FlexE client identifier corresponding to the slot or a non-assignment identifier, at least one of assigning, by the first communications device, the FlexE client to the slot in the N slots of the first FlexE group, or canceling the FlexE client that has been assigned, prior to receiving the first indication information, to the slot in the N slots of the first FlexE group;
   wherein FlexE client identifier corresponding to the slot is an identifier of the FlexE client assigned by the second communications device to the slot, and wherein the non-assignment identifier indicates that the second communications device has not assigned the FlexE client to the slot; and
   wherein the performing, according to the first indication information, and according to the presence of at the least one of the FlexE client identifier corresponding to the slot or the non-assignment identifier, the at least one of the assigning the FlexE client to the slot in the N slots, or the canceling the FlexE client that has been assigned to the slot comprises performing at least one of:
      assigning, in response to the type of the APS protocol request being a preset first type, by the first communications device, the FlexE client to the slot in the N slots of the first FlexE group according to the first indication information; or
      canceling, in response to the type of the APS protocol request being a preset second type, by the first communications device, according to the first indication information, the FlexE client that has been assigned to the slot.

2. The method according to claim 1, further comprising, performing. before the receiving the first indication information:
   receiving, by the first communications device, using the link corresponding to the first FlexE group, the APS protocol request sent by the second communications device.

3. The method according to claim 2, further comprising performing, after the receiving the APS protocol request:
   updating, by the first communications device, the APS protocol request, and sending an updated APS protocol request by using a link corresponding to a second FlexE group; wherein the first communications device is connected to a third communications device using the link corresponding to the second FlexE group.

4. The method according to claim 2, wherein at least one of the first indication information or the APS protocol request is carried in a FlexE overhead frame.

5. The method according to claim 1, wherein the performing the at least one of assigning, by the first communications device, the FlexE client to the slot in the N slots of the first FlexE group, or canceling the FlexE client that has been assigned to the slot in the N slots of the first FlexE group comprises performing, according to the first indication information, and further according to the presence, in the first indication information, of at least one of a FlexE client identifier corresponding to the slot or a non-assignment identifier, the at least one of the assigning, by the first communications device, the FlexE client to the slot in the N slots of the first FlexE group, or the canceling the FlexE client that has been assigned to the slot in the N slots of the first FlexE group;
   wherein the assigning the FlexE client to the slot in the N slots comprises:
      assigning, by the first communications device, the FlexE client to each slot of K slots in the N slots of the first FlexE group in response to FlexE client identifiers that are of the first indication information and that correspond to the K slots of the first FlexE group being the same, and further in response to the first communications device having not assigned the FlexE client to the K slots of the first FlexE group, wherein the K slots are slots to which a FlexE client has been assigned prior to receiving the first indication information, wherein K is a positive integer not greater than N, and wherein, when K is greater than 1, FlexE client identifiers assigned by the first communications device to any two of the K slots of the first FlexE group are the same.

6. The method according to claim 5, further comprising performing, after the receiving the first indication information, at least one of:
   assigning, by the first communications device, a FlexE client to a slot in N slots of a second FlexE group according to the first indication information; or
   canceling, according to the first indication information, a FlexE client that has been assigned to the slot in the N slots of the second FlexE group;
   wherein the first communications device is connected to a third communications device using the link corresponding to the second FlexE group.

7. The method according to claim 6, wherein the assigning the FlexE client to the slot in N slots of the second FlexE group comprises:
   assigning, by the first communications device, the FlexE client to each slot of K slots in the N slots of the second FlexE group in response to the FlexE client identifiers that are of the first indication information and that correspond to the K slots of the first FlexE group being the same, and further in response to the first communications device having not assigned the FlexE client to the K slots of the second FlexE group, wherein K is a positive integer not greater than N; and wherein, when K is greater than 1, FlexE client identifiers assigned by the first communications device to any two of the K slots of the second FlexE group are the same; and
   establishing, by the first communications device, an association relationship between the FlexE client assigned to the K slots of the first FlexE group and the FlexE client assigned to the K slots of the second FlexE group.

8. The method according to claim 6, wherein the first FlexE group comprises $M_{11}$ working slots and $M_{12}$ guard periods, wherein $(M_{11}+M_{12})$ is a positive integer not greater than N, and wherein $M_{12}$ is a positive integer not less than K;
   wherein the K slots in the N slots of the first FlexE group are K slots in the $M_{12}$ guard periods of the first FlexE group;
   wherein the second FlexE group comprises $M_{21}$ working slots and $M_{22}$ guard periods, wherein $(M_{21}+M_{22})$ is a positive integer not greater than N, and wherein $M_{22}$ is a positive integer not less than K;
   wherein the K slots in the N slots of the second FlexE group are K slots in the $M_{22}$ guard periods of the second FlexE group; and
   wherein $M_{22}$ is not less than $M_{11}$, and wherein $M_{12}$ is not less than $M_{21}$.

9. The method according to claim 8, wherein the K slots of the first FlexE group are in a one-to-one correspondence with the K slots of the second FlexE group; and
   wherein a rank of a slot that is in the K slots of the first FlexE group and that is in the $M_{12}$ guard periods is the same as a rank of a slot that is in the $M_{22}$ guard periods, that is in the K slots of the second FlexE group and that corresponds to the slot that is in the K slots of the first FlexE group and that is in the $M_{12}$ guard periods.

10. A communications device, comprising:
    a transceiver;
    a processor; and
    a non-transitory computer readable medium storing a program for execution by the processor, the program including instructions to:
    cause the transceiver to receive, using a link corresponding to a first FlexE group, first indication information sent by a second communications device, the first indication information indicates at least one of that the second communications device has assigned a FlexE client to a slot in N slots of the first FlexE group, or that the second communications device has not assigned a FlexE client to the slot, wherein N is a positive integer; and
    perform, according to the first indication information, and further according to at least one of a type of an automatic protection switching (APS) protocol request or the presence, in the first indication information, of at least one of a FlexE client identifier corresponding to the slot or a non-assignment identifier, at least one of assign the FlexE client to the slot in the N slots of the first FlexE group, or cancel the FlexE client that has been assigned, prior to receiving the first indication information, to the slot in the N slots of the first FlexE group;
    wherein FlexE client identifier corresponding to the slot is an identifier of the FlexE client assigned by the second communications device to the slot, and wherein the non-assignment identifier indicates that the second communications device has not assigned the FlexE client to the slot; and
    wherein the instructions to perform, according to the first indication information, and according to the presence of at the least one of the FlexE client identifier corresponding to the slot or the non-assignment identifier, the at least one of the assign the FlexE client to the slot in the N slots, or the cancel the FlexE client that has been assigned to the slot include instruction to perform at least one of:
assign, in response to the type of the APS protocol request being a preset first type, by the communications device, the FlexE client to the slot in the N slots of the first FlexE group according to the first indication information; or
cancel, in response to the type of the APS protocol request being a preset second type, by the communications device, according to the first indication information, the FlexE client that has been assigned to the slot.

11. The communications device according to claim 10, wherein program further includes instructions to:
cause the transceiver to receive, using the link corresponding to the first FlexE group, the APS protocol request sent by the second communications device.

12. The communications device according to claim 11, wherein the program further includes instructions to:
update the APS protocol request; and
cause the transceiver to send an updated APS protocol request using a link corresponding to a second FlexE group, wherein the communications device is connected to a third communications device by using the link corresponding to the second FlexE group.

13. The communications device according to claim 10, wherein the instructions to perform the at least one of assign, by the first communications device, the FlexE client to the slot in the N slots of the first FlexE group, or cancel the FlexE client that has been assigned to the slot in the N slots of the first FlexE group include instructions to perform, according to the first indication information, and further according to the presence, in the first indication information, of at least one of a FlexE client identifier corresponding to the slot or a non-assignment identifier, the at least one of assign, by the communications device, the FlexE client to the slot in the N slots of the first FlexE group, or cancel the FlexE client that has been assigned to the slot in the N slots of the first FlexE group; and
wherein the program further includes instructions to:
assign the FlexE client to each of K slots in the N slots of the first FlexE group in response to FlexE client identifiers that are of the first indication information and that correspond to the K slots of the first FlexE group being the same, and further in response to the communications device having not assigned the FlexE client to the K slots of the first FlexE group, wherein K is a positive integer not greater than N, and wherein, wherein the K slots are slots to which a FlexE client has been assigned prior to receiving the first indication information, when K is greater than 1, FlexE client identifiers assigned to any two of the K slots of the first FlexE group are the same.

14. The communications device according to claim 13, wherein the program further includes instructions to:
perform, according to the first indication information, at least one of assign a FlexE client to a slot in N slots of a second FlexE group, or cancel a FlexE client that has been assigned to a slot in N slots of the second FlexE group, wherein the communications device is connected to a third communications device by using the link corresponding to the second FlexE group.

15. The communications device according to claim 14, wherein the program further includes instructions to:
assign the FlexE client to each of K slots in the N slots of the second FlexE group in response to the FlexE client identifiers that are of the first indication information and that correspond to the K slots of the first FlexE group are the same, and further in response to the communications device having not assigned the FlexE client to the K slots of the second FlexE group, wherein K is a positive integer not greater than N, and wherein when K is greater than 1, FlexE client identifiers assigned to any two of the K slots of the second FlexE group are the same; and
establish an association relationship between the FlexE client assigned to the K slots of the first FlexE group and the FlexE client assigned to the K slots of the second FlexE group.

16. The communications device according to claim 14, wherein the first FlexE group comprises $M_{11}$ working slots and $M_{12}$ guard periods, wherein $(M_{11}+M_{12})$ is a positive integer not greater than N, and wherein $M_{12}$ is a positive integer not less than K;
wherein the K slots in the N slots of the first FlexE group are K slots in the $M_{12}$ guard periods of the first FlexE group;
wherein the second FlexE group comprises $M_{21}$ working slots and $M_{22}$ guard periods, wherein $(M_{21}+M_{22})$ is a positive integer not greater than N, and wherein $M_{22}$ is a positive integer not less than K;
wherein the K slots in the N slots of the second FlexE group are K slots in the $M_{22}$ guard periods of the second FlexE group; and
wherein $M_{22}$ is not less than $M_{11}$, and $M_{12}$ is not less than $M_{21}$.

17. The communications device according to claim 16, wherein the K slots of the first FlexE group are in a one-to-one correspondence with the K slots of the second FlexE group; and
wherein a rank of a slot that is in the K slots of the first FlexE group and that is in the $M_{12}$ guard periods is the same as a rank of a slot that is in the $M_{22}$ guard periods, that is in the K slots of the second FlexE group and that corresponds to the slot that is in the K slots of the first FlexE group and that is in the $M_{12}$ guard periods.

18. A communications device, comprising:
a transceiver, configured to receive, using a link corresponding to a first FlexE group, first indication information sent by a second communications device, wherein for a slot in N slots of the first FlexE group, wherein the first indication information indicates that the second communications device has assigned a FlexE client to the slot, or used to indicate that the second communications device has not assigned a FlexE client to the slot, wherein N is a positive integer; and
a processor, configured to perform, according to the first indication information, and further according to at least one of a type of an automatic protection switching (APS) protocol request or the presence, in the first indication information, of at least one of a FlexE client identifier corresponding to the slot or a non-assignment identifier, at least one of assign the FlexE client to the slot in the N slots of the first FlexE group, or cancel the FlexE client that has been assigned, prior to receiving the first indication information, to the slot in the N slots of the first FlexE group;

wherein FlexE client identifier corresponding to the slot is an identifier of the FlexE client assigned by the second communications device to the slot, and wherein the non-assignment identifier indicates that the second communications device has not assigned the FlexE client to the slot; and wherein the being configured to perform, according to the first indication information, and according to the presence of the at least one of the FlexE client identifier corresponding to the slot or the non-assignment identifier, the at least one of assign the FlexE client to the slot in the N slots, or cancel the FlexE client that has been assigned to the slot comprises the processor being configured to perform at least one of:

assign, in response to the type of the APS protocol request being a preset first type, by the first communications device, the FlexE client to the slot in the N slots of the first FlexE group according to the first indication information; or cancel, in response to the type of the APS protocol request being a preset second type, by the first communications device, according to the first indication information, the FlexE client that has been assigned to the slot.

\* \* \* \* \*

UNITED STATES PATENT AND TRADEMARK OFFICE
CERTIFICATE OF CORRECTION

PATENT NO. : 11,134,029 B2  
APPLICATION NO. : 16/803756  
DATED : September 28, 2021  
INVENTOR(S) : Zhang et al.

Page 1 of 1

It is certified that error appears in the above-identified patent and that said Letters Patent is hereby corrected as shown below:

In the Claims

Claim 5, Column 59, Lines 25-26; insert --and-- in between "group;" and "wherein".

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*